(12) United States Patent
Cassidy et al.

(10) Patent No.: US 11,997,100 B2
(45) Date of Patent: May 28, 2024

(54) METHOD AND SYSTEM FOR PROVIDING FRACTIONALIZED ACCESS TO CYBERSECURITY INTELLIGENCE CONTENT OR CYBERSECURITY SERVICE

(71) Applicant: AVALON CYBER CORPORATION, Alexandria, VA (US)

(72) Inventors: John Cassidy, Alexandria, VA (US); Peter Prizio, Jr., Alexandria, VA (US); Matthew Walnock, Alexandria, VA (US); Melissa K. Smith, Alexandria, VA (US)

(73) Assignee: AVALON CYBER CORPORATION, Alexandria, VA (US)

( * ) Notice: Subject to any disclaimer, the term of this patent is extended or adjusted under 35 U.S.C. 154(b) by 373 days.

(21) Appl. No.: 17/376,069

(22) Filed: Jul. 14, 2021

(65) Prior Publication Data
US 2022/0021683 A1 Jan. 20, 2022

Related U.S. Application Data

(60) Provisional application No. 63/052,196, filed on Jul. 15, 2020.

(51) Int. Cl.
*G06F 21/00* (2013.01)
*H04L 9/40* (2022.01)
(52) U.S. Cl.
CPC .......... *H04L 63/104* (2013.01); *H04L 63/105* (2013.01); *H04L 63/108* (2013.01)
(58) Field of Classification Search
CPC ... H04L 63/104; H04L 63/105; H04L 63/108; H04L 63/102; H04L 63/101
See application file for complete search history.

(56) References Cited

U.S. PATENT DOCUMENTS

| | | | |
|---|---|---|---|
| 9,369,745 B1 | 6/2016 | Pecjak et al. | |
| 9,954,865 B2* | 4/2018 | Salem | G06F 21/6218 |
| 2012/0047532 A1* | 2/2012 | McCarthy, III | H04N 21/478 |
| | | | 725/39 |

(Continued)

OTHER PUBLICATIONS

International Search Report and Written Opinion issued in corresponding International Application No. PCT/US2021/041692 dated Oct. 27, 2021.

*Primary Examiner* — Kendall Dolly
(74) *Attorney, Agent, or Firm* — MEDLER FERRO WOODHOUSE & MILLS PLLC

(57) ABSTRACT

A computing system and a method performed by the computing system are presented. The system may provide a cybersecurity analysis platform, and the method may include outputting a plurality of content access options for selection by a user or group of users of the platform, wherein the content access options are associated with different amounts of content access to a cybersecurity intelligence content source. The method may further involve receiving a selection of one of the content access options, and updating, based on the selection, a profile that indicates an amount of content access allocated to the user or group of users. The method may involve receiving a content request from the user or group of users for cybersecurity intelligence content, and responding to the content requested based on whether the allocated amount of content access has been completely depleted.

20 Claims, 36 Drawing Sheets

(56) References Cited

U.S. PATENT DOCUMENTS

| | | | |
|---|---|---|---|
| 2018/0159811 A1* | 6/2018 | Deets, Jr. | ................ H04L 51/52 |
| 2019/0121498 A1* | 4/2019 | Jakobovits | ............ G06F 3/1431 |
| 2020/0073925 A1 | 3/2020 | Shapiro et al. | |
| 2021/0042854 A1* | 2/2021 | Hazy | .................. G06F 21/6245 |

\* cited by examiner

METHOD AND SYSTEM FOR PROVIDING FRACTIONALIZED ACCESS TO CYBERSECURITY INTELLIGENCE CONTENT OR CYBERSECURITY SERVICE

CROSS-REFERENCE TO RELATED APPLICATION(S)

This application claims the benefit under 35 U.S.C. § 119(e) to U.S. Provisional Appl. No. 63/052,196, filed Jul. 15, 2020, the entire content of which is incorporated by reference herein.

FIELD OF THE INVENTION

The present invention is directed to a method and system for providing fractionalized access to cybersecurity intelligence content or cybersecurity service.

BACKGROUND

As cybersecurity threats become more commonplace, it has become more important for organizations and even individuals to investigate existing or potential cybersecurity threats so as to take protective measures against those threats or to better understand a risk posed by such threats. The investigation of such cybersecurity threats may involve gathering cybersecurity intelligence content, which may be available from various proprietary or open source cybersecurity intelligence content sources.

SUMMARY

One aspect of the present disclosure relates to a computing system that provides a computing platform (e.g., a cybersecurity intelligence analysis platform) for providing fractionalized access to a cybersecurity intelligence content source. More specifically, the computing platform may provide fractionalized access to cybersecurity intelligence content in the content source. The fractionalized access may allow a user or group of users of the computing platform to select an amount of content access to be allocated to the user or group of users for accessing a particular cybersecurity intelligence content source. The selection may be made from among different content access options, which may provide fractionalized access to the cybersecurity intelligence content source. The content access options may be associated with, e.g., different quantities of content requests that can be allocated to the user or group of users for accessing a cybersecurity intelligence content source, or different time durations in which the user or group of users can access the cybersecurity intelligence content source. In some embodiments, the platform may allow a user or group of users to select from among different tiers of content access, different types of content that can be accessed (which may be relevant to different types of investigation), and/or different time periods in which the content can be accessed.

In an embodiment, the different quantities of content requests may indicate how many content requests (e.g., queries) the computing platform will accept from the user or group of users for accessing content in the cybersecurity intelligence content source or, more generally, how many times the user or group of users can access the cybersecurity intelligence content source. As an example, the different content access options may allocate, respectively, 1000, 5000, or 10000 queries which may be used to search for cybersecurity intelligence content in a cybersecurity intelligence content source. In some cases, the cybersecurity intelligence content source may be a threat intelligence content source that can provide threat intelligence content. In an embodiment, the computing system (e.g., cybersecurity analysis platform) may be configured to provide access to additional content (e.g., network device information, log data, information from Security Information Event Management (SIEM) platforms, information from Endpoint Detection and Response (EDR), and information from other network security devices and platforms) that can be used in combination with the threat intelligence content.

In an embodiment, the different time durations may indicate when content access to a cybersecurity intelligence content source will expire, wherein the computing system may stop accepting content requests from the user or group of users for accessing the cybersecurity intelligence content source if the content access has expired. As an example, the content access options may allocate one of: 30 days, 60 days, 90 days, or 120 days of content access, during which the cybersecurity analysis platform will accept queries from the user or group of users for accessing a particular cybersecurity content source.

In an embodiment, if cybersecurity intelligence content in a content source is divided into different tiers (e.g., a basic tier and a premium tier), the content selection options may allow a user or group of users to select between allocation to different tiers of content. In such an embodiment, a query for accessing content in a particular cybersecurity intelligence content source may be limited to searching content only in a selected tier, or only in that tier and any lower tiers (e.g., less premium tiers). Similarly, if content in a content source is divided into different types of content, the content selection options may allow a user or group of users to select between being allocated different types of content. A query for accessing content in such an embodiment may be limited to searching for only a selected type of content. The different types of cybersecurity intelligence content may, e.g., be associated with different types of cybersecurity investigations. In some instances, if a particular type of cybersecurity intelligence content can be found in multiple content sources, the computing platform may provide content selection options which allow content access to be allocated for that type content regardless of which of the multiple cybersecurity intelligence content source is being accessed. Such a content access option may allow a user or group of users to perform a particular type of cybersecurity investigation while accessing multiple cybersecurity intelligence content sources with a single query. In some cases, the computing platform may provide a combination of the cybersecurity intelligence content and the additional content discussed above to facilitate a cybersecurity investigation.

In an embodiment, a single implementation of the computing platform may provide multiple types of the content access options discussed above. For example, the computing platform may provide content access options which are quantified in terms of an amount of queries, or more specifically a number of queries (or other content requests), and other content access options which are quantified in terms of an amount of time, also referred to as a time duration. In some cases, the computing platform may provide content access options which combine the limitations discussed above. For instance, it may provide content access options content access options that each includes a certain quantity of queries (e.g., 1,000 queries) which can be allocated to a user or group of users, and a time duration (e.g., 30 days) in which that quantity of queries can be used.

In an embodiment, the different content access options provided by the computing platform may provide more flexibility and efficiency for providing a user or group of users with access to a cybersecurity intelligence content source. More specifically, although access to a cybersecurity intelligence content source may be provided in a uniform manner, such a form of providing access to the content source may be inefficient. As an example, providing access to all users or all groups of users in a uniform manner may involve, e.g., allocating the same, standard duration of access (e.g., 1 year of access) for a cybersecurity intelligence content source to all users or groups of users who choose to acquire access to the content source. Such a form of access may be inefficient for both the cybersecurity intelligence content source, the user or group of users, and the computing platform. For instance, allocating access to the cybersecurity intelligence content source with a single, standardized duration may be inefficient for the computing and/or the cybersecurity intelligence content source, because it may put pressure on the computing platform and/or the content source to dedicate enough computing resources and bandwidth to accommodate possible heavy usage (e.g., large number of queries) by the user or group of users, even if the actual usage by the user or the group ends up being much lower. Further, such a situation may be inefficient for the user or group of users, because the user or the group may have to dedicate a large amount of financial resources or other resources to acquire access for the standard duration discussed above, even though the user or the group may ultimately make only light use of the content source.

Thus, one aspect of the present disclosure relates to providing numerous content access options (e.g., 3, 5, 7, 10, etc. content access options) which allow different amounts of content access to be allocated for accessing a particular cybersecurity intelligence content source, and thus provides fractionalized access to the cybersecurity intelligence content source by allowing for user selection from among different amounts or different levels of access to the content source. The numerous content access options provide the technical advantage of allowing resources of the computing platform and/or cybersecurity intelligence content sources to be used more efficiently, and allowing the resources of the user or groups of users to be used more efficiently. For instance, the computing platform may receive a selection of one of the content access options from a user or group of users, wherein the selection may indicate an amount of content access that is to be allocated to the user or group of users, as discussed above. Such a selection may be used by the computing platform and/or cybersecurity intelligence content source to estimate how much technical resources might be needed to accommodate requests for content access from the user or group of users. Further, such a selection may be used to decrease the amount of resources that the user or group of users may have to dedicate to acquire access to a particular content source. For example, the amount of resources (e.g., financial resources) that a user or group of users have to use to acquire access to the content source may depend on an amount of content access that is allocated. Thus, the computing platform may allow the user or group of users to decrease how much resources are used to acquire access by their selecting an option which allocates a smaller amount of content access.

In an embodiment, the computing platform may provide act as an interface between a user (or group of users) and a multitude of cybersecurity intelligence content sources, and may provide a more efficient and streamlined manner of accessing the multitude of cybersecurity intelligence content sources. More particularly, the multiple cybersecurity intelligence content sources may use many different communication formats or protocols, and may use different authentication information (e.g., different licensing keys). A user or group of users may have a likelihood of encountering technical challenges when attempting to communicate directly with the multiple cybersecurity intelligence content sources and attempting to ensure compatibility between a device operated by the user and the multiple content sources. Overcoming those technical challenges may involve a considerable amount of time and technical resources, which may be disadvantageous particularly for time-sensitive cybersecurity investigations. One aspect of the present disclosure relates to using the computing platform to overcome these technical challenges. More particularly, the computing platform may in an embodiment implement a multitude of application programming interfaces (API's) and/or maintain a multitude of authentication information. The API's may be for communicating in the various protocols or formats used by the various cybersecurity intelligence content sources, and the authentication information may be for verifying permission to access the content sources. Thus, the computing platform may provide a centralized system for gathering the API's and the authentication information, and may allow a user or group of users to access many different cybersecurity intelligence content sources via the computing platform. Thus, the computing platform may in some cases act as an interface between a content source and a user or group of users. This interface may simplify content access for the user or the group of users and/or increase a speed by which content access is procured.

In an embodiment, the computing platform may be configured to track content source usage, or more specifically to generate content source usage information. The content source usage information may indicate how various cybersecurity intelligence content sources are used by a user or group of users. In one example, the content source usage information may indicate how many queries the computing platform has received from the user or group of users for accessing a particular cybersecurity intelligence content source, and how that usage varies as a function of time. In another example, the content source usage information may indicate how much each user in a group is querying or otherwise accessing various cybersecurity intelligence content sources, or how usage of various content sources is divided among those users. In some cases, the content source usage may indicate how usage of various content sources is divided among different cybersecurity investigation projects, or more specifically among virtual workspaces associated with those projects. The above investigations may allow a user or group of users to more accurately assess how much various content sources have been accessed by the user or by the group, and this assessment may be used by the user or group of users to evaluate what content access option should be selected in the future, and/or by the computing platform to generate a future recommendation regarding what content access option should be selected.

Features, objects, and advantages of embodiments hereof will become apparent to those skilled in the art by reading the following detailed description where references will be made to the appended figures.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION

The use of the word "a" or "an" when used in conjunction with the term "comprising" in the claims and/or the specification may mean "one," but it is also consistent with the meaning of "one or more," "at least one," and "one or more than one."

The use of the term "or" in the claims is used to mean "and/or" unless explicitly indicated to refer only to alternatives or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited, elements or method steps.

Figure 1A:
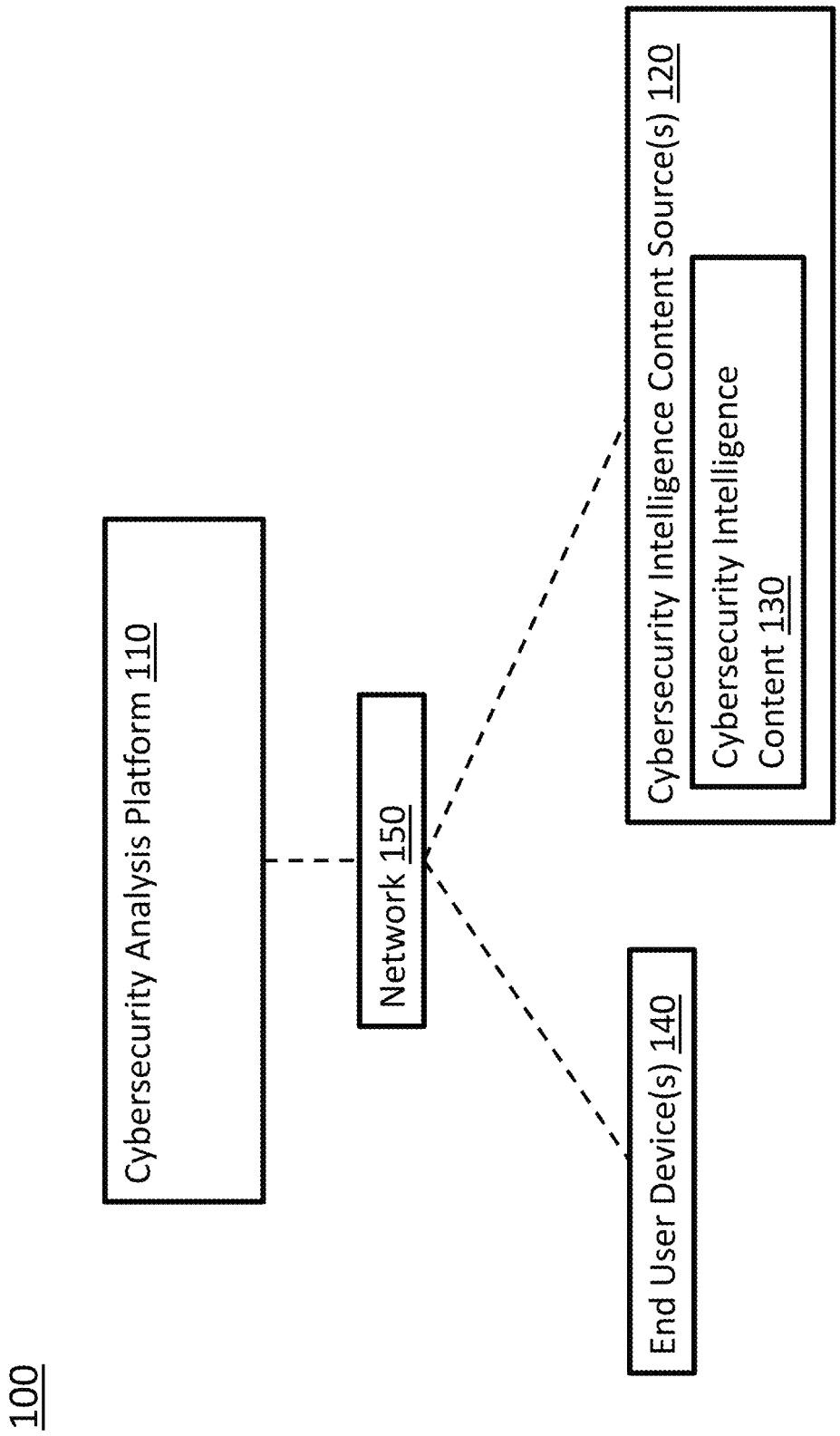
FIGS. 1A-1C provide examples of a system for providing access to cybersecurity intelligence content in a cybersecurity intelligence content source, according to embodiments herein.

FIG. 1A provides a block diagram which illustrates an example environment or system 100 for facilitating access to cybersecurity intelligence content, which may be used for a cybersecurity investigation or some other purpose. The system 100 includes a cybersecurity analysis platform 110, an end user device(s) 140, and a cybersecurity intelligence content source(s) 120. In an embodiment, the cybersecurity analysis platform 110, such as the Avalon Cyber Analysis Platform, may be provided by or may include a computing system which provides a computing tool for investigating and/or analyzing cybersecurity threats. More particularly, the platform 110 may provide a tool for a user, such as a cybersecurity analyst, to search for cybersecurity intelligence content or other information relating to a cybersecurity threat, and to organize and/or visualize that information. The cybersecurity intelligence content that is accessible via the cybersecurity analysis platform 110 may include, e.g., information regarding an indicator of attack (IoA) or an indicator of compromise (IoC) for a particular cybersecurity threat, information regarding a threat actor for a particular cybersecurity threat, information relating to the tactics, techniques, and procedures (TTP's) for the cybersecurity threat or threat actor, or any other information relating to a cybersecurity threat, as discussed below in more detail.

In an embodiment, the cybersecurity intelligence content source(s) 120 may store, host, or otherwise provide cybersecurity intelligence content 130. In some implementations, some or all of the cybersecurity intelligence content source(s) may each include a storage system, such as a database or file system, for storing cybersecurity intelligence content. Thus, in some implementations, cybersecurity intelligence content that is in a cybersecurity intelligence content source may be stored in the database or file system. In some cases, cybersecurity intelligence content in the cybersecurity intelligence content source may be cached or buffered in the content source, and the cached or buffered content may have been obtained from a storage system which is external to the content source.

Figure 1B:
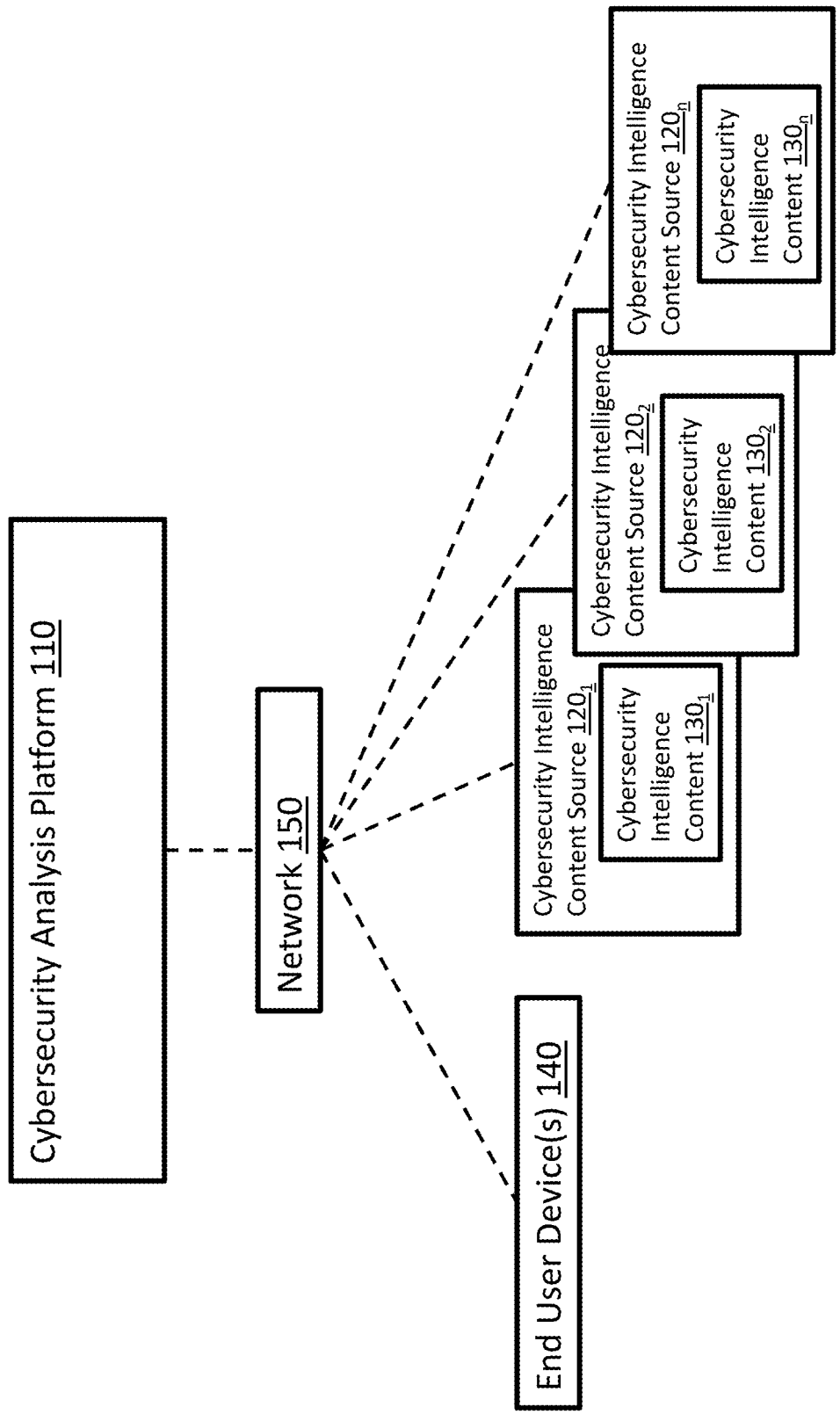

In some cases, the cybersecurity intelligence content source(s) 120 and the cybersecurity intelligence content 130 may be external to the cybersecurity analysis platform 110, as depicted in FIG. 1A. For instance, the cybersecurity analysis platform 110 may be operated by a first entity or party, while a different entity or party may operate a cybersecurity intelligence content source 120. As FIG. 1A indicates, the cybersecurity intelligence content source(s) may include a single content source, or may include multiple content sources. FIG. 1B illustrates an example having multiple cybersecurity intelligence content sources $120_1$ through $120_n$, wherein each of the cybersecurity intelligence content sources may host or otherwise be able to provide respective pieces ($130_1$ through $130_n$) of cybersecurity intelligence content. In some scenarios, the various cybersecurity intelligence content sources may be operated by multiple entities. As an example, the cybersecurity intelligence content source $120_1$ may be a content source operated by a first entity (e.g., FireEye, Inc.), while the cybersecurity intelligence content source $120_2$ may be a content source operated by a second entity that is different from the first entity (e.g., Intel 471 Inc.). In some scenarios, various content sources may provide different types of cybersecurity intelligence content. For instance, the cybersecurity intelligence content source $120_1$ may provide cybersecurity intelligence relating to malware and computer viruses, while the cybersecurity intelligence content source $120_2$ may provide cybersecurity intelligence relating to threats from the deep dark web.

As depicted in FIGS. 1A and 1B, the cybersecurity analysis platform 110 may provide the end user device(s) 140 with access to cybersecurity intelligence content 130 in the cybersecurity intelligence content source(s) 120, or more specifically provide users of such device(s) 140 with the access to the cybersecurity intelligence content that are available from those content source(s) 120. More specifically, the cybersecurity analysis platform 110 may provide an interface through which the users can quickly and efficiently access the cybersecurity intelligence content 130 in the cybersecurity intelligence content source(s) 120. In some cases, the cybersecurity analysis platform 110 may itself host cybersecurity intelligence content. For instance, FIG. 1C provides an example in which the cybersecurity analysis platform 110 stores cybersecurity intelligence content $130_2$ that is accessible to a user to search through as part of a cybersecurity investigation.

In an embodiment, the cybersecurity analysis platform 110, the end user device(s) 140, and the cybersecurity intelligence content source(s) 120 may be configured to communicate via a network 150. The network 150 may be, e.g., a local area network (LAN) or a larger network, such as the Internet. If the network 150 is the Internet, the end user device(s) 140 may access a service or functionality provided by the cybersecurity analysis platform 110 via the Internet. In some cases, the cybersecurity analysis platform 110 may be a software-as-a-service (SaaS) platform, and may be provided by a computing system having servers or other computing devices. In some cases, the cybersecurity analysis platform 110 may be a cloud-based platform.

Figure 2A:
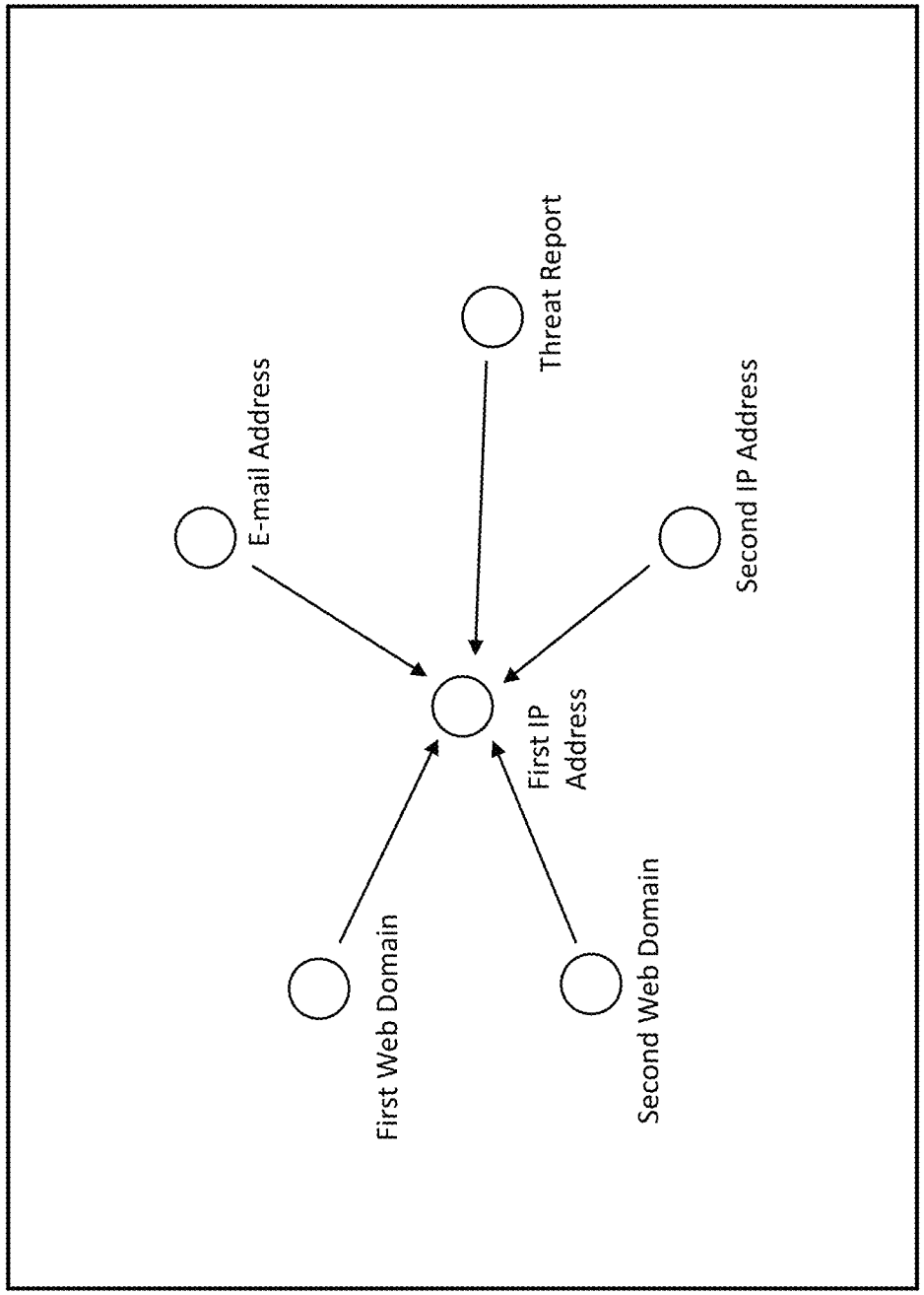
FIGS. 2A and 2B provide examples of graphs which depict a relationship between nodes that represent pieces of cybersecurity intelligence content, according to embodiments herein.
Figure 2B:
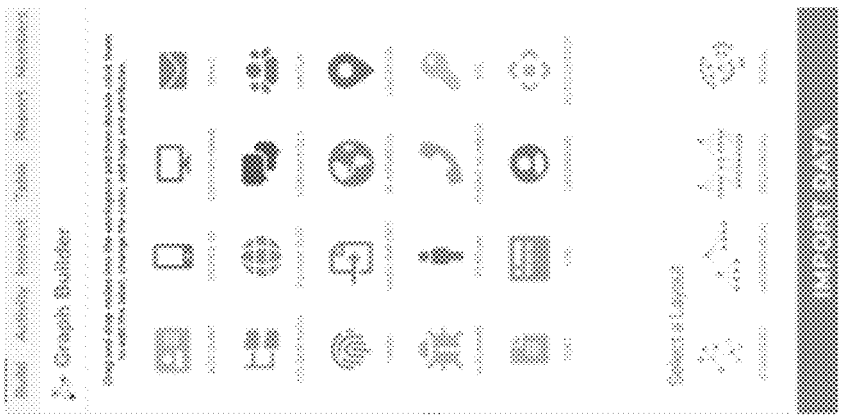
Figure 2B:
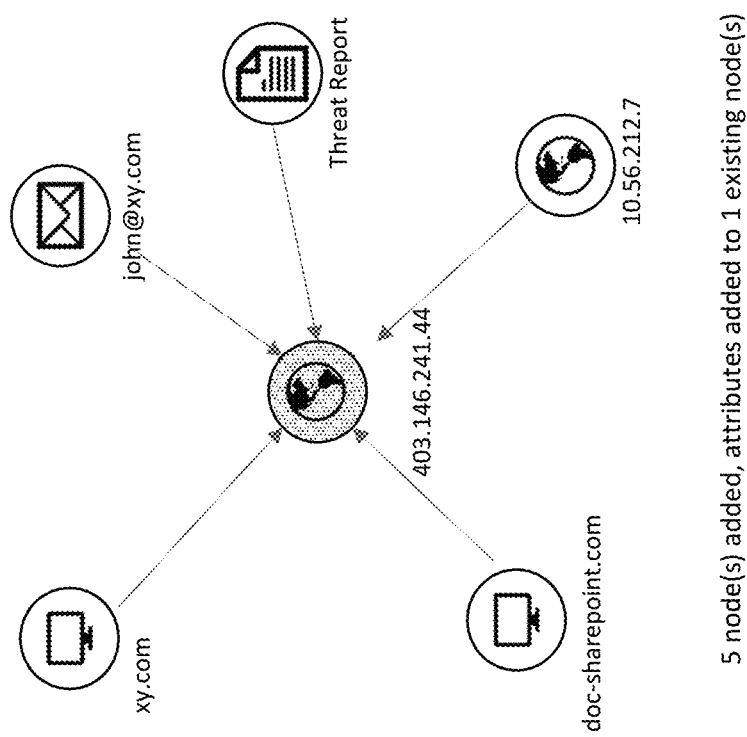

In an embodiment, the cybersecurity analysis platform 110 may provide a virtual workspace in which cybersecurity intelligence content relating to a cybersecurity investigation can be collected, organized, visualized, and/or shared. For example, the virtual workspace may store different pieces of cybersecurity intelligence content in a manner that describes how they are related to each other. The cybersecurity analysis platform 110 may be configured to generate content for a user interface (e.g., graphical user interface) which allows a user to visualize the relationship between the pieces of cybersecurity intelligence content, or to visualize some other aspect of the cybersecurity intelligence content or other cybersecurity intelligence information. As an example, FIG. 2A illustrates a graph, such as the Avalon Graph provided by the Avalon Cyber Analysis Platform, which visually describes a relationship between various pieces of cybersecurity intelligence content. The platform 110 may generate content for displaying the graph, and may communicate the content to the end user device 140. After the end user device 140 receives the content for displaying the graph, the device 140 may display the graph on, e.g., a web browser or other user interface of the end user device 140. In the example of FIG. 2A, the graph describe a relationship between various nodes, each of which may represent a piece of cybersecurity intelligence content. More specifically, the nodes in FIG. 2A may represent a first IP address, a second IP address, a first web domain, a second web domain, an e-mail address, and a threat report, all of which may be related to a particular cybersecurity threat. FIG. 2B provides a more specific example of the cybersecurity intelligence content that may be visualized through a graph. The graph in FIGS. 2A and 2B may visually indicate that a first IP address (e.g., 403.146.241.44) relating to a particular cybersecurity threat is also linked with a second IP address (e.g., 10.56.212.7), with the two web domains (e.g., xy.com and doc-sharepoint.com), with an e-mail address (e.g., john@xy.com), and with a threat report. This relationship may allow a cybersecurity analyst or other user to, e.g., visualize various avenues through which a cybersecurity threat relating to the first IP address can be further investigated. In the example of FIGS. 2A and 2B, the graph may visually indicate that the second IP address, the two web domains, the e-mail address, and the threat report are related to the same cybersecurity threat associated with the first IP address.

Figure 1C:
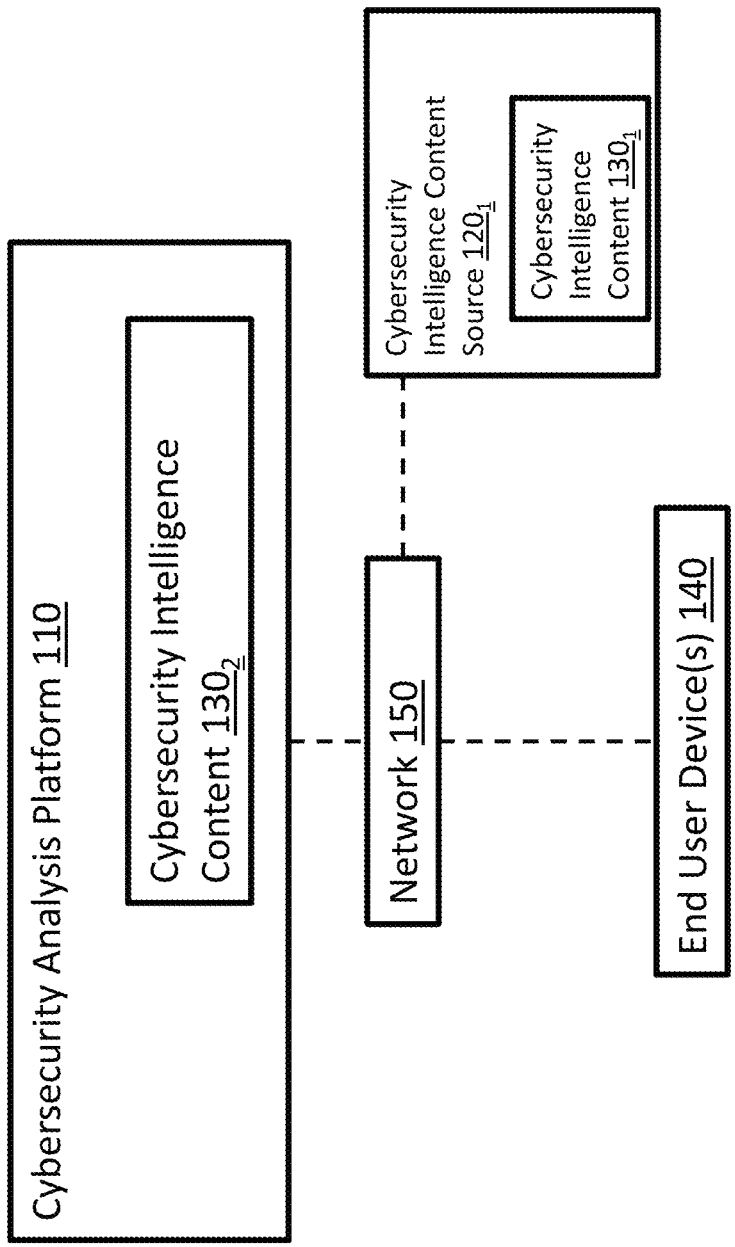
Figure 3A:
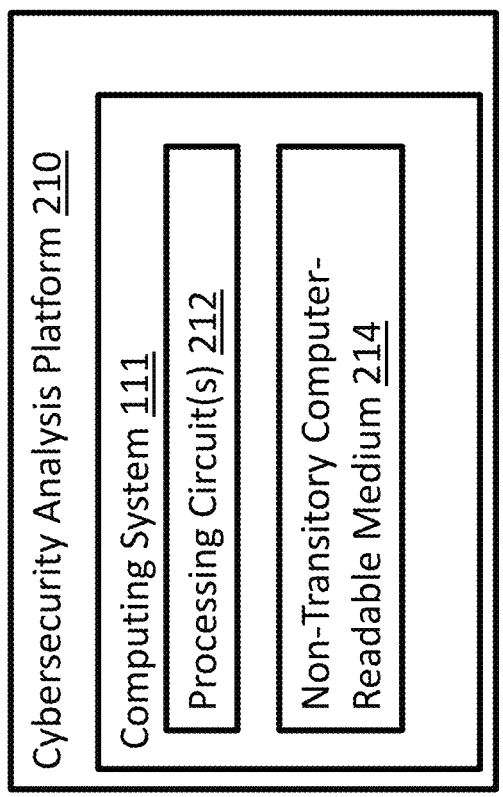
FIGS. 3A and 3B provide examples of a cybersecurity analysis platform, wherein access to various cybersecurity intelligence content sources may be provided via the cybersecurity analysis platform, according to embodiments herein.

In an embodiment, the cybersecurity analysis platform 110 of FIGS. 1A-1C may include or may be provided or implemented by a computing system. As an example, FIG. 3A illustrates a cybersecurity analysis platform 210 that is an embodiment of the cybersecurity analysis platform 110. In this example, the cybersecurity analysis platform 210 includes a computing system 111, which may include one or more computing devices, such as one or more servers or other computing devices. The one or more computing devices may include at least one processing circuit 212 and at least one non-transitory computer-readable medium 214, as depicted in FIG. 3A. The processing circuit 212 may include, e.g., one or more microprocessors or one or more processor cores. The non-transitory computer-readable medium 214 may include one or more storage devices, such as a hard disk drive (HDD), a tape drive, a solid state drive (SDD), flash memory, or any other storage device. In some cases, the computing system 111 may be configured to host one or more virtual machines for executing the cybersecurity analysis platform 210. In an embodiment, the cybersecurity analysis platform 210 may include a communication interface that is configured to communicate with the end user devices 140. For instance, the communication interface may be a network communication interface which includes one or more devices (e.g., an Ethernet communication circuit) that are configured to communicate with the end user devices via the network 150.

Figure 3B:
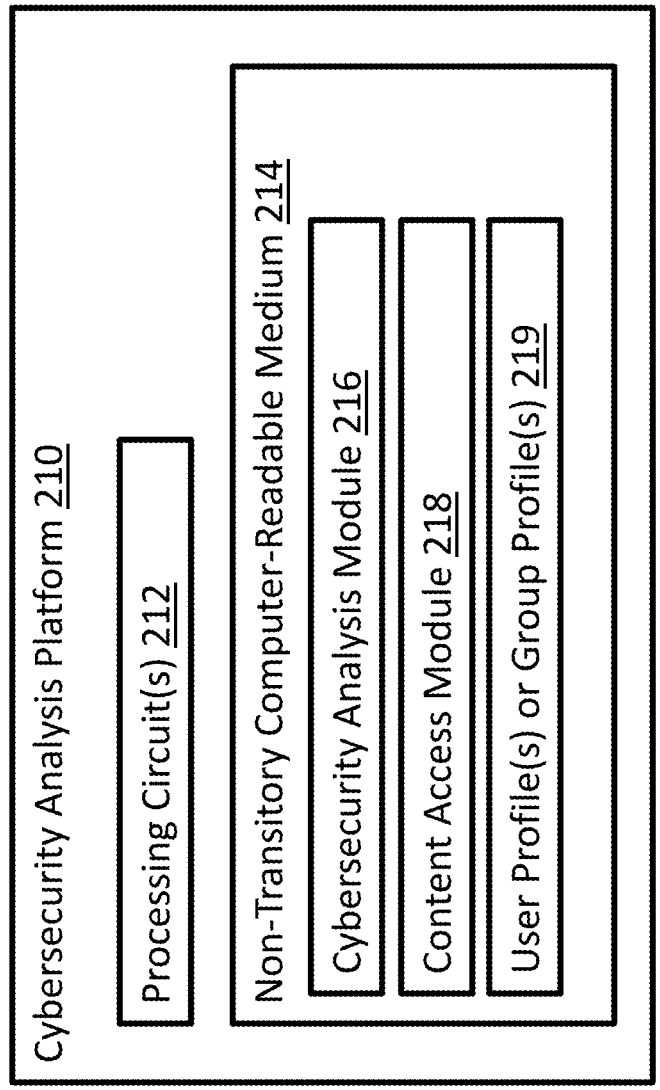

The non-transitory computer-readable medium 214 may be configured to store data and/or instructions (e.g., software code) for execution by the processing circuit 212. In an embodiment, the non-transitory computer-readable medium 214 may store the instructions in one or more modules. As an example, FIG. 3B depicts the non-transitory computer-readable medium 214 storing instructions for a cybersecurity analysis module 216 and a content access module 218. The cybersecurity analysis module 216 may be configured to facilitate a cybersecurity investigation by organizing cybersecurity intelligence content, such as by generating the graph described with respect to FIGS. 2A and 2B. In an embodiment, the content access module 218 may provide different content access options for cybersecurity intelligence content in one or more cybersecurity intelligence content sources, as discussed below in more detail. In some implementations, as depicted in FIG. 3B, the non-transitory computer-readable medium 214 may further store a profile, such as a user profile or a group profile, for storing information regarding an amount of content access allocated to a user or group of users, as also discussed below in more detail.

Figure 4A:
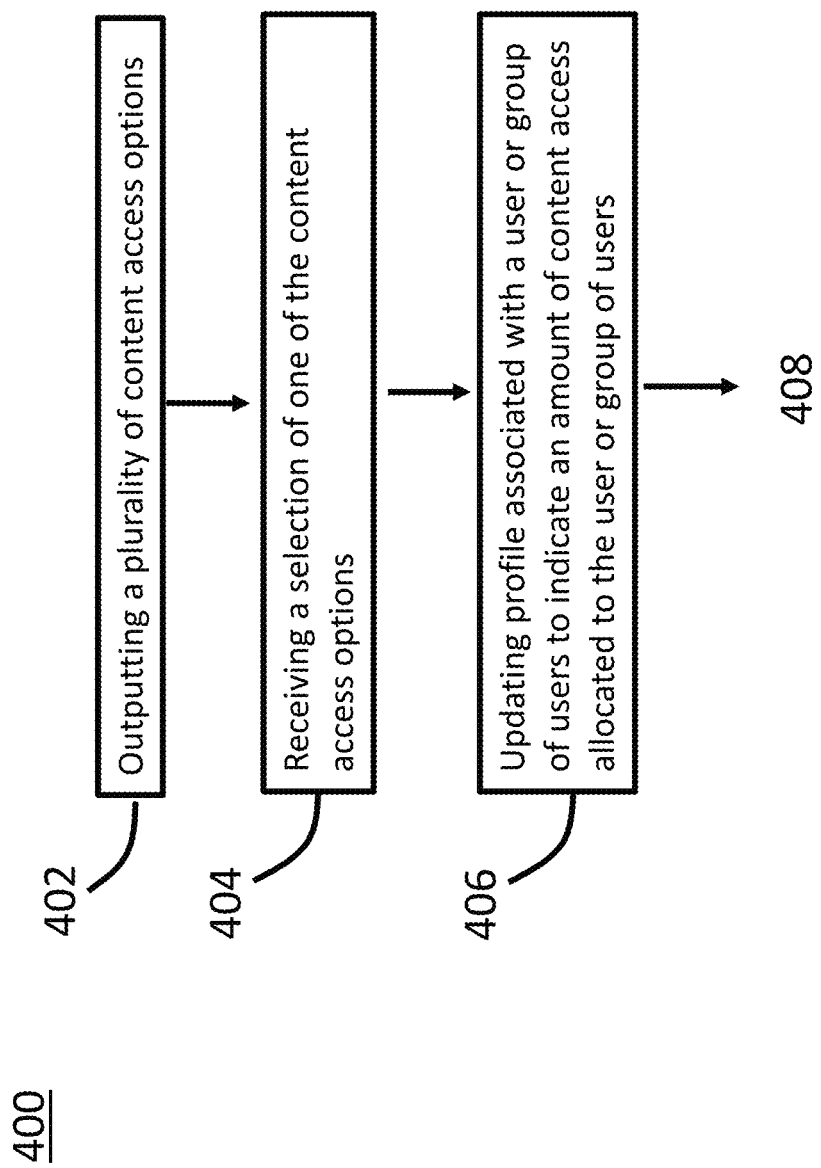
FIGS. 4A and 4B provide a flow diagram of an example method for providing access to a cybersecurity intelligence content source, according to an embodiment hereof.

As stated above, one aspect of the present disclosure relates to providing fractionalized access to cybersecurity intelligence content that is available from various cybersecurity intelligence content sources. FIG. 4A illustrates a flow diagram for an example method 400 which implements fractionalized access to cybersecurity intelligence content. The method 400 may be executed by, e.g., the cybersecurity analysis platform 110/210, or more specifically by at least one processing circuit (e.g., 212) of a computing system 111 that is providing or implementing the cybersecurity analysis platform 110/210. In some instances, the method 400 may performed when the at least one processing circuit 212 executes instructions stored on the non-transitory computer-readable medium 214 of the computing system 211, such as the instructions in the cybersecurity analysis module 216 and/or the content access module 218. In some scenarios, the method 400 may be performed by the computing system 211 as part of providing web-based services of the cybersecurity analysis platform 110/210.

In an embodiment, the method 400 may begin with or more generally include a step 402, in which the cybersecurity analysis platform 110/210, or more specifically the computing system 211 while executing, e.g., the content access module 218, outputs a plurality of content access options. The plurality of content access options may be associated with different amounts of content access to a cybersecurity intelligence content source, which may provide fractionalized access to the cybersecurity intelligence content source, by providing different options associated with different amounts or levels of access to the content source. As discussed below in more detail, the different amounts of content access may involve, e.g, different amounts of queries (also referred to as different quantities of queries) that may be used by a user or group of users to search for cybersecurity intelligence content in the content source, and/or different amounts of time for which the user or group of users has access to cybersecurity intelligence content in the content source. The user or group of users may operate one or more end user devices 140 (e.g., laptop, desktop, smartphone). In step 402, the cybersecurity analysis platform 110/210 may be configured to output the plurality of content access options by transmitting or otherwise communicating the content access options to at least one of the one or more end user devices 140 operated by the user or group of users.

Figure 5:
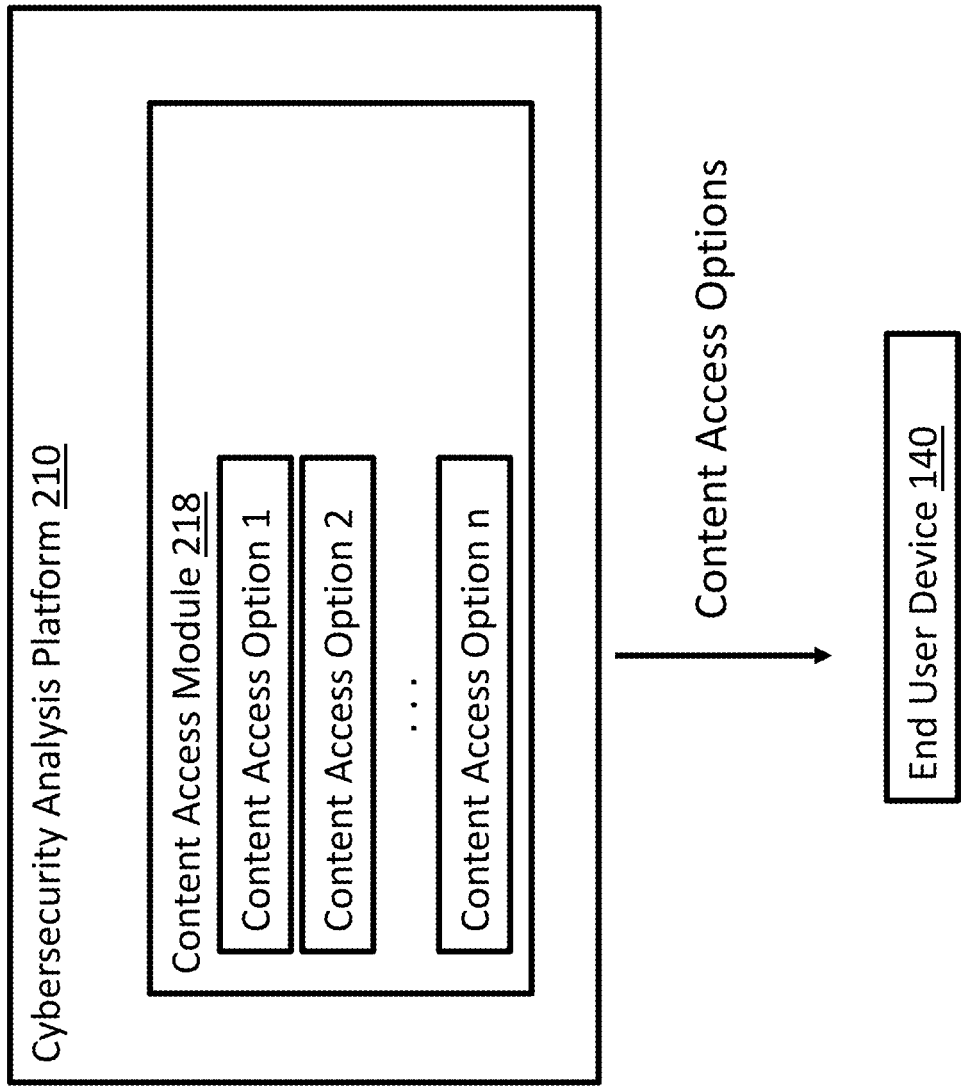
FIG. 5 provides an example of various content access options for selection by a user or group of users, according to an embodiment herein.

For example, FIG. 5 depicts an example in which the cybersecurity analysis platform 210 communicates, via a network or some other communication system, content access options 1 through n to the end user device 140. In this example, the content access options may be stored in the content access module 218, which may be configured to provide the content access options to the end user device 140. The module 218 may further be configured to later process a selection of one of the content access options. As stated above, the selected content access option may apply to a single user, or may apply to a group of users. The group of users may, e.g., belong to a common organization, such as a company or a department within the company. Some or all of the users may be, e.g., cybersecurity or information technology (IT) personnel, who may be users of the cybersecurity analysis platform 110/210. These users may be using the platform 110/210 as a tool to investigate cybersecurity threats relevant to the organization. These users may operate one or more end user devices, such as multiple laptops or phones belonging to the organization. In such an example, when a user in the organization interacts with the cybersecurity analysis platform 110/210 via at least one of the one or more end user devices, such as a first laptop, the platform 110/210 may in step 402 output content access options to at least one of the one or more end user devices, such as to the first laptop or a first phone. When at least one of the one or more end user devices receives the plurality of content access options from the cybersecurity analysis platform 110/210, the receiving end user device may display the plurality of content access options, so that a selection of the content access options may be made by the user of the platform 110/210, or by one of the group of users of the platform 110/210.

As stated above, the plurality of content access options may be associated with different amounts of content access to a particular cybersecurity intelligence content source (e.g., a content source operated by an entity such as Recorded Future). In an embodiment, content access to a particular cybersecurity intelligence content source may refer to, e.g., retrieving certain pieces of cybersecurity intelligence content from the cybersecurity intelligence content source. In some cases, the cybersecurity intelligence content may be retrieved in response to a request for content, which may also be referred to as a content request or content access request. For example, the request may include a query that identifies various search criteria. The cybersecurity analysis platform 110/210 may retrieve, from the cybersecurity intelligence content source, cybersecurity intelligence content which matches the search criteria in the query. In this example, submission of a content request that queries for or otherwise accesses cybersecurity intelligence content in the cybersecurity intelligence content source may be considered part of accessing or otherwise using the cybersecurity intelligence content source.

In an embodiment, the plurality of content access options for a cybersecurity intelligence content source may refer to, e.g., how many times a user or group of users can access the cybersecurity intelligence content source. In some cases, each time a user submits a content request, which may be a request (e.g., query) for cybersecurity intelligence content in a particular cybersecurity intelligence content source, the submission of the request may be considered an individual instance of accessing the cybersecurity intelligence content source, regardless of whether the content request leads to any results (e.g., any query results). In such cases, the amount of content access associated with the plurality of content access options may refer to, e.g., an amount of queries or other content requests which a user or group of users may submit to the cybersecurity analysis platform 110/210 to access cybersecurity intelligence content in the cybersecurity intelligence content source. In some cases, a submission of a query or other content request may not be counted as an instance of accessing the cybersecurity intelligence content source if the content request fails to yield any results (e.g., fails to yield any query results). In such cases, the submission of the content request may be counted as an instance of accessing the cybersecurity intelligence content source only if the content request yields a search result, wherein the search result may include cybersecurity intelligence content which satisfies one or more criteria specified in the content request.

Figure 6A:
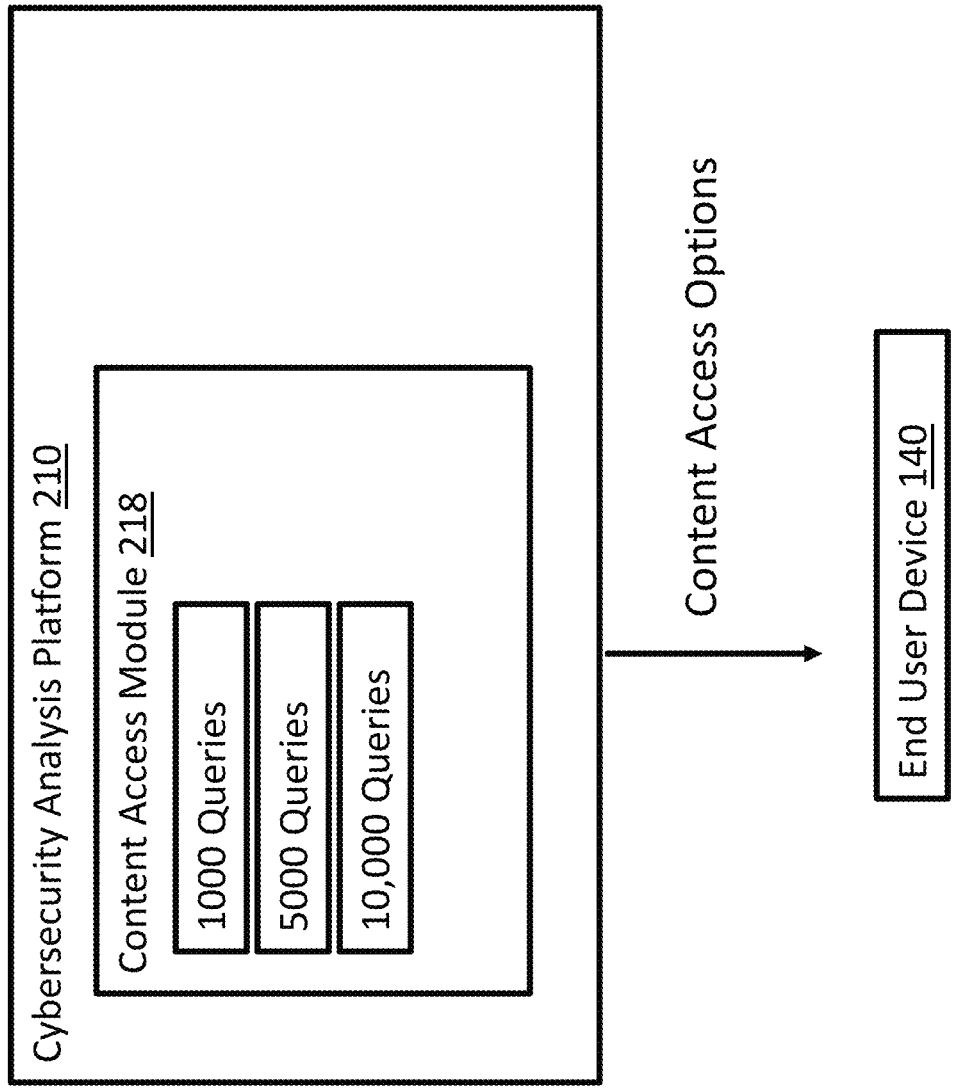
FIGS. 6A-6C provide examples of various content access options for selection by a user or group of users, according to an embodiment herein.

As stated above, a content request may in some implementations include or be made via a query which identifies one or more search criteria that specifies a particular piece of cybersecurity intelligence content being sought from the cybersecurity intelligence content source. In such an example, the plurality of content access options may identify different quantities of content requests that, if selected by a user, would be allocated to the user or the user's group (e.g., to all users in the group, or to specific users in the group). For instance, FIG. 6A depicts an example in which the content access options allow a user to select one option from among the following options: being allocated 1000 queries for accessing a particular cybersecurity intelligence content source, being allocated 5000 queries for accessing the content source, or being allocated 10,000 queries for accessing the content source. The user may select the option for himself or herself, on behalf of a group of users, or on behalf of a specific set of users within the group.

Figure 6B:
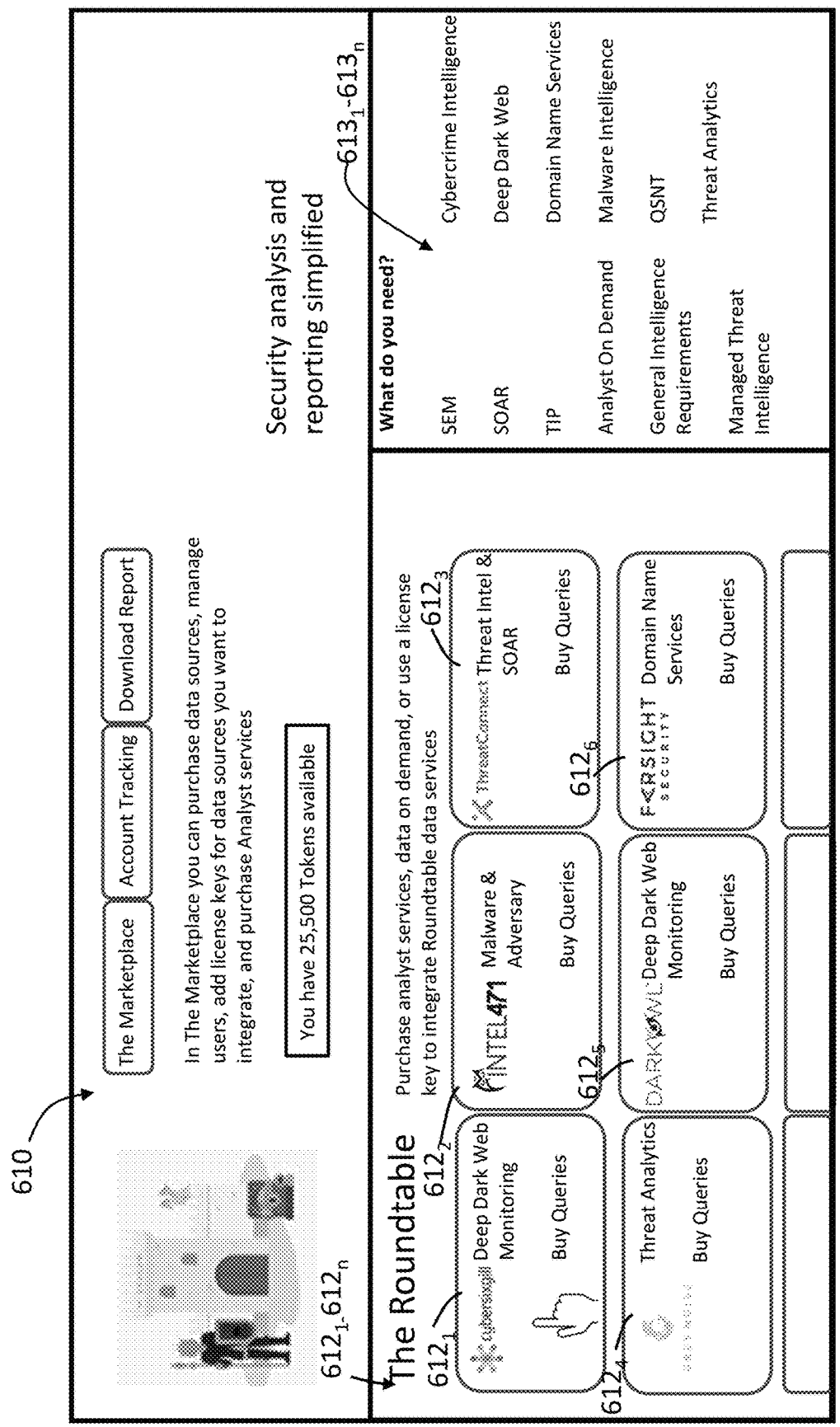
Figure 6C:
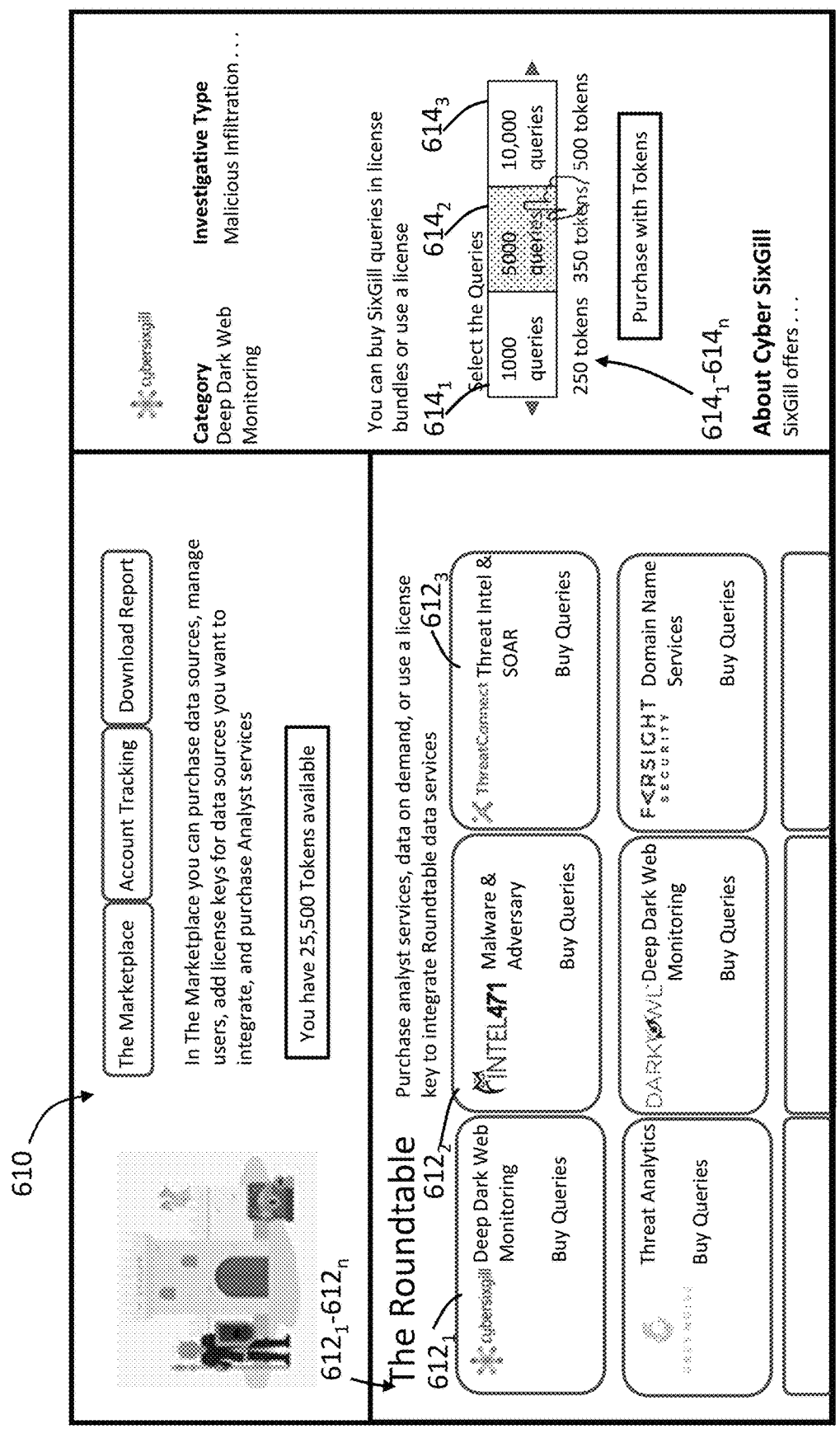

FIGS. 6B and 6C depict a more specific example in which the content access options involve different numbers of queries which can be allocated to a user or group of users. More particularly, FIGS. 6B and 6C illustrate an example user interface 610 which may be displayed on the end user device 140, wherein the information that is displayed may have been received from the cybersecurity analysis platform 110/210. For instance, the user interface 610 may be a web page that is displayed on a web browser executing on the end user device 140 (e.g., a laptop), wherein information for the web page, such as a plurality of content access options, may be received from the platform 110/210. The user interface 610 may, e.g., display labels $612_1$-$612_n$ which represent various cybersecurity intelligence content sources that are accessible via the cybersecurity analysis platform 110/210. In the example of FIGS. 6B and 6C, the labels $612_1$-$612_n$ include a first label $612_1$ for a first cybersecurity intelligence content source (e.g., a content source provided or operated by SixGill Ltd.), a second label $612_2$ for a second cybersecurity intelligence content source (e.g., a content source provided or operated by Intel 471 Inc.), and a third label $612_3$ for a third cybersecurity intelligence content source (e.g., a content source provided or operated by ThreatConnect, Inc.). As illustrated in FIG. 6B, the labels $612_1$-$612_n$ may include additional labels $612_4$ through $612_6$ for other cybersecurity intelligence content sources. The labels $612_1$-$612_n$ may represent content sources which may be hooked to the cybersecurity analysis platform 110/210. In some cases, the cybersecurity analysis platform 110/210 may output or otherwise communicate, to the end user device 140, a list of cybersecurity intelligence content sources that are accessible via the platform 110/210. The list may include, e.g., logos or other images representing the content sources, descriptions of what content is available from the content sources, or other information regarding the content sources. The end user device 140 may generate the labels $612_1$-$612_n$ based on the list or other information from the cybersecurity analysis platform 110/210. FIG. 6B further illustrates filters $613_1$-$613_n$ which a user may select from to filter which content sources will be presented on the user interface 610 via the labels FIG. 6C illustrates the user interface 610 displaying a plurality of content access options $614_1$-$614_n$ associated with a first cybersecurity intelligence content source, which is represented by the label $612_1$. More specifically, the user interface 610 may display a first content access option $614_1$ in which 1000 queries are allocated to a user or group of users for accessing the first content source, a second option $614_2$ in which 5000 queries are allocated to the user or group of users for accessing the first content source, and a third option $614_3$ in which 10,000 queries are allocated to the user or group of users for accessing the first content source. If the user or group of users already have a preexisting number of queries (e.g., 110 queries) that are available to them on the cybersecurity analysis platform 110/210 (e.g., as a result of a previous selection of one of the content access options), the content access options $614_1$-$614_n$ may represent additional queries that can be allocated to the user or group of users (e.g., 1,000 additional queries; 5,000 additional queries; or 10,000 additional queries). In some instances, the plurality of content access options $614_1$-$614_n$ that are displayed on the user interface 610 may be the content access options that are output by the cybersecurity analysis platform 210 in FIG. 6A (e.g., as part of step 402 of the method 400). In such instances, the end user device 140 that is generating the user interface 610 may receive the plurality of content access options $614_1$-$614_n$ from the cybersecurity analysis platform 110/210, and display or otherwise present the plurality of content access options $614_1$-$614_n$ so that a user may select one of the content access options. As discussed below in more detail with respect to FIG. 10A, the cybersecurity analysis platform 110/210 may track a content request balance that indicates how many allocated content requests remain available for the user or group of users to access a particular content source. If the content request balance is greater than zero, such that a positive number of allocated content requests remain available for the user or group of users to access the content source, the cybersecurity analysis platform 110 may accept a new content request from the user or group of users for accessing the content source.

FIGS. 6B and 6C further depict a tokenized framework used for acquiring content access associated with the content access options $614_1$-$614_n$. More specifically, the cybersecurity analysis platform 110/210 (or, more particularly, the computing system providing the platform) may associate a user or group of users with a token balance, which may be a balance that indicates an amount of virtual tokens that are available to be used by the user or group of users. As depicted in FIGS. 6B and 6C, the cybersecurity analysis platform 110/210 may communicate this balance to an end user device 140 (e.g., 25,500 virtual tokens), and the end user device 140 may display this balance on the user interface 610. The virtual tokens may represent, e.g., a form of virtual currency that is used on the cybersecurity analysis platform 110/210 to exchange for a certain amount of content access. For example, FIG. 6C depicts a scenario in which the option of 1000 queries can be selected in exchange for 250 virtual tokens, the option of 5000 queries can be selected in exchange for 350 virtual tokens, and the option of 10,000 queries can be selected in exchange for 500 virtual tokens. In some scenarios, the platform 110/210 may increase the balance of virtual tokens associated with a user or group of users in exchange for other physical currency or digital currency at a particular exchange rate. In some cases, the amount of virtual tokens for which the cybersecurity analysis platform 110/210 will exchange for a particular amount of content access may be the same for all users or groups of users of the platform 110/210.

Figure 7A:
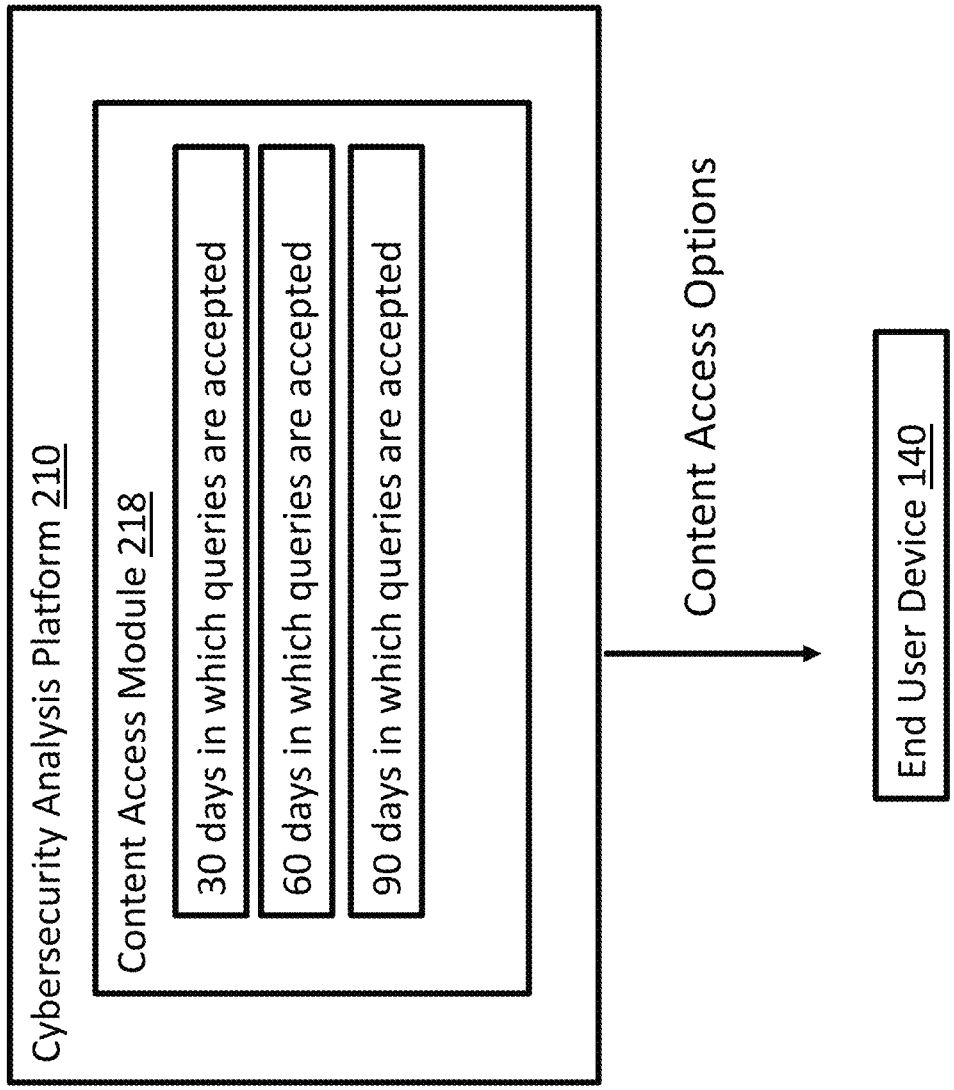
FIGS. 7A and 7B provide an example of various content access options for selection by a user or group of users, according to an embodiment herein.

In an embodiment, the plurality of content access options involved in step 402 may involve different amounts of time that, if selected by a user, will be allocated to the user or a group to which the user belongs (e.g., to all users in the group, or to specific users in the group) to access a particular content source. In this embodiment, an amount of time may refer to a time duration, such as a duration of hours, days, weeks, or months. As an example, FIG. 7A depicts an example in which the cybersecurity analysis platform 210 (or, more specifically, a computing system providing the platform 210) outputs a plurality of content access options which include a first option in which a duration of 30 days is allocated to a user or group of users for accessing a particular cybersecurity intelligence content source, a second option in which a duration of 60 days is allocated to the user or group of users, and a third option in which a duration of 90 days is allocated to the user or group of users for accessing the cybersecurity intelligence content source. If a user or group of users already have a preexisting time duration (e.g., 5 days) that is available to them on the cybersecurity analysis platform 210 for accessing the cybersecurity intelligence content source, the content access options in this example may refer to additional days that can be allocated to the user or group of users (e.g., 30 additional days, 60 additional days, or 90 additional days). The content access options may be outputted to an end user device 140 as, e.g., a list of different time durations, and may be represented in, e.g., a text format, an image format, or some other format. As discussed below in more detail with respect to FIG. 10A, the cybersecurity analysis platform 110/210 may track a time duration balance that indicates how much time duration remains available for the user or group of users to access a particular content source. If the time duration balance is greater than zero, such that content access to the content source has not yet expired, the cybersecurity analysis platform 110 may accept a new content request from the user or group of users for accessing the content source. If the time duration balance is zero, the platform 110/210 may reject a new query.

Figure 7B:
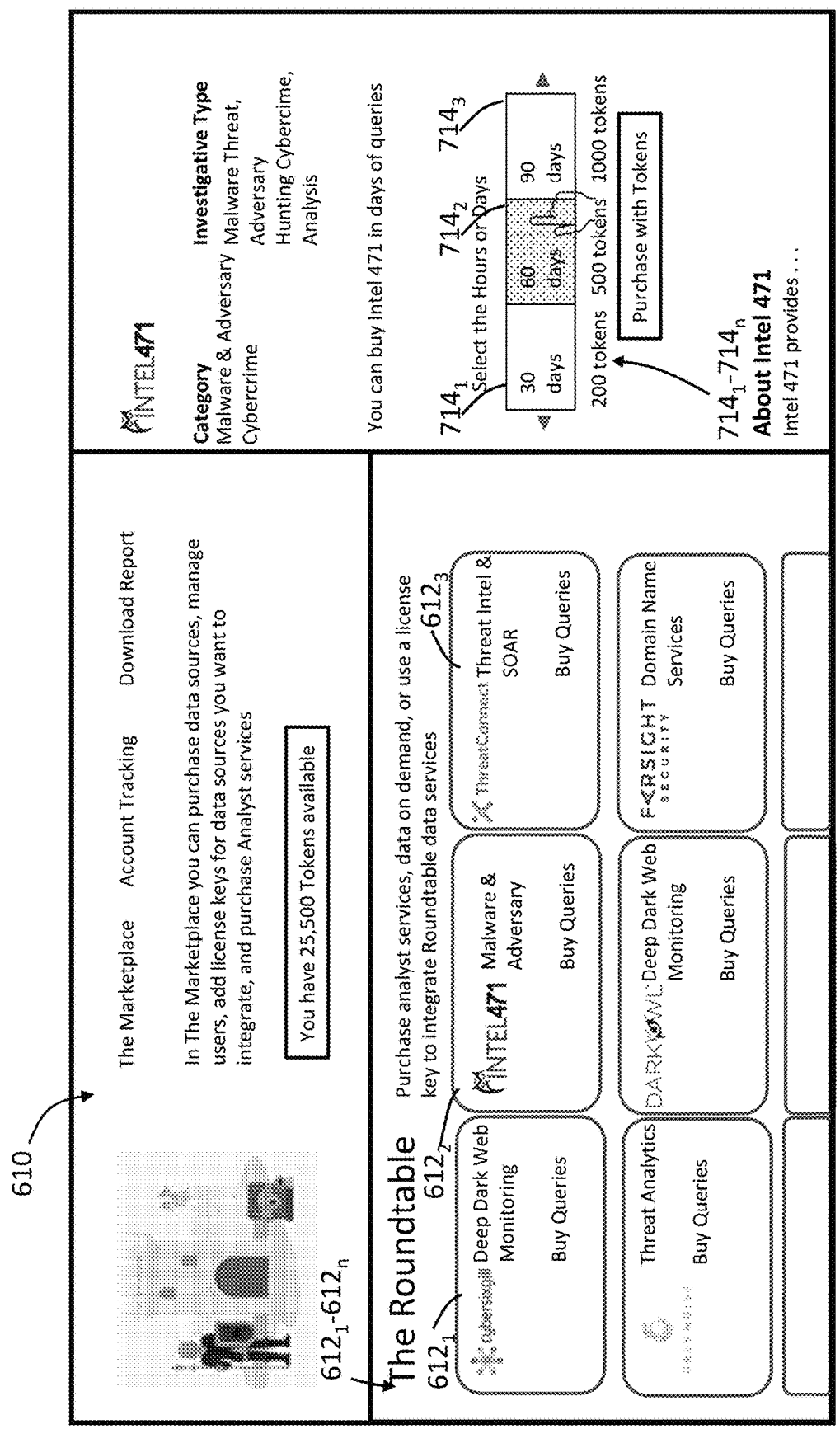

FIG. 7B depicts a more specific example involving the content access options of different time durations. The figure depicts the user interface 610 displaying a plurality of content access options $714_1$-$714_n$ that identifies different time durations in which a second cybersecurity intelligence content source associated with the label $612_2$ (e.g., content source operated by Intel 471 Inc.) can be accessed. The content access options $714_1$-$714_n$ may be, e.g., those transmitted to the end user device 140 from the cybersecurity analysis platform 210 in FIG. 7A. The content access options $714_1$-$714_n$ may more specifically identify different time durations during which a content request for accessing the second cybersecurity intelligence content source will be accepted by the cybersecurity analysis platform 210. As discussed above, a user or group of users already have a preexisting time duration that is allocated to them by the platform 210 for accessing the second content source, then the plurality of content access options $714_1$-$714_n$ may refer to additional time durations that will increase a total time duration that is allocated to the user or group of users for accessing the second content source. Like in FIGS. 6B and 6C, the content access options $714_1$-$714_n$ of FIG. 7B may be selected in exchange for virtual tokens.

In an embodiment, the plurality of content access options may identify different tiers of cybersecurity intelligence content that would be accessible by a user or a group of users. For instance, the cybersecurity intelligence content in a cybersecurity intelligontent source may be divided into different tiers, such as a basic tier which includes only a portion of the cybersecurity intelligence content available in the cybersecurity intelligence content source, a middle tier which includes a larger set of the cybersecurity intelligence content available in the cybersecurity intelligence content source, and a premium tier that includes all of the cybersecurity intelligence content available in the cybersecurity intelligence content source. In this example, if virtual tokens are used to select the various tiers, the lower tiers (e.g., the basic tier) may be selectable in exchange for a lower amount of virtual tokens, while a higher tier (e.g., premium tier) may be selectable in exchange for a higher amount of virtual tokens.

In an embodiment, the plurality of content access options may identify different types of cybersecurity intelligence content that would be accessible by a user or a group of users. In some cases, the different types of content may be associated with different types of investigations. For example, a cybersecurity investigation involving adversary analysis may involve using a different type of content (e.g., content in the content source operated by Dark Owl or Spy Cloud) than content used for a cybersecurity investigation involving illicit or illegal activities and transactions occurring on the deep dark web. Such an example may allow a user or group of users to select a content type which is most suitable to a particular investigation. In such an embodiment, the plurality of content access options may provide access to a selected type of cybersecurity intelligence content in a specific cybersecurity intelligence content source, or may provide access to the selected type of cybersecurity intelligence content in multiple cybersecurity intelligence content sources.

In an embodiment, the plurality of content access options may identify different time periods in which a user or group of users may access a particular cybersecurity intelligence content source. The different time periods may refer to, e.g., specific time periods in a day, specific time periods in a week, specific time periods in a month, or specific time periods in a year. In one example, the content access options may include a first option that provides access to a particular cybersecurity intelligence content source in a time period from 9 AM to 5 PM everyday, and a second option that provides access in a time period from 5 PM to 10 PM everyday. In one example, the content access options may include a first option that provides access to a particular cybersecurity intelligence content source in a time period from Monday to Friday every week, and a second option that provides access on Saturday and Sunday every week.

Figure 8:
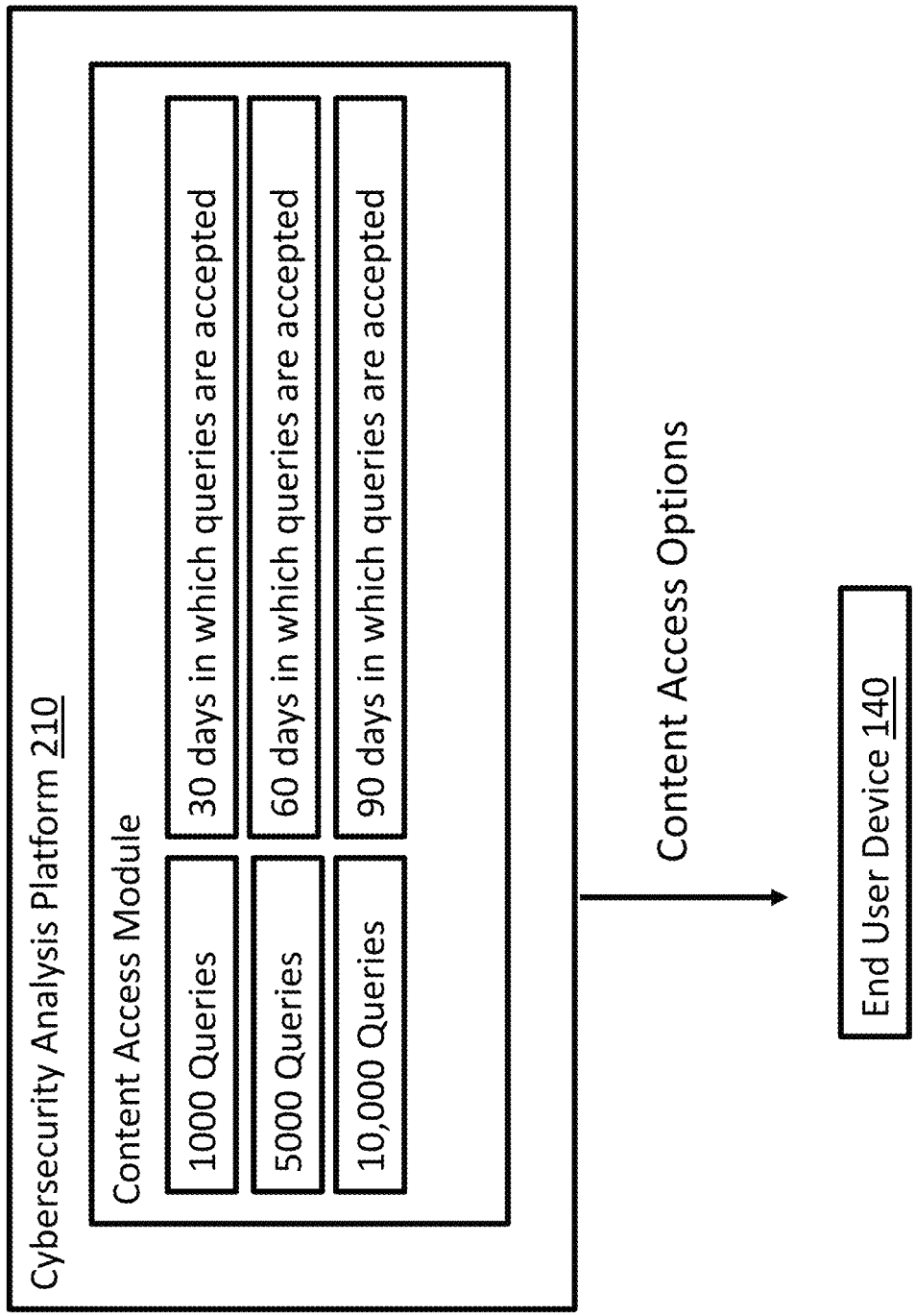
FIGS. 8 and 9A provide an example of various content access options for selection by a user or group of users, according to an embodiment herein.

In some cases, the various content access options discussed above may be combined. For instance, FIG. 8 depicts a scenario in which the plurality of at least six content access options that are output by the cybersecurity analysis platform 210 may identify both various quantities of content requests (e.g., queries) that can be allocated to a user or group of users, and various time durations which can be allocated to the user or group of users (wherein content requests are accepted by the cybersecurity analysis platform 210 before an expiration of the allocated time duration). As discussed above, the content access options may provide fractionalized access to a cybersecurity intelligence content source, by providing different options associated with different amounts or different levels of access to the content source.

In some implementations, a set of content access options may be applicable to multiple cybersecurity intelligence content sources, or more specifically to all cybersecurity intelligence content sources with which the cybersecurity analysis platform 110/210 can communicate. As an example, the platform 110/210 may provide the content access options illustrated above (e.g., in FIGS. 7A and 7B) for accessing a first cybersecurity intelligence content source, and may provide the same content access options for accessing a second cybersecurity intelligence content source.

Figure 9A:
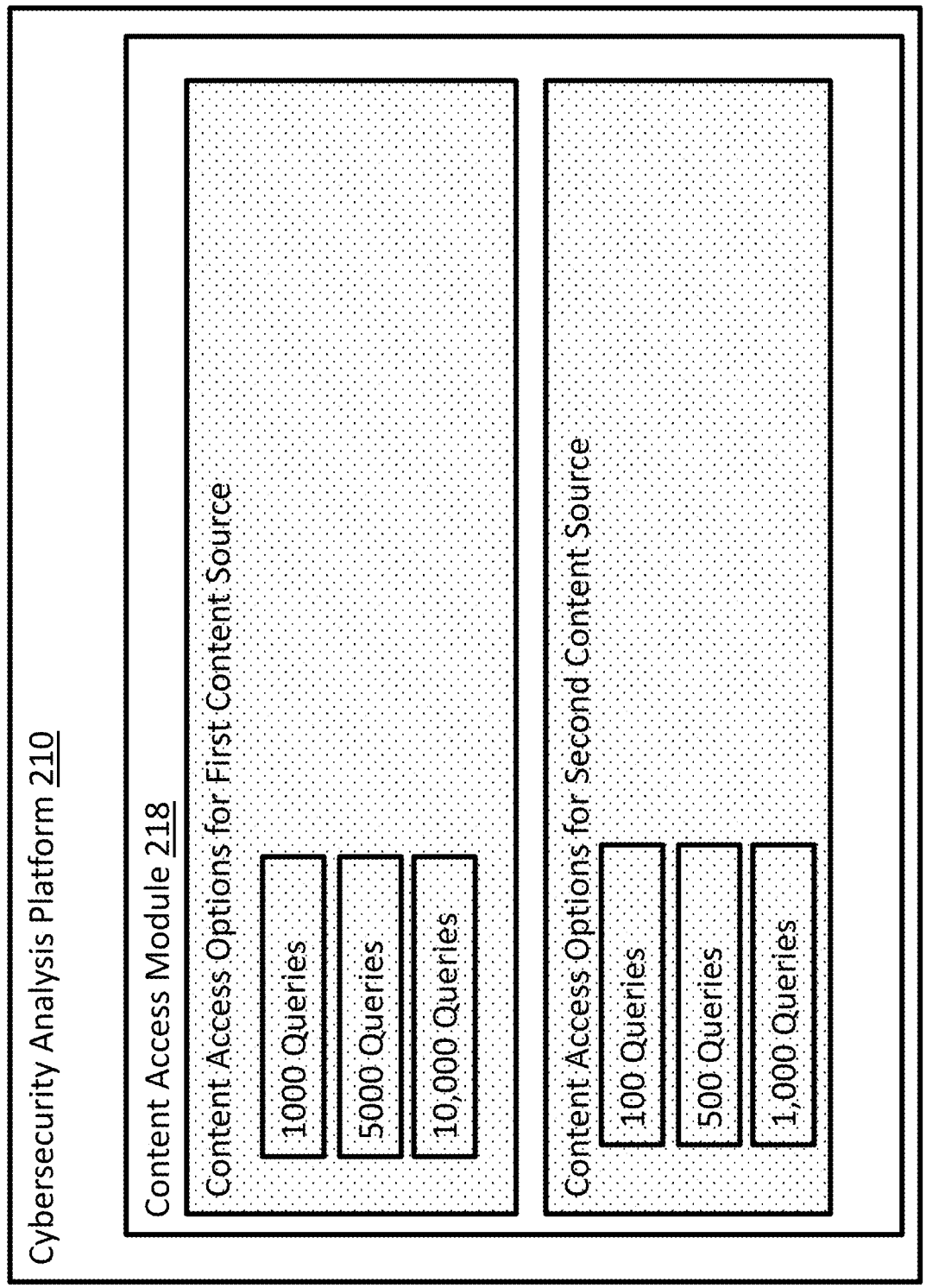

In some implementations, different sets of content access options may be used for different cybersecurity intelligence content sources. For instance, FIG. 9A depicts an example in which the cybersecurity analysis platform 210 is configured to output a first plurality of content access options for accessing a first cybersecurity intelligence content source by a user or group of users, and is configured to output a second plurality of content access options for accessing a second cybersecurity intelligence content source by the user or group of users. In this example, the second plurality of content access options for the second content source may allow the user or group of users to select a smaller quantity of queries (e.g., 100 queries and 500 queries) relative to the quantity of queries associated with content access options for the first content source. In some cases, the different sets of content access options may provide more flexibility in how various content sources are accessed, and/or in how much virtual tokens or other resources are needed to acquire access to the various content sources.

In the example of FIG. 9A, after the platform 210 outputs the first plurality of content access options and/or the second plurality of content access options to an end user device, a user operating the end user device may have to make a first selection to be allocated a first amount of content access (e.g., 1000 queries) for accessing the first cybersecurity intelligence content source, and may have to make a second selection to be allocated a second amount of content access (e.g., 500 queries) for accessing the second cybersecurity intelligence content source.

In another example, the plurality of content access options may relate to a particular content type that is available across multiple cybersecurity intelligence content sources. In this example, a selection by a user or group of users may allocate an amount of content access to that type of content regardless of which of the multiple cybersecurity intelligence content sources would be accessed to retrieve that content. For instance, the plurality of content access options may present various amounts of content access (e.g., 1000 queries, 2000 queries, 7500 queries) for accessing content that relates to illicit activities on the deep dark web, wherein the content may include multiple pieces of content from different cybersecurity intelligence content sources (e.g., three different content sources). In this example, when a user selects one of the content access options (e.g., 1000 queries) for a particular type of cybersecurity intelligence content, that user or a group to which the user belongs may be allocated a corresponding amount of content access to that type of cybersecurity intelligence content in all of the multiple cybersecurity intelligence content sources. In such an example, a single content request (e.g., query) relating to that type of content may cause the cybersecurity analysis platform 110/210 to retrieve relevant content (if any) from each of the multiple cybersecurity intelligence content sources.

While the above discussion relates to content access options, the cybersecurity analysis platform 110/210 may be configured to alternatively or additionally output a plurality of service access options which are associated with different amounts of access for a cybersecurity service (e.g., on-demand cybersecurity service). The service may be provided by a cybersecurity analyst, a cybersecurity company, or some other service provider. As some examples, the cybersecurity service may include, e.g., a consultation service in which a cybersecurity analyst answers questions from the user or group of users, an analysis service such as a network penetration testing service, a service that provides intelligence program support, or any other cybersecurity service. In some implementations, the cybersecurity service may be an on-demand service. For instance, the cybersecurity service may include a cybersecurity analyst answering, in real-time, questions from the user or group of users relating to a cybersecurity investigation, or providing real-time consultation regarding the cybersecurity investigation. The platform 110/210 may be configured to provide a way in which the cybersecurity service can be procured on a fractional basis, in which a user or group of users can select how much of the cybersecurity service to procure, by selecting from among different amounts of access to the cybersecurity service. For example, if the cybersecurity service involves a consultation service from a cybersecurity analyst, the different amounts of access may refer to, e.g., different amounts of time (also referred to as time duration) that may be allocated by the analyst for researching and/or answering the questions from the user or group of users, different amounts of time that may be allocated by the analyst for providing consultation services to the user or group of users, different numbers of questions that may be allocated to the user or group of users for submission to the analyst, and/or different quantities of consultation sessions that may be allocated to the user or group of users for accessing the analyst. When the platform 110/210 receives a selection of one of the service access options, it may be configured to update a profile to indicate an amount of access allocated to the user or group of users for accessing the cybersecurity service. An example of such profiles are discussed with respect to FIG. 10A. In some cases, the service access feature may be integrated with the content access feature, which may allow the cybersecurity services provider (e.g., cybersecurity analyst) to also use the cybersecurity analyst platform 110/210 to research questions from the user or group of users and to provide the services discussed above.

In an embodiment, the cybersecurity analysis platform 110/210 may be configured to generate and output a recommendation to be presented to a user or group of users for which content access option should be selected by the user or group of users. Such a recommendation may be based on, e.g., a type of cybersecurity investigation being conducted by the user or group of users, or more specifically a virtual workspace which will be associated with threat intelligence content. In some instances, the recommendation may be based on past usage of various content sources. The past usage may be indicated by content source usage information that is tracked by the cybersecurity analysis platform 110/210, as discussed below in more detail.

Returning to FIG. 4A, the method 400 may include a step 404, in which the cybersecurity analysis platform 110/210 receives a selection of one of the content access options, wherein the selection is made from among the plurality of content access options of step 402. For example, step 404 may occur when a user or group of users make a selection on any end user devices (e.g., a first laptop) operated by the user or group of users. This end user device may also be referred to as at least one of one or more end user devices operated by the user or group of users. The selection may be received by the cybersecurity analysis platform 110/210 (or, more specifically, by the computing system providing the platform) via the network 150 of FIGS. 1A-1C. In one example, the user or group of users may select a content access option that provides 5000 additional queries for accessing the content source associated with label $612_1$ of FIGS. 6B and 6C, or select a content access option that provides 60 additional days for accessing the content source associated with label $612_2$. In one example, if the content access options in step 402 include different tiers of content access, different types of content, or different time periods in which a content source is accessible, the selection may identify which tier, which type of content, or which time period is selected. The selection may be made via the user interface 610, after which the end user device 140 may communicate to the cybersecurity analysis platform 110/210 an indication of which option was selected. Then, in step 404, the cybersecurity analysis platform 110/210 may receive the selection from the end user device 140.

In an embodiment, the method 400 may further include a step 406, in which the cybersecurity analysis platform 110/210 updates, based on the selection of step 404, a profile associated with the user or group of users. In an embodiment, the profile for a user or group of users may include a content access policy associated with the user or group of users. The content access policy may indicate, e.g., at least one of: an amount of content access allocated to the user or group of users for accessing the cybersecurity intelligence content source; a tier of content access allocated to the user or group of users for accessing the cybersecurity intelligence content source; a type of cybersecurity intelligence content that the user or group of users is able to access from the cybersecurity intelligence content source, or a time period in which the user or group of users is able to access the cybersecurity intelligence content. In some instances, step 406 may update the profile by updating the content access policy. If the content access policy indicates the amount of content access allocated to the user or group of users for accessing a particular cybersecurity intelligence content source, step 406 may update the profile to indicate this amount of allocated content access. This amount may be a cumulative value which is increased each time a user selects a quantity of queries or selects a number of days during step 404. For example, if the user selects a content access option that involves 5,000 queries or 60 days of content access, the cumulative value may be increased by 5,000 queries or increased by 60 days.

In an embodiment, this cumulative value for step 406 may indicate a total amount of content access that has been allocated to a user or group of users, and may be independent of how much usage of the content access has occurred, and/or independent of how much the previously allocated content access has depreciated due to passage of time. For example, if a user or group of users selects, at a first point in time, a content access option for 1,000 queries, and then later selects a content access option for 5,000 additional queries, the total amount of content access which has been allocated to the user or group of users for a content source, since a first point in time, may be 6,000 queries, regardless of how much the content access has been used since that first point in time. As another example, if a user selects, at a first point in time, a content access option for 30 days, and then later selects a content access option for 90 additional days, the total amount of content access which has been allocated to the user or group of users for a content source, since the first point in time, may be 120 days, regardless of how much time has elapsed since the first point in time.

In an alternative embodiment, the cumulative value for step 406 may be a balance that indicates how much content access is currently allocated to a user or group of users. The cumulative value in this embodiment by track content usage and/or depreciation of content access. More particularly, this balance may be decreased to track usage of previously allocated content access, or to track depreciation of previously allocated content access, wherein the depreciation may occur due to passage of time, so as to indicate how much content access currently remains available to the user or group of users for accessing a content source. For example, the cumulative value may be a content request balance that is increased when a certain number of queries (e.g., 5,000 queries) associated with a content access option in a content source is selected as part of step 404, and is decreased each time a query is later used to search for cybersecurity intelligence content in the content source. Decreasing the cumulative value, such as by decrementing the cumulative value by 1, may indicate how many queries remain available to the user or group of users. In another example, the cumulative value may be a time duration balance that is increased when a certain time duration (e.g., 60 days) associated with a content access option for a content source is selected as part of step 404, and is decreased as each day elapses, to indicate depreciation of the previously allocated time duration, and to indicate how many days of access remain available to the user or group of users for accessing the content source.

Figure 9B:
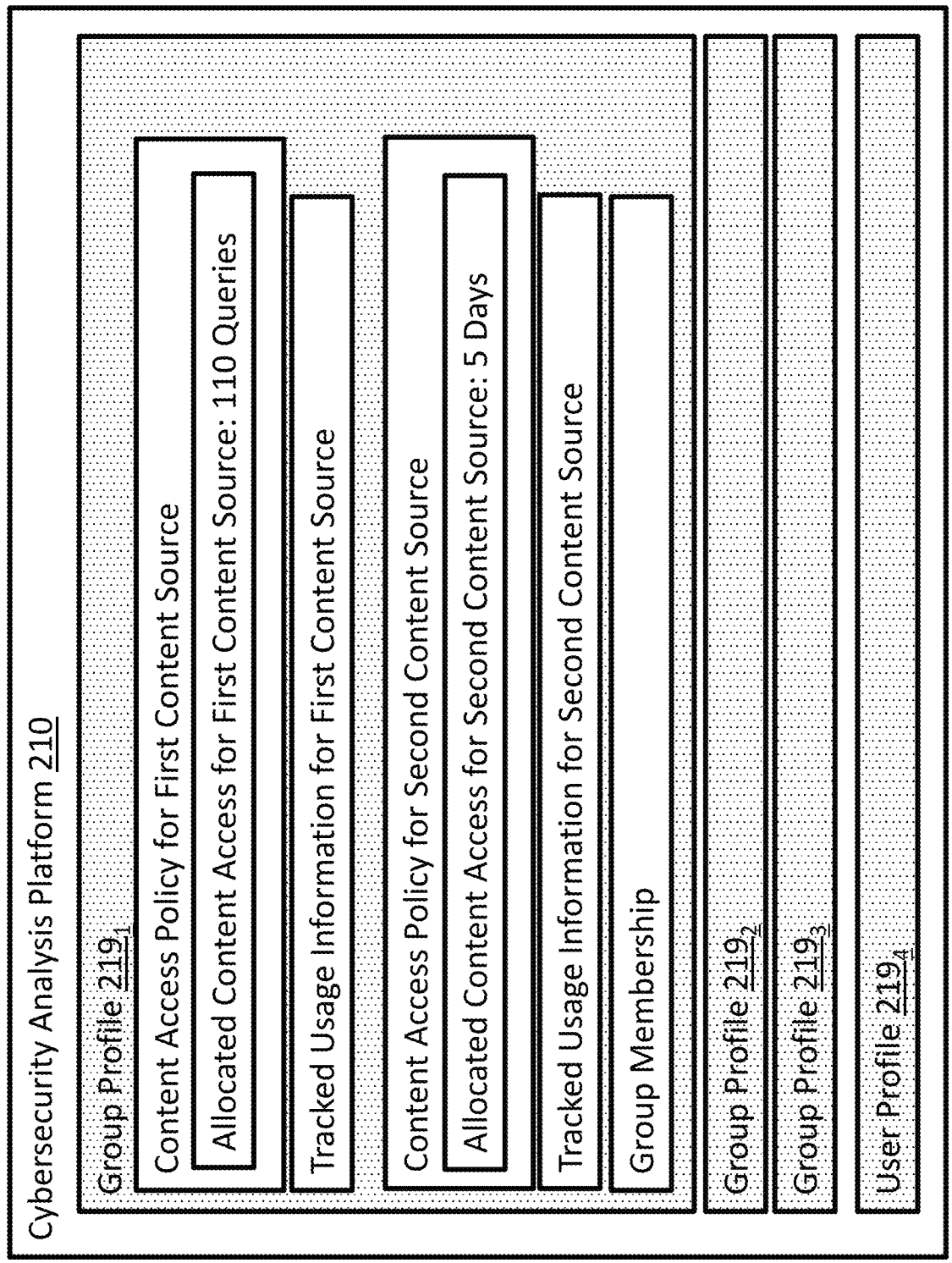
FIGS. 9B and 10A provides an example of a profile for indicating a content access policy, or more specifically an amount of content access allocated to a user or group of users, according to an embodiment herein.
Figure 10A:
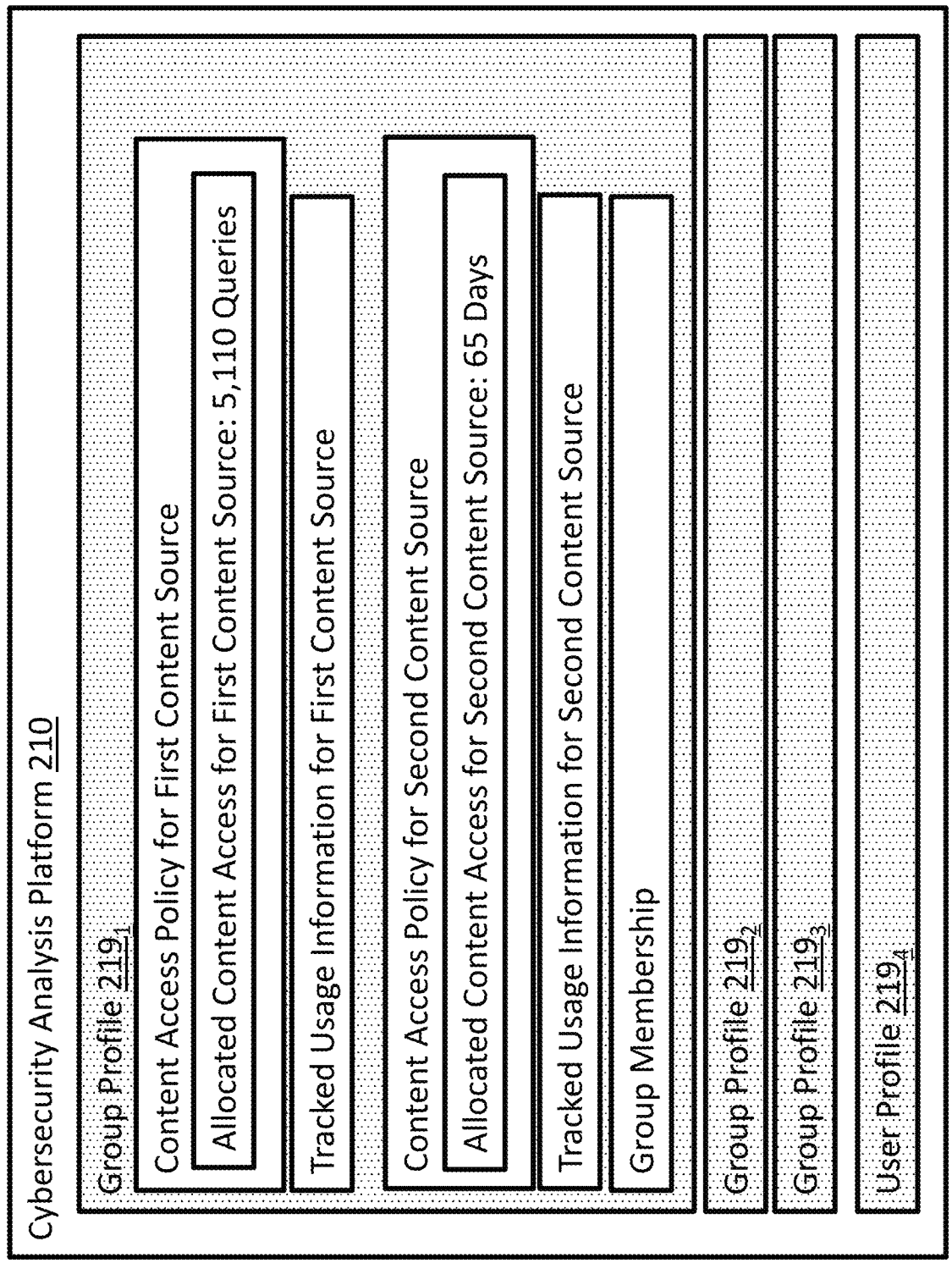

FIGS. 9B and 10A illustrate an example of the embodiment involving the cumulative value that tracks an amount of content access currently allocated to a user or group of users. In this example, a group profile $219_1$ tracks a cumulative value that indicates how much content access is currently allocated to a user or group of users, also referred to as an allocated amount of content access. FIG. 9B may illustrate the cumulative value at an earlier point in time, before the user has selected the 5,000 queries of content access in FIG. 6C or before the user has selected the 60 days of content access in FIG. 7B. At this earlier point in time, the amount of content access allocated to the user or group of users for accessing the first content source may have been depleted to 110 queries, while the amount of content access allocated to the user or group of users for accessing the second content source may have been depleted (or, more specifically, depreciated) to 5 days.

The group profile $219_1$ in this example may be for a group of users. In some cases, the group may refer to an association of multiple users, such as a company or a department within the company (e.g., an information technology or information security department). In such cases, the content access may be allocated to the group, such as to the company or the department within the company. The group profile $219_1$ may identify membership of the group. More generally, the group profile $219_1$ may describe a content access policy for the first content source. The content access policy may describe the amount of content access allocated to the user or group of users for accessing the first content source, as illustrated in FIGS. 9B and 10A, or a tier of cybersecurity intelligence content allocated for the user or group of users to access from the first content source, a type of cybersecurity intelligence content allocated to the user or group of users to access from the first content source, and/or a time period in which the first content source is accessible to the user or group of users.

FIG. 10A illustrates an example of the group profile $219_1$ after it is updated with the selection of FIGS. 6C and 7B. In the example of FIG. 10A, the profile $219_1$ may indicate an amount of content access currently allocated to a user or group of users. More specifically, the profile $219_1$ may include a content request balance which indicates how many content requests are currently allocated to the user or group of users for accessing a first cybersecurity intelligence content source, and may include a time duration balance that indicates how much time duration is currently allocated to the user or group of users for accessing a second cybersecurity intelligence content source. The content request balance may be increased when the user or group of users selects a content access option so as to be allocated additional content requests. For instance, as illustrated in FIG. 10A, after the user or group of users selects a content access option for 5,000 queries, the content request balance may be increased from 110 queries to 5,110 queries. In some implementations, each time a user or group of users uses a query to access the first cybersecurity intelligence content source, the platform 110/210 may indicate depletion of the amount of allocated content access by decreasing a value of the content request balance (e.g., by decrementing the value from 5,110 queries to 5,109 queries). The time duration balance may be increased when the user or group of users selects a content access option so as to be allocated additional time duration to access the content source. For instance, as illustrated in FIG. 10A, after the user or group of users selects a content access option for 60 days, the time duration balance may be increased from 5 days to 65 days. In some implementations, as each day passes, the platform 110/210 may indicate depreciation or other depletion of the amount of allocated content access by decreasing a value of the time duration balance (e.g., decrementing the balance from 65 days to 64 days).

As discussed in more detail below, the group profile $219_1$ may also be used to track a total amount by which the first content source and the second content source have been used. More specifically, the profile $219_1$ may store tracked usage information, also referred to as content source usage information, that describes how much the user or group of users have used the first content source, or how much the user or group of users have used the second content source. Using a particular content source may include accessing the content source, such as by submitting a query to search for content in the content source. In an embodiment, the cybersecurity analysis platform may provide a cybersecurity investigation service or other service to multiple groups, such as multiple companies or departments. In such an embodiment, the platform may track a group profile for each of the groups, such as group profiles $219_1$, $219_2$, and $219_3$ in FIG. 10A. In an embodiment, the above example involving a group profile (e.g., $219_1$) may also apply to a user profile for an individual user, such as user profile $219_4$ in FIG. 10A. In such an instance, an amount of content access indicated in the user profile $219_4$ may be allocated specifically to an individual user rather than to a group of users.

Figure 10B:
FIG. 10B provides an example of a profile for indicating which users have permission to use an allocated amount of access to a particular cybersecurity intelligence content source.
Figure 10C:
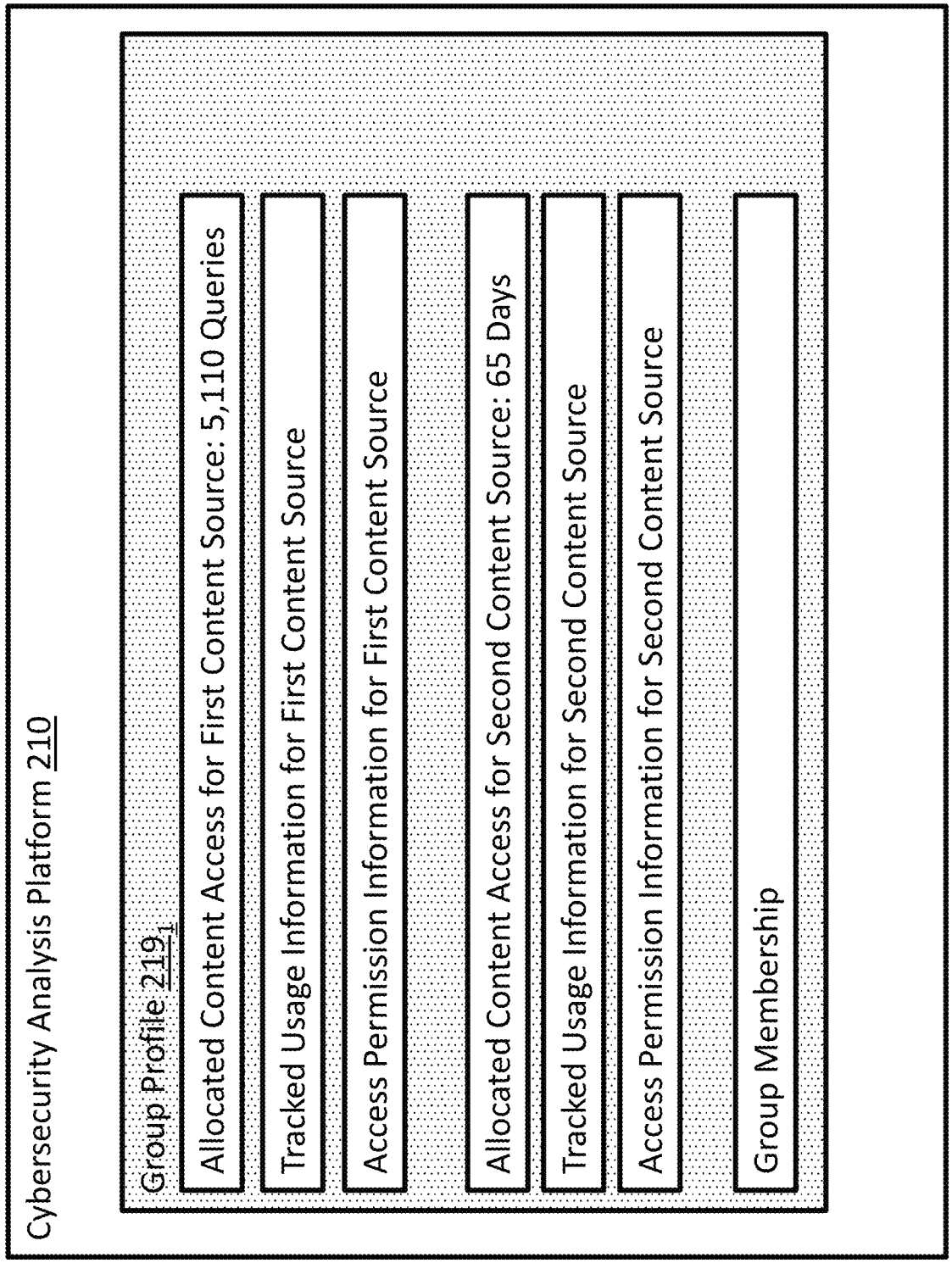
FIG. 10C provides an example of a profile for indicating an amount of content access allocated to a user or group of users, and for indicating which users have permission to use an allocated amount of access, according to an embodiment herein.

In an embodiment, if content access for a cybersecurity intelligence content source is allocated to a group of users, the cybersecurity analysis platform 110/210 may receive, from a device operated by one of the group of users, an indication of which user(s) in the group have access to the cybersecurity intelligence content source. For example, an administrative user in the group may select a content access option for a particular cybersecurity intelligence content source, and further identify a set of users in the group who are permitted to query or otherwise access the cybersecurity intelligence content source. In this example, the end user device operated by the administrative user may generate information which identifies this set of users who are permitted to access the cybersecurity intelligence content source, and communicate this information (e.g., a list of user identifiers) to the cybersecurity analysis platform 110/210. For instance, FIG. 10B depicts a specific example that represents which users from among a group of users are permitted to access various cybersecurity intelligence content sources (e.g., a content source operated by Anomali, a content source operated by Farsight Security, etc.). In an embodiment, the cybersecurity analysis platform 110/210 may update a group profile, such as the group profile $219_1$ in FIG. 10C, to indicate which users are permitted to access a particular cybersecurity intelligence source. More specifically, the group profile $219_1$ may include access permission information for indicating which user(s) in the group are permitted to access various cybersecurity intelligence content sources.

Figure 4B:
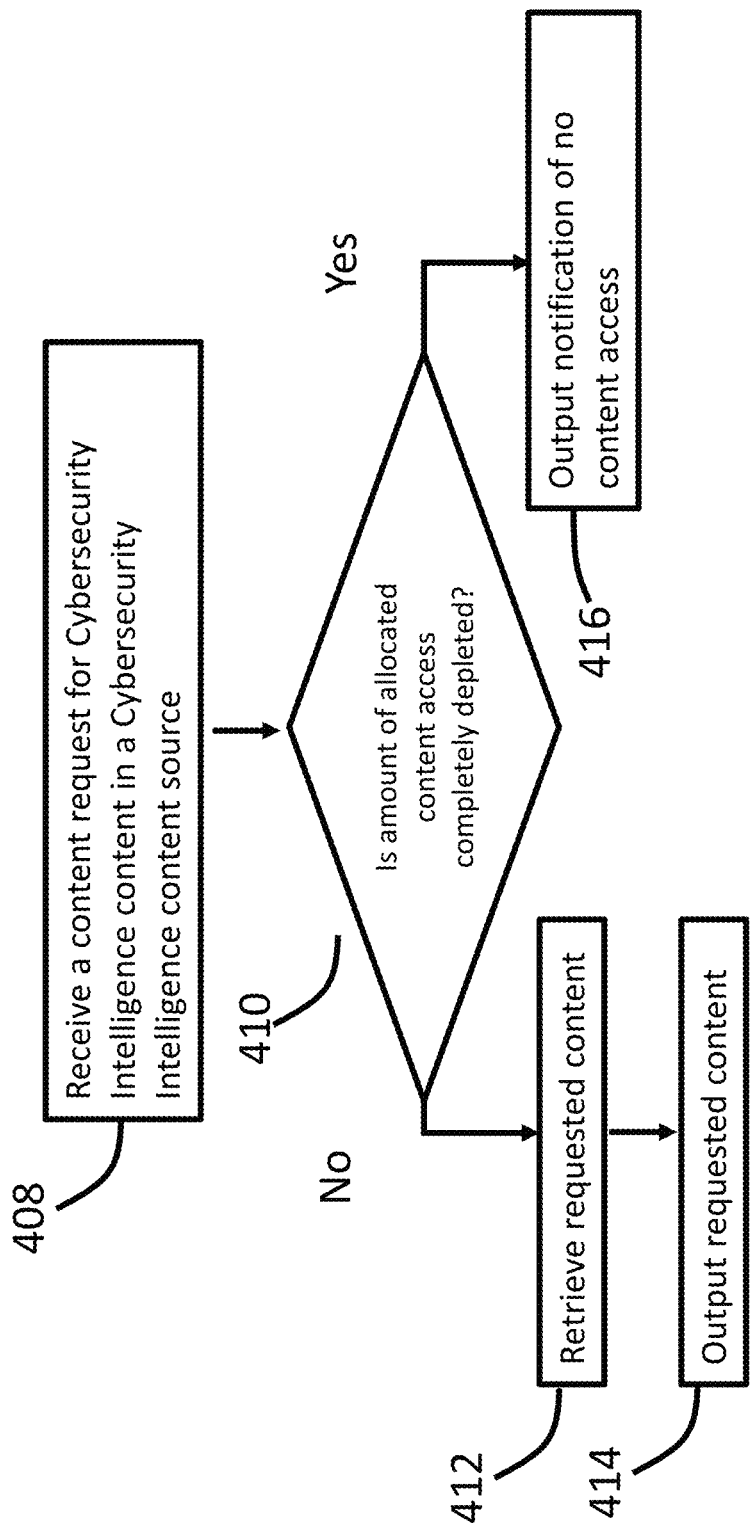

Referring to FIG. 4B, the method 400 may in an embodiment include a step 408, in which the cybersecurity analysis platform 110/210 receives a content request for cybersecurity intelligence content in a particular cybersecurity intelligence content source. The content request may be received from any end user device (e.g., laptop computer or desktop computer) operated by the user or group of users associated with steps 402 and 404. That is, the request may be received from at least one of one or more end user devices operated by the user or group of users. In some cases, the content request may be received after a content access option has been selected by the user or group of users, and after a profile (e.g., $219_1$) associated with the user or group of users has been updated in step 406 to reflect the selection. As an example, step 408 may occur, e.g., 10 days after step 406 is performed.

In an embodiment, the content request may include a request to access the particular cybersecurity intelligence content source, such as a request to access certain cybersecurity intelligence content from the cybersecurity intelligence content source. In some cases, the request may include a query to search for cybersecurity intelligence content which matches certain criteria, such as relevance to a particular keyword or to a particular subject matter. In some instances, the query may seek cybersecurity intelligence content that belongs to one or more of the following categories: cybersecurity intelligence information regarding malware or threat actors linked to the malware; information regarding indicators of comprise (IoCs) or indicators of attack (IoAs); information on activities occurring on the deep dark web; and information on Internet infrastructure, such as information regarding describing an IP address associated with a cybersecurity threat (e.g., which entity is the IP address registered to, or when was the IP address registered to the entity). As an example, the query from a user or group of users may search for cybersecurity intelligence content that is related or otherwise relevant to a particular web domain associated with a cybersecurity threat, or a particular IP address associated with a cybersecurity threat. In some implementations, a content request may include a query for any of the following types of information: information on a threat actor associated with a cybersecurity threat; information on an IoA or an IoC; information associated with TTP's associated with a cybersecurity threat; information specifically regarding a piece of malware; information which provides more generally a set of characteristics (e.g., a fingerprint) of a cybercrime or threat actor; information regarding theft of personal identity information or financial information; or a report regarding a cybersecurity risk.

Figure 11:
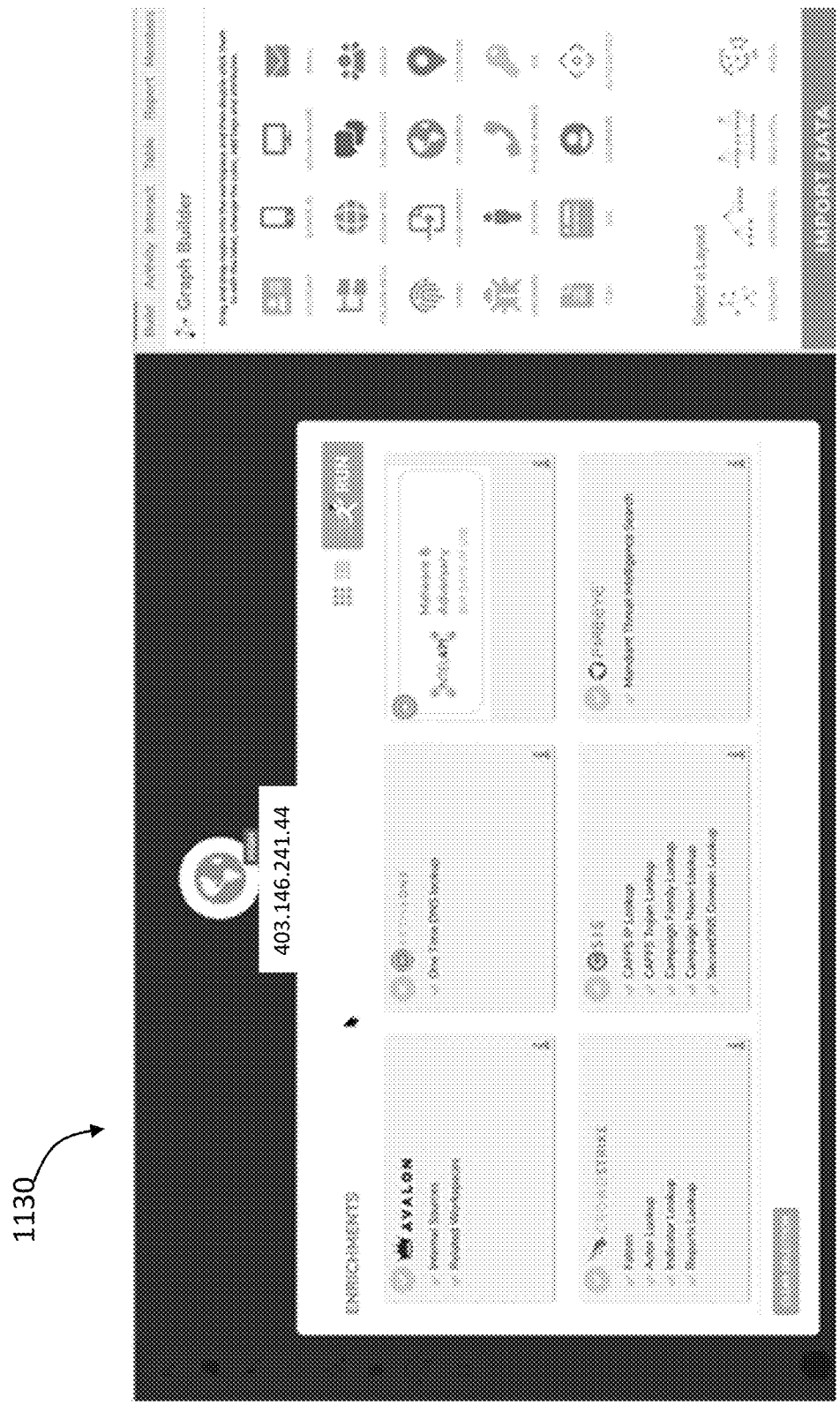
FIG. 11 provides an example of a user interface for submitting a query from a user's device to a cybersecurity analysis platform, wherein the query is for cybersecurity intelligence content in a cybersecurity intelligence content source, according to an embodiment herein.

FIG. 11 provides an example in which a user may generate and submit a content request to the cybersecurity analysis platform 110/210. More particularly, the figure illustrates a user interface 1130 that is generated based on information provided via the cybersecurity analysis platform 110/210. For instance, the user interface 1130 may be provided via a web browser on an end user device (e.g., 140)

operated by a user or group of users. The cybersecurity analysis platform may, e.g., communicate to the end user device 140 various pieces of threat intelligence content to the user's device, such as an IP address or domain name associated with a cybersecurity threat. The user interface 1130 on the user's device 140 may display, e.g., a representation of those pieces of cybersecurity intelligence content. For instance, FIG. 11 depicts a user interface 1130 displaying a graph node which represents a piece of cybersecurity intelligence content, such as an IP address that is associated with a cybersecurity threat, or that is more generally part of a cybersecurity investigation. In some cases, the cybersecurity analysis platform 110/210 may already store a graph or other representation of the cybersecurity intelligence content, and may directly output that representation, such as a description of the graph and its nodes, to the user's device 140 for display on the user interface 1130.

In the example of FIG. 11, the user interface 1130 may be used to submit a content request to search a cybersecurity intelligence content source for cybersecurity intelligence content that is related to an existing piece of cybersecurity intelligence content, such as the depicted IP address, associated with a cybersecurity threat. The existing piece of content may have been previously retrieved by the platform 110/210 from a content source, or may have been manually inputted by a user. The content request may seek to enrich the existing piece of cybersecurity intelligence content by using the existing piece of cybersecurity intelligence content to find other pieces of related cybersecurity intelligence content. More particularly, the content request may seek to query or otherwise access a cybersecurity intelligence content source to search for additional cybersecurity intelligence content which is related to that IP address. As depicted in FIG. 11, the user interface 1130 may be used to select a cybersecurity intelligence content source to query (e.g., the content source operated by Intel 471 Inc.). After a user selects via the user interface 1130 a particular cybersecurity intelligence content source to access, the user's device 140 may generate a content request (e.g., query) based on the user's selection or other user input, and submit the content request to the cybersecurity analysis platform 110/210. The query or other content request may, e.g., indicate which cybersecurity intelligence content source was selected by the user to search, and/or include search criteria included with the user's query.

Returning to FIG. 4B, the method 400 may include a step 410 that occurs in response to receiving a content request. In step 410, the cybersecurity analysis platform 110/210 may determine whether the amount of content access allocated to the user or group of users for the cybersecurity intelligence content source of step 408 is completely depleted. The amount of content access may be completely depleted when, e.g., the user or group of users have used up all of the previously allocated quantities of queries for accessing the content source, and/or when all of the previously allocated time durations for the user or group of users to access the content source have expired.

Figure 12:
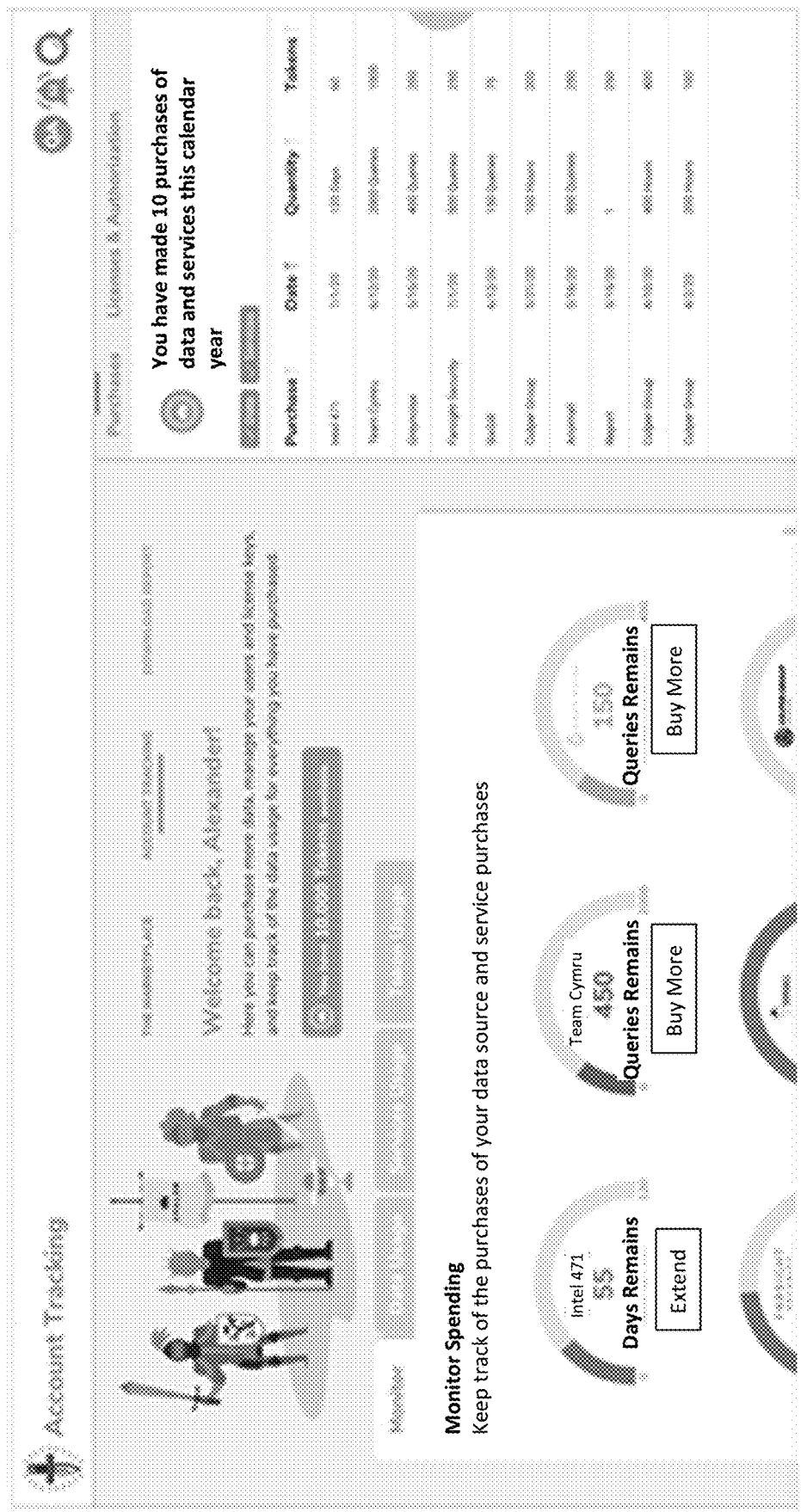
FIG. 12 provides an example of a user interface that displays various remaining amounts of content access, according to an embodiment hereof.

As stated above, the amount of content access allocated to the user or group of users may in one embodiment refer to the amount of content access currently allocated to the user or group of users. For instance, the amount of content access may refer to a value of the content request balance or the time duration balance. In such an instance, step 410 may involve determining whether the amount of content access currently allocated to the user or group of users is more than zero. For example, FIG. 12 depicts an example in which the cybersecurity analysis platform 110/210 may output, to an end user device 140 of a user or group of users, an indication that the time duration balance associated with the content source operated by Intel 471 Inc. is 55 days, such that 55 days of content access remain allocated to the user or group of users for accessing the content source. The platform 110/210 may further provide an indication that the content request balance associated with the content source operated by Team Cymru is 450 queries, such that 450 queries remain allocated to the user or group of users for accessing the content source. These balances may be displayed via a user interface on the end user device 140. In the above example, step 410 may involve determining whether the content request balance is more than zero, and/or whether the time duration balance is more than zero. In this example, if the amount of content access currently allocated to the user or group of users for accessing a content source is zero, or more specifically if the quantity of content requests currently allocated to the user or group of users is zero, then the amount of content access allocated to the user or group of users for the content source has been completely depleted. Similarly, if an amount of time duration currently allocated to the user or group of users for accessing a content source is zero days, then the amount of content access to the user or group of users for the content source has been completely depleted. If the quantity of content requests currently allocated to the user or group of users for the content source is greater than zero, or if the amount of time duration allocated to the user or group of users for the content source is greater than zero days, then the amount of content access allocated to the user or group of users for the content source has not been completely depleted.

As stated above, the amount of content access allocated to a user or group of users may in another embodiment track a total amount of content access previously allocated to the user or group of users since a predefined point in time, in a manner that is independent of how much the content access has been used, or independent of how much previously allocated content access has depreciated. For example, if a user or group of users selects a content access option for 1,000 queries at a first point in time, and then later selects a content access option to add 5,000 queries, the platform 110/210 in this example may track the amount of allocated content access as 6,000 queries, regardless of how much the content access has since been used. As another example, if a user selects, at a first point in time, a content access option for 30 days, and then later selects a content access option to add 90 days, the platform 110/210 in this example may track the amount of allocated content access as 120 days, regardless of how much time has passed since the first point in time. In such an embodiment, the tracked usage information of FIGS. 10A and 10C may track content source usage for a first content source and/or content source usage for the second content source. The content source usage in this example may indicate, e.g., a total number of queries or other content requests received from the user or group of users, since the first point in time, for accessing the first content source, or indicate a total number of queries or other content requests received from the user or group of users since the first point in time for accessing a second content source, and/or a total amount of time that has elapsed since the first point in time. In step 410 of this embodiment, the platform 110/210 may determine whether the amount of content access allocated to the user or group of users for accessing the first content source has been completely depleted by determining whether the total number of queries received from the user or group of users since the first point in time for accessing the first content source exceeds the total number of queries (e.g., 6,000) previously allocated to the user or group of users since the first point in time for accessing the first content source. Similarly, the platform 110/210 in this embodiment may determine whether the amount of content access allocated to the user or group of users for accessing the second content source has been completely depleted by determining whether the total time duration (e.g., 120 days) previously allocated to the user or group of users since the first point in time for accessing the second content source has expired. That is, the platform 110/210 may determine whether a total amount of elapsed time since the first point in time is greater than the total time duration previously allocated for accessing the second content source.

In an embodiment, the cybersecurity analysis platform 110/210 may further update the tracked usage information (also referred to as content source usage information) to count how many content requests have been received since a particular point in time. In some cases, the content request may be counted only if the content request yields requested content from a content source, such as if there is content in the content source that matches a query or other content request. In some cases, the content request may be counted regardless of whether the content request yields requested content from a content source, or regardless of whether the content request is unsuccessful in yielding results from the content source. If the content request for accessing a particular content source is counted, the tracked usage information may be updated by, e.g., incrementing a parameter which tracks a total number of successful queries or a total number of all queries submitted by the user or the group of users for accessing the content source. In an embodiment, the platform 110/210 may be configured to periodically (e.g., on a daily basis) increment a parameter which tracks a total number of days since a predefined point in time. The point in time may be, e.g., a start date during which the user or group of users had selected a content access option for a particular cybersecurity intelligence content source.

In an embodiment, if access to a cybersecurity intelligence content source can be limited to only some members of a group, the method 400 may further include a step in which the cybersecurity analysis platform 110/210 determines a user identifier associated with the content request, and whether a user associated with the user identifier has permission to access the cybersecurity intelligence content source. For example, the cybersecurity analysis platform 110/210 may be configured to store, as part of the Access Permission Information in the group profile of FIG. 10C, a list of one or more users or their corresponding user identifiers, such as those illustrated in FIG. 10B. The list may identify for which users the content requests are specifically allocated, or more generally identify which users have permission to access a cybersecurity intelligence content source. In such an example, the cybersecurity analysis platform 110/210 in step 410 may be configured to determine whether the user associated with the content request belongs to the list of users who have permission to access the cybersecurity intelligence content source.

In an embodiment, the method 400 may have a more general step 410 that involves determining whether accessing the cybersecurity intelligence content source, or more specifically using the content source to search for content specified by the content request, would exceed a content access policy associated with the user or group of users. If the user or group of users have been allocated an amount of content access to the content source, this step may involve determining whether the amount of allocated content access has been completely depleted, as discussed above. If the user or group of users have been allocated a tier of content access or a type of content, this step may involve determining whether the content request is searching for content that is within the allocated tier or that belongs to the type of allocated content. If the content being searched for is within the allocated tier or belongs to the type of allocated content, then the content request does not exceed the content access policy. If the user or group of users have been allocated a time period in which to access the content source, then this step may involve determining whether the content request is received within the allocated time period. If the content request is received within the allocated time period, then the content request does not exceed the content access policy.

Returning to FIG. 4B, the method 400 may include a step 412 that is performed in response to a determination that the content access policy is not exceeded, or more specifically in response to a determination that the amount of content access allocated to the user or users for accessing the cybersecurity intelligence content source of step 408 is not completely depleted. For instance, step 412 may be performed in response to a determination that content access to a particular content source (e.g., the content source operated by Intel 471 Inc. in FIG. 12) has not expired, because more than zero days remain currently allocated to the user or group of users for accessing the content source, and/or in response to a determination that a quantity of queries which remain currently allocated for accessing another content source (e.g., the content source operated by Team Cymru in FIG. 12) is more than zero. In such a situation, the cybersecurity analysis platform 110/210 may in step 412 retrieve, from one or both of the above cybersecurity intelligence content sources, cybersecurity intelligence content associated with the query or other content request. For instance, if the content request involves searching a particular cybersecurity intelligence content source to find content that is relevant to the IP address in FIG. 11, the cybersecurity analysis platform 110/210 may be configured to generate a query which is compatible with the cybersecurity intelligence content source, and which identifies the IP address as a search criterion. The cybersecurity analysis platform 110/210 may be configured to communicate the query to the second or third cybersecurity intelligence content source, and to receive a result of the query from the second or third cybersecurity intelligence content source.

Figure 13A:
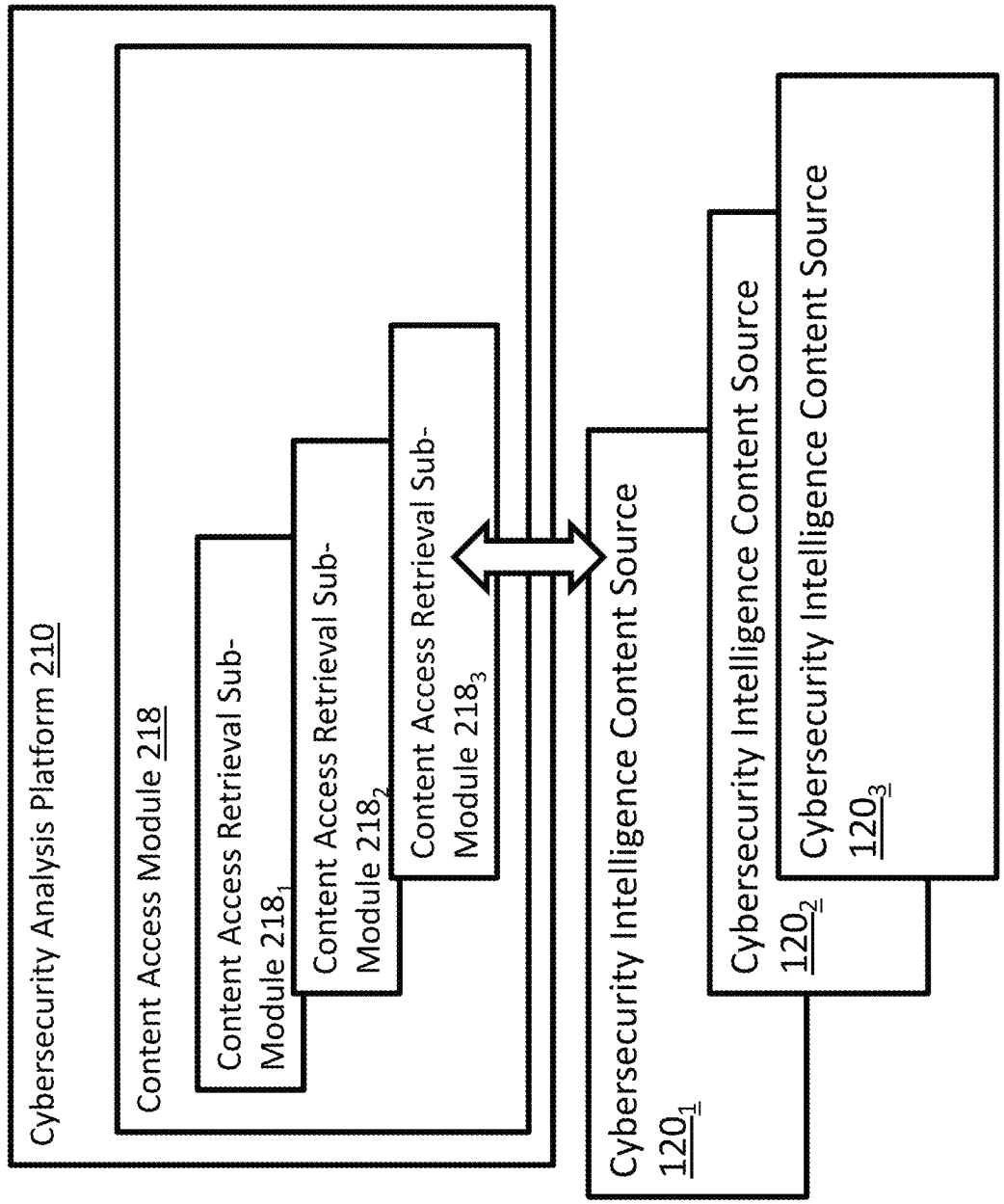
FIGS. 13A-13C illustrate various sub-modules of a cybersecurity intelligence platform for communicating with cybersecurity intelligence content source.

As stated above, the cybersecurity analysis platform 110/210 may have the capability to interface with many different cybersecurity intelligence content sources. For example, FIG. 13A depicts an example in which the content access module 218 of the cybersecurity analysis platform 210 has different sub-modules for interfacing with different cybersecurity intelligence content sources. More particularly, the content access module 218 may include a content access retrieval sub-module $218_1$ for querying and retrieving content from the cybersecurity intelligence content source $120_1$; a content access retrieval sub-module $218_2$ for querying and retrieving content from the cybersecurity intelligence content source $120_2$; and a content access retrieval sub-module $218_3$ for querying and retrieving content from the cybersecurity intelligence content source $120_3$.

Figure 13B:
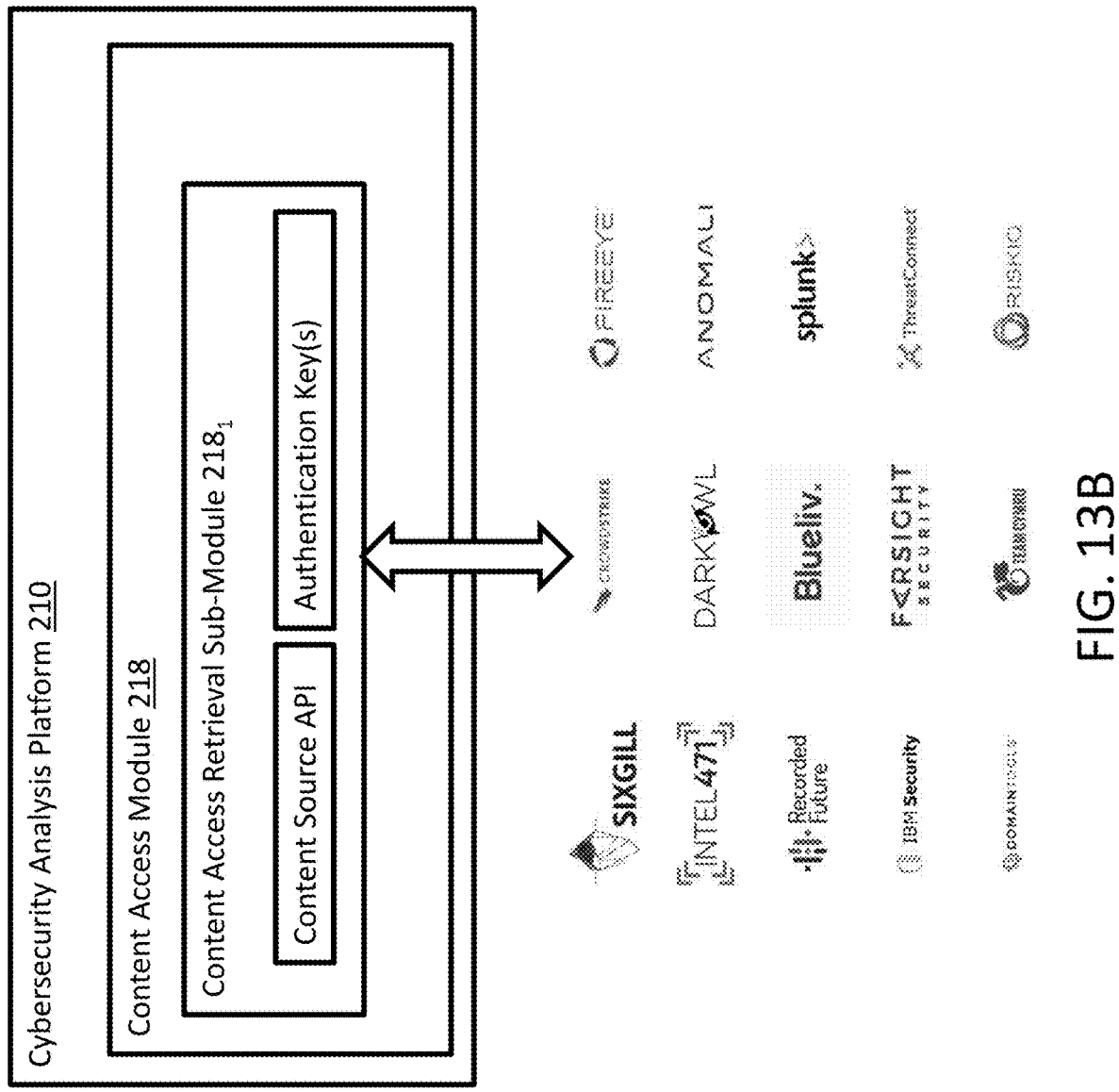
Figure 13C:
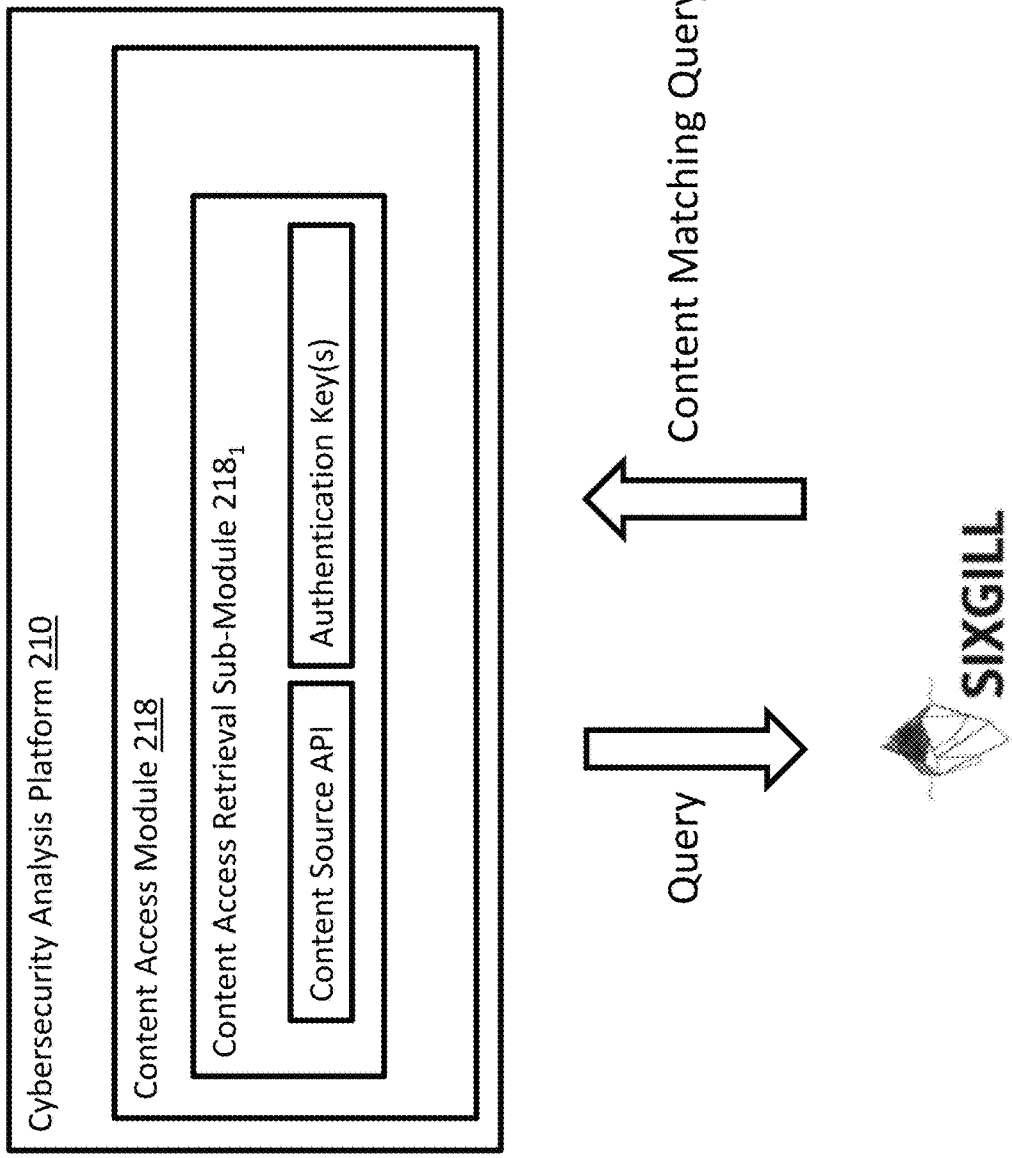

FIG. 13B provides a more specific example in which the content access retrieval sub-module $218_1$ implements an application programming interface (API) for accessing one of the cybersecurity intelligence content sources (e.g., for accessing a content source operated by SixGill Inc.), and includes one or more authentication keys for accessing the content source. As illustrated in FIG. 13C, the content access retrieval sub-module $218_1$ may generate a query having an appropriate format or protocol for a corresponding cybersecurity intelligence content source, communicate the query to the cybersecurity intelligence content source, and receive a result that includes cybersecurity intelligence content which satisfies various search criteria of the query.

In the above embodiment, the cybersecurity analysis platform 210 may thus provide an interface between a user or group of users and the many different cybersecurity intelligence content sources, which may streamline or otherwise simplify how the user or group of users procure access to the many different cybersecurity intelligence content sources. In acting as the interface between the users and the content sources, the platform 210 may implement many different API's and store different authentication information for accessing the different cybersecurity intelligence content sources. The cybersecurity analysis platform 210 may thus significantly reduce the technical challenge involved in accessing many different cybersecurity intelligence content sources, and significantly increase a speed by which any of the cybersecurity intelligence content sources can be procured or otherwise accessed.

In an embodiment, the cybersecurity intelligence content may include information pertaining to any of the following: a threat actor, malware, an IoC, an IoA, a TTP relating to a cybersecurity threat, a report on cyberintelligence risk, a fingerprint regarding cybersecurity crime, or information regarding exposure of information to theft.

Figure 14A:
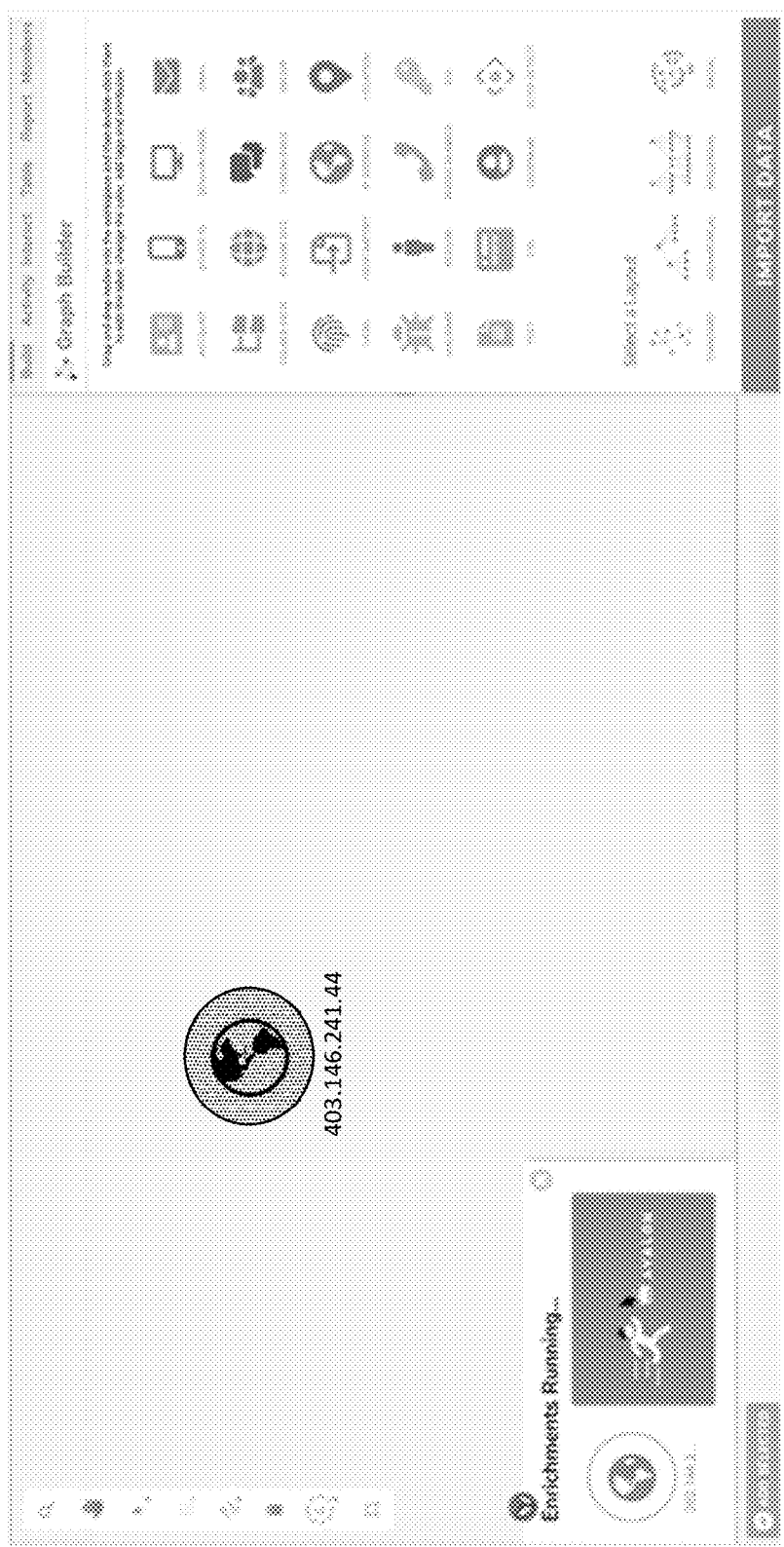
FIGS. 14A and 14B illustrates a user interface displaying various pieces of cybersecurity intelligence content as enlarged nodes of a graph, according to an embodiment herein.
Figure 14B:
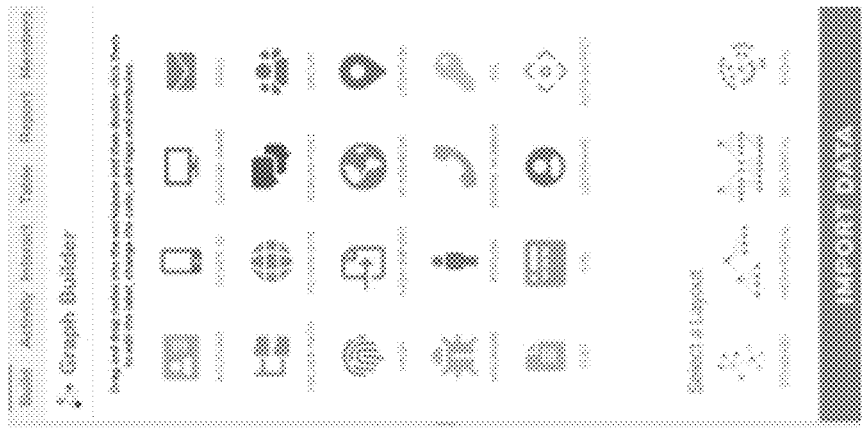
Figure 14B:
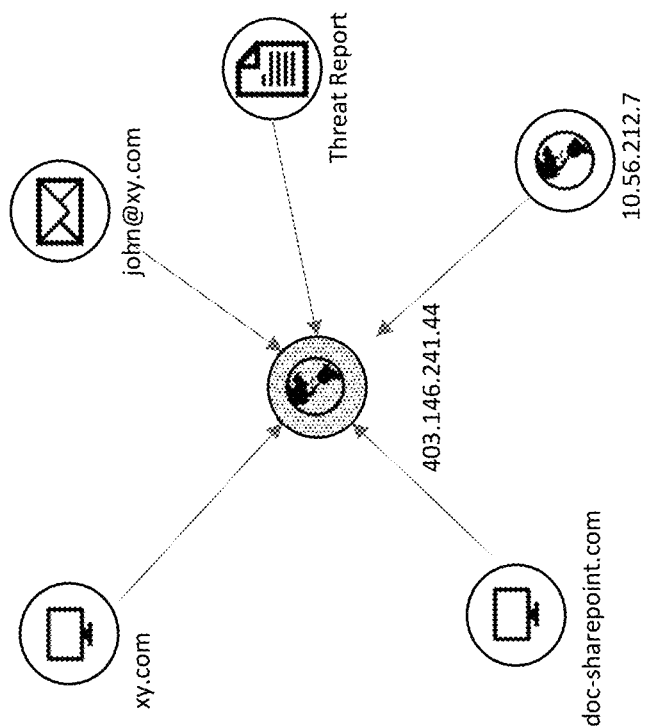

FIG. 14A illustrates a content request that is querying for cybersecurity intelligence content relating to a first IP address, while FIG. 14B illustrates the cybersecurity intelligence content that is retrieved. The IP address is also illustrated in FIG. 11, which discusses a content request from a user or group of users. As illustrated in FIG. 14B, the retrieved cybersecurity intelligence content may identify a second IP address, two web domains, an e-mail address, and a threat report that are all related or otherwise relevant to the first IP address. The platform 110/210 may generate a graph which links the first IP address to the retrieved cybersecurity intelligence content, and cause the graph to be displayed on an end user device 140.

In some cases, the cybersecurity analysis platform 110/210 may be configured to store the cybersecurity intelligence content on the platform 110/210. For example, the platform 110/210 may store the cybersecurity intelligence content in a virtual workspace for a particular cybersecurity investigation project, or more specifically in a portion of a storage system (e.g., file system, database, or other data structure) associated with the virtual workspace. In some implementations, the cybersecurity analysis platform 110/210 may be configured to store the cybersecurity intelligence content in a format that describes a relationship between the different pieces of cybersecurity intelligence content. For example, the format may describe a graph having multiple nodes and edges, in which each of the nodes is a piece of cybersecurity intelligence content, and each of the edges represents a relationship or connection between two pieces of cybersecurity intelligence content.

Returning to FIG. 4B, the method 400 may include a step 414, in which the cybersecurity analysis platform 110/210 outputs, to at least one of one or more devices operated by the user or group of users, the retrieved cybersecurity intelligence content. That is, the retrieved content may be output to any end user device operated by the user or group of users. The step may include communicating the retrieved cybersecurity intelligence content to the device (e.g., 140) via a network. For instance, in the example of FIG. 14B, the cybersecurity analysis platform 110/210 may communicate the cybersecurity intelligence content, which may include information describing the second IP address, the web domains, the e-mail address, and the threat report to the user's device. In some cases, if the platform 110/210 has stored the cybersecurity intelligence content in a virtual workspace, it may generate information based on the virtual workspace, and communicate the information to the user's device. For example, the cybersecurity analysis platform 110/210 may be configured to generate a file which describes the graph of FIG. 14B, and communicate the file to the user's device. In some cases, the platform 110/210 may be configured to generate an image which represents the retrieved cybersecurity intelligence content, and to communicate the image to the user's device. For instance, the platform 110/210 may be configured to generate an image which represents the graph of FIG. 14B, and communicate the image to the user's device. The user's device may display the image (e.g., in a graphical user interface on a web browser).

Figure 15A:
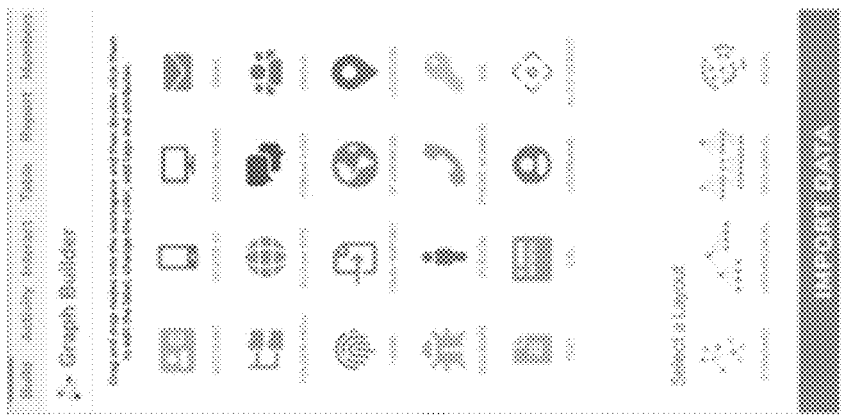
FIGS. 15A-15C illustrate a user interface displaying various pieces of cybersecurity intelligence content as enlarged nodes of a graph, according to an embodiment herein.
Figure 15A:
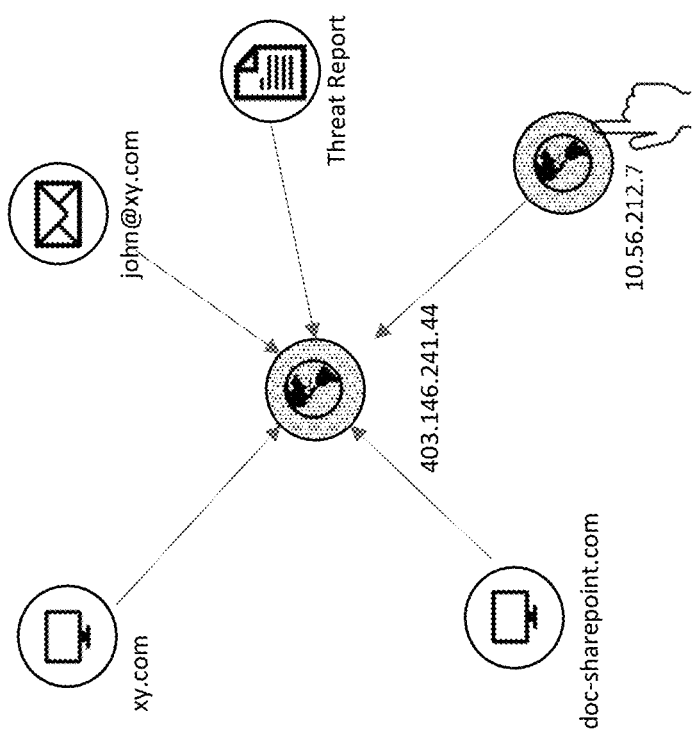
Figure 15A:
Figure 15B:
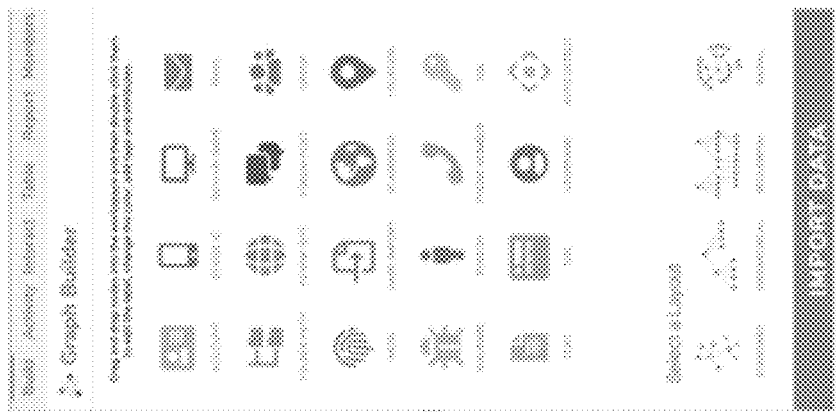
Figure 15B:
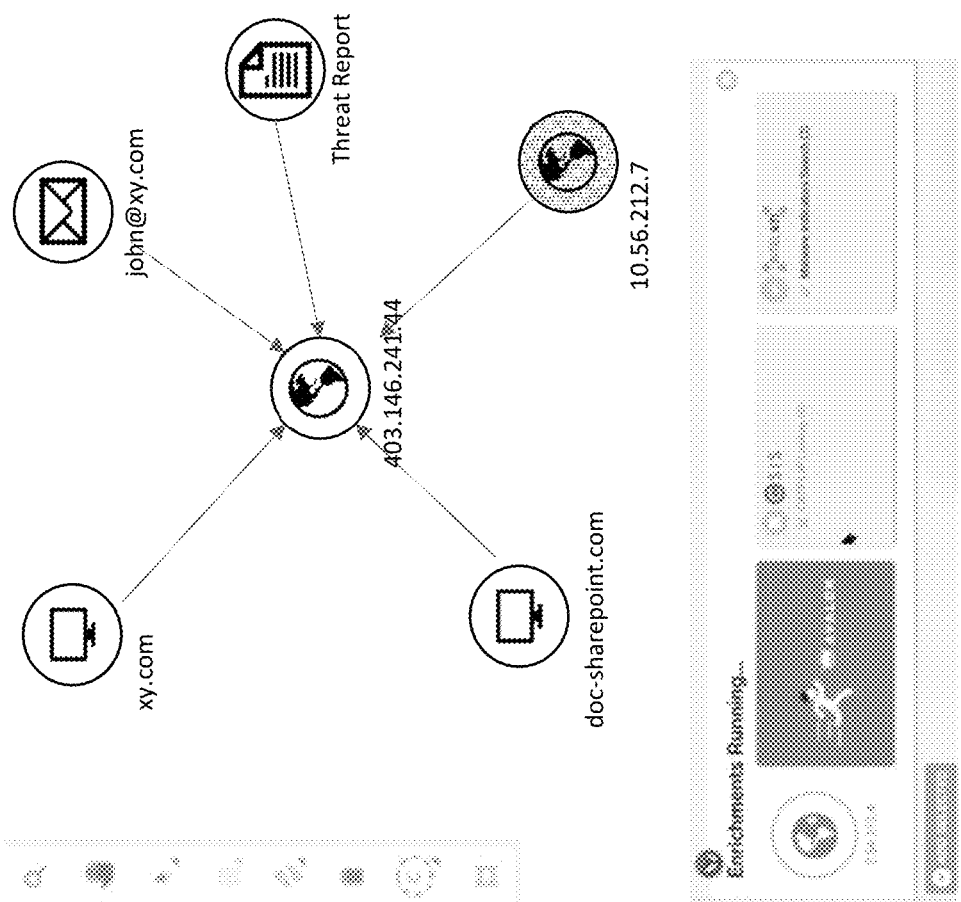
Figure 15C:
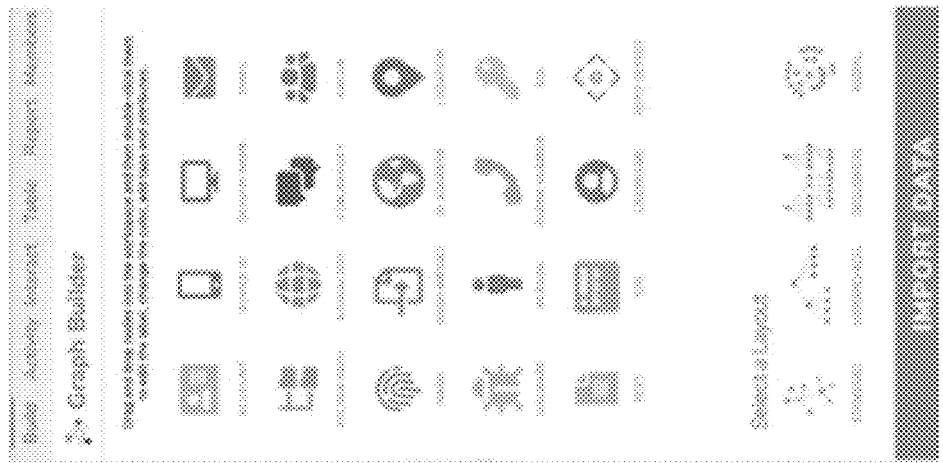
Figure 15C:
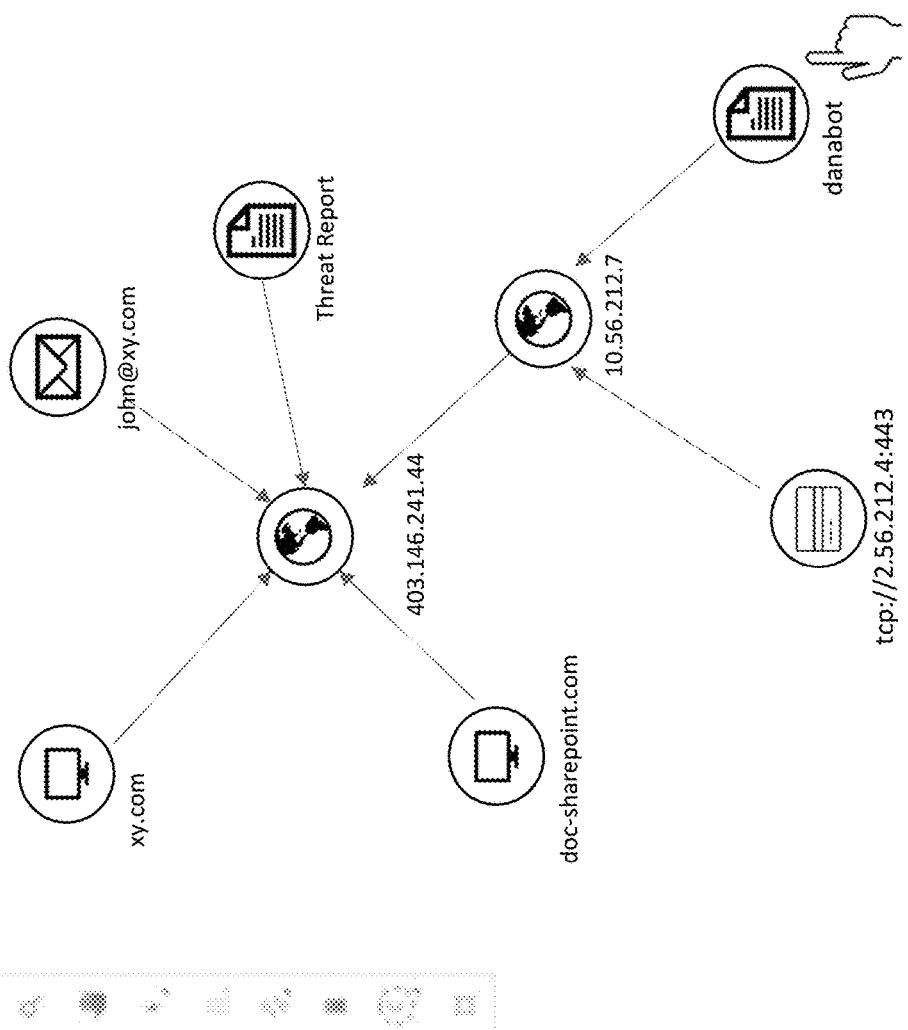

In an embodiment, the cybersecurity platform 110/210 may receive additional content requests (e.g., queries) to find additional cybersecurity intelligence content that relates to existing cybersecurity intelligence content in the virtual workspace. As an example, FIGS. 15A and 15B depict an additional query being made to find cybersecurity intelligence content which is related to the second IP address, which may be represented as a node in a graph. The query may cause additional pieces of cybersecurity intelligence content to be retrieved and added to the virtual workspace, or more specifically to the graph. FIG. 15C illustrates two additional pieces of retrieved cybersecurity intelligence content that relate to the second IP address. These two additional pieces of cybersecurity intelligence content may be represented as two additional nodes in the graph of FIGS. 15B and 15C.

Returning to FIG. 4B, the method 400 may include a step 416 that is performed in response to a determination that the content access policy is exceeded, or more specifically in response to a determination that the amount of content access allocated to a user or group of users for accessing a content source has been completely depleted. In that situation, the cybersecurity analysis platform 110/210 may output, to a device operated by the user or group of users, a notification that there is no content access to the content source. The notification may indicate, e.g., that the amount of content access for the cybersecurity intelligence content source has been completely used or has expired, and that no amount of content access remains for that cybersecurity intelligence content source. In some cases, the notification may further be accompanied or followed by a plurality of content access options for the cybersecurity intelligence content source, so that a new allocation of content access may be made to the user or group of users for the cybersecurity intelligence content source.

As discussed above, the cybersecurity analysis platform 110/210 may track content source usage associated with a user or a group of users. In an embodiment, the content source usage may provide information on how a user or group of users is accessing or otherwise using various cybersecurity intelligence content sources, if at all. In some cases, this information may be stored as the tracked usage information in FIG. 10C. This information may be outputted to the user or group of users, which may allow the user or group of users to evaluate, for instance, whether their usage of the cybersecurity intelligence content sources matches the amount of content access allocated to them. If there is a discrepancy between the amount of content access allocated to the user or group of users and their actual usage of the cybersecurity intelligence content sources, then the amount of content access that is allocated to the user or group of users may be adjusted in the future. For instance, if the information indicates that an amount of content access by a user or group of users to a particular cybersecurity intelligence content source is much less than an amount of content access that had been allocated to them for accessing that cybersecurity intelligence content source, this information may aid the user or group of users in evaluating their future content access needs and in selecting a future content access option for various cybersecurity intelligence content sources. In some cases, if the platform 110/210 is configured to generate a recommendation for which content access option to select, it may be configured to adjust its recommendation past on past content source usage indicated by the tracked usage information discussed above.

Figure 16A:
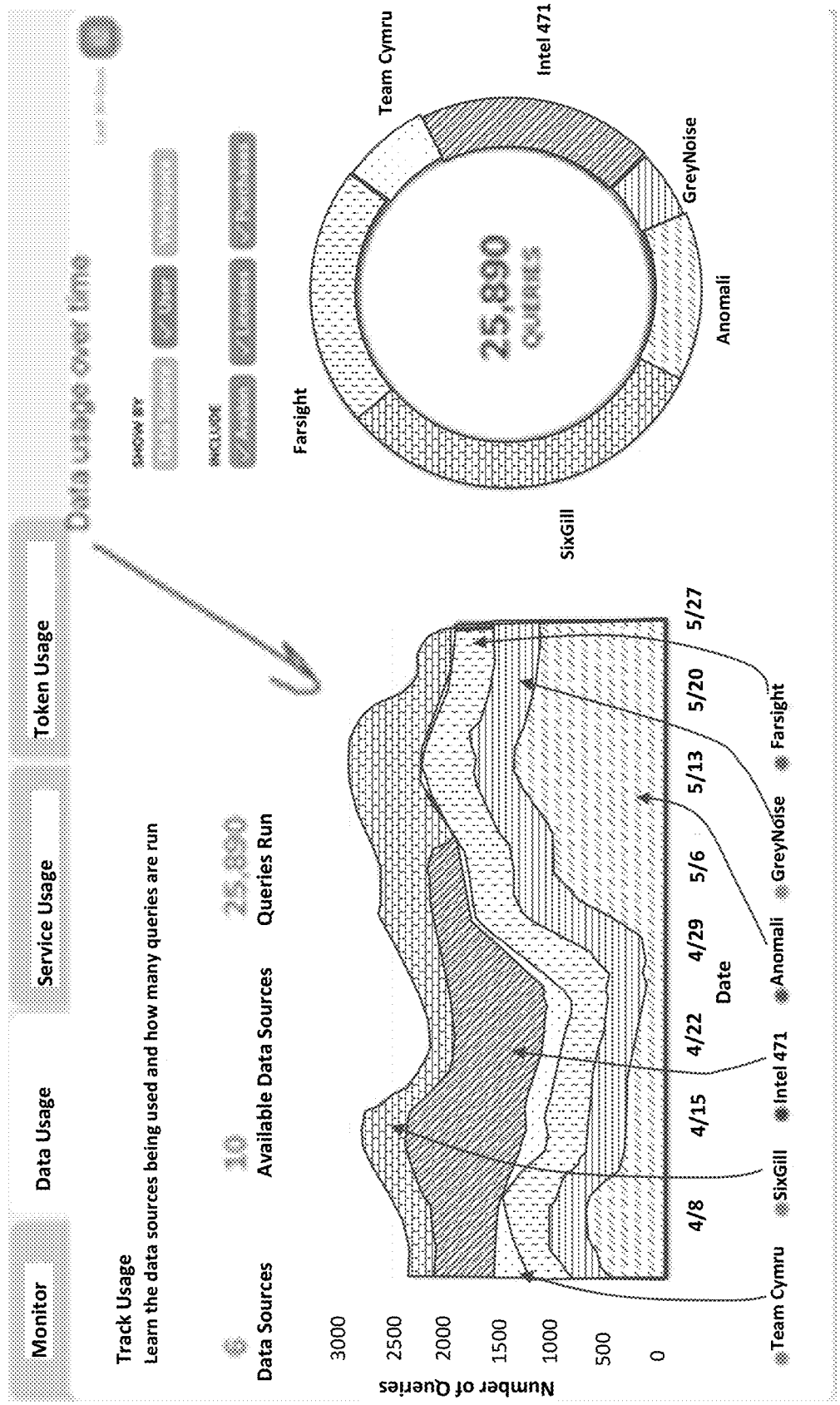
FIGS. 16A-16E illustrates a user interface that displays various content usage information, information on token balances, or usage of cybersecurity services, according to an embodiment herein.

FIG. 16A illustrates an example of a user interface that is displaying tracked usage information tracked by the cybersecurity analysis platform 110/210. More specifically, the cybersecurity analysis platform 110/210 may track how much a user or group of users is using various cybersecurity intelligence content sources as a function of time, or more specifically how many times or how often the user or group of users have accessed various cybersecurity intelligence content sources. For instance, as illustrated in FIG. 16A, the tracked usage information may indicate, for each of the cybersecurity intelligence content sources, how many content requests (e.g., queries) the cybersecurity analysis platform 110/210 has received from the user or group of users for accessing the content source. As depicted in FIG. 16A, the content source usage information may indicate how usage of the various cybersecurity intelligence content sources varies over time. More particularly, the example in FIG. 16A depicts content source usage information that tracks how many daily or weekly content requests are received each day or each week over a time period of, e.g., several months. In some cases, the cybersecurity analysis platform 110/210 may track such information by counting how many content requests are received from one or more end user devices operated by the user or group of users.

Figure 16B:
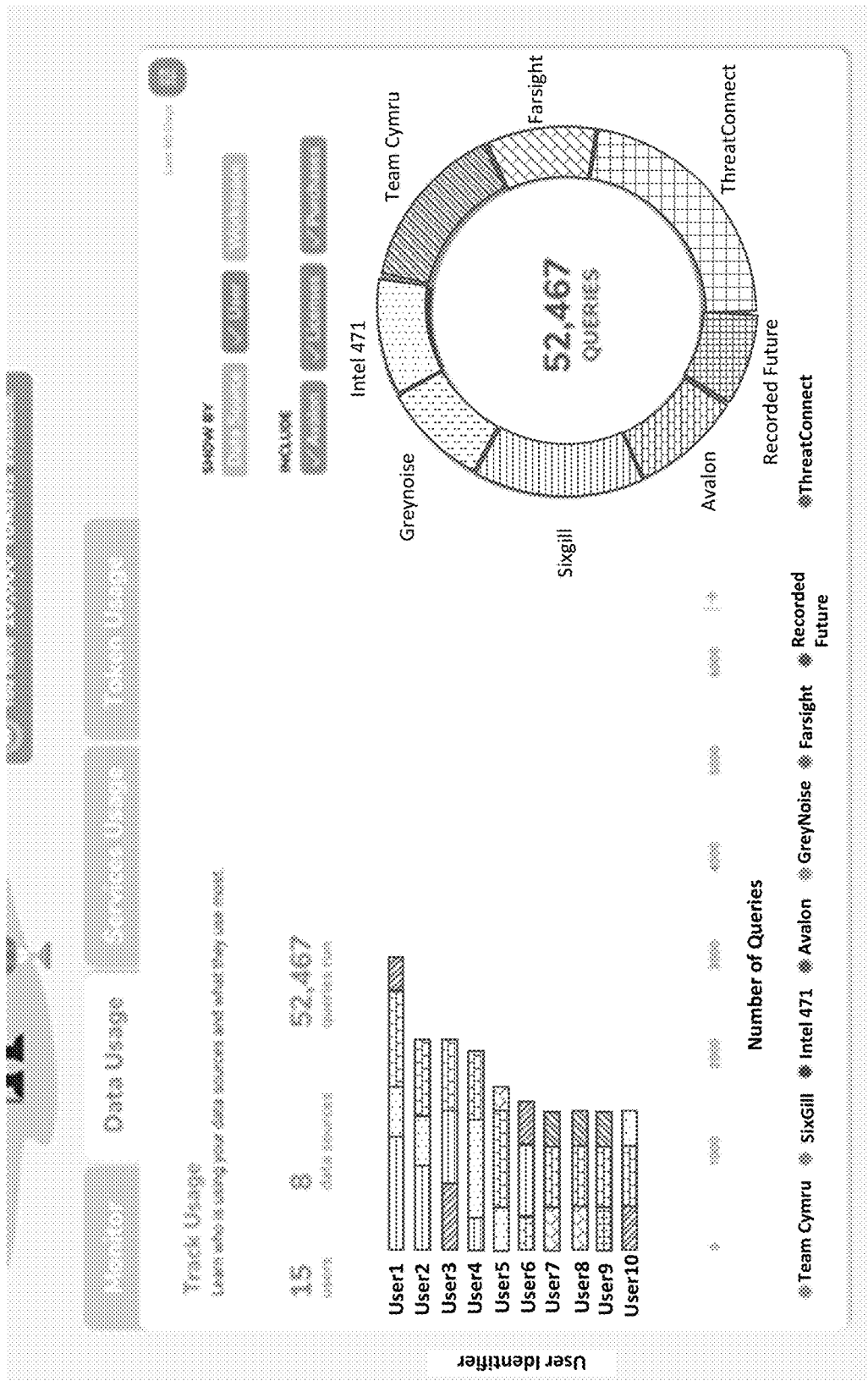

FIG. 16B illustrates an embodiment in which the tracked usage information may indicate how much each user in a group of users is using various cybersecurity intelligence content sources, or more specifically may indicate usage by team. For instance, the cybersecurity analysis platform 110/210 for such an example may record, for each query or other content request that it receives, a user identifier associated with the query. If content access for a cybersecurity intelligence content source is allocated to a group of users, the recorded user identifier may be used to track usage of the cybersecurity intelligence content source by individual users of the group, as illustrated in FIG. 16B. More particularly, the content source usage information in this example may indicate, for each user in the group of users, which cybersecurity intelligence content source(s) have been accessed or otherwise used by the user, and how much those cybersecurity intelligence content source(s) have been accessed by the user.

Figure 16C:
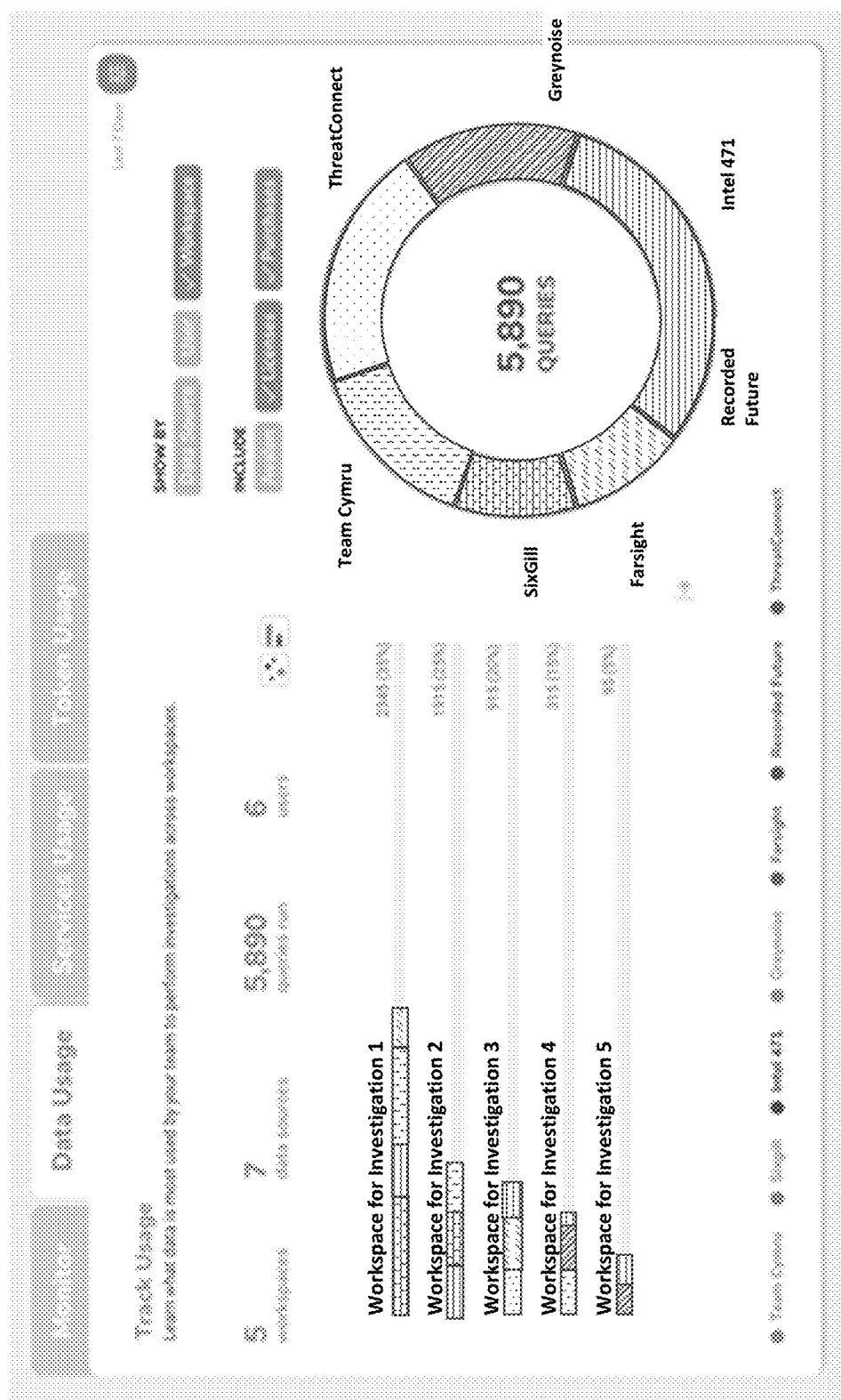

In an embodiment, if a user or group of users is using various cybersecurity intelligence content sources for one or more cybersecurity investigation projects, the cybersecurity analysis platform 110/210 may be configured to track which projects are using the cybersecurity intelligence content sources. More particularly, the cybersecurity analysis platform 110/210 may in some embodiments determine a respective project identifier associated with each content request received by the cybersecurity analysis platform 110/210 from a user or group of users, and record the project identifier. The recorded information may allow the cybersecurity analysis platform 110/210 to track which cybersecurity intelligence content source(s) is being used for a particular cybersecurity investigation project, and how much the cybersecurity intelligence content source(s) is being used for that cybersecurity investigation project. For instance, FIG. 16C depicts an example of a user interface which displays content source usage information that identifies which cybersecurity investigation projects are using a particular cybersecurity intelligence content source, and how much the cybersecurity intelligence content source is being used for that investigation project.

Figure 16D:
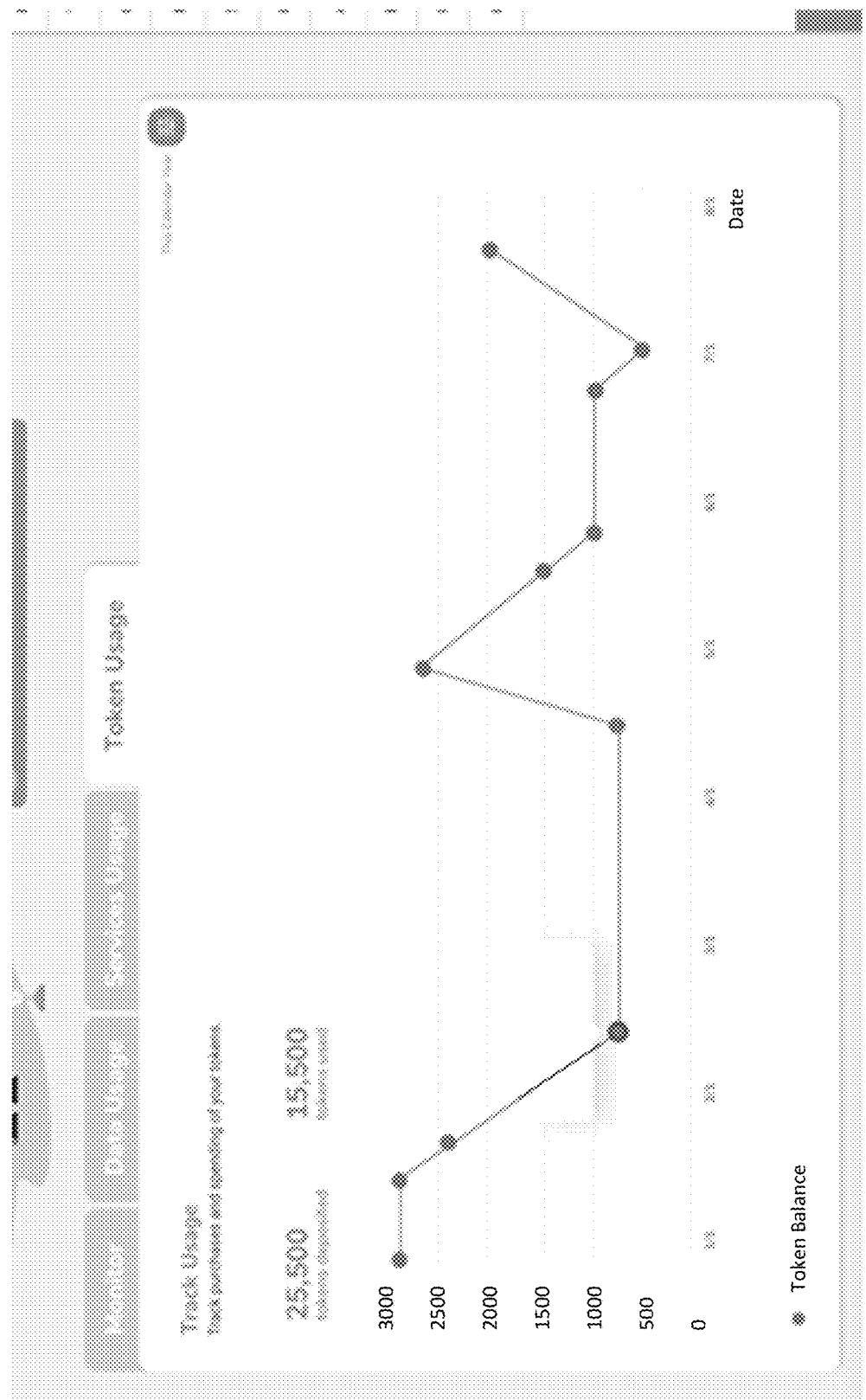

As stated above, one aspect of the present disclosure involves using a virtual token framework to acquire content access, such that a certain amount of content access may be allocated in exchange for a certain amount of virtual tokens. FIG. 16D depicts an example of a user interface which displays an amount of virtual tokens used by a user or group of users as a function of time, and a remaining amount of virtual tokens available for use by the user or group of users as a function of time. In such an example, the cybersecurity analysis platform 110/210 may track usage of the virtual tokens and track a token balance, which may be a balance of how many virtual tokens are associated with a user or group of users over time.

In an embodiment, the cybersecurity analysis platform 110/210 may provide access by a user or group of users to a cybersecurity service. The cybersecurity service may be provided by, e.g., a cybersecurity analyst or group of analysts, or some other services provider. In some cases, the cybersecurity service may include, e.g., a consultation service for answering cybersecurity questions, a network penetration testing service, a service that provides intelligence program support, or any other cybersecurity service. In some scenarios, the cybersecurity may be provided on an on-demand basis. For instance, a cybersecurity analyst may provide on-demand answers or analysis to questions presented by the user or group of users. In such an embodiment, the cybersecurity analysis platform 110/210 may track usage of an analyst's services by the user or group of users. For example, FIG. 16D illustrates a user interface that displays how much of the analyst's services have been used (e.g., how much time has been spent by the analyst for responding to requests by the user or group of users) on a weekly basis.

Figure 16E:
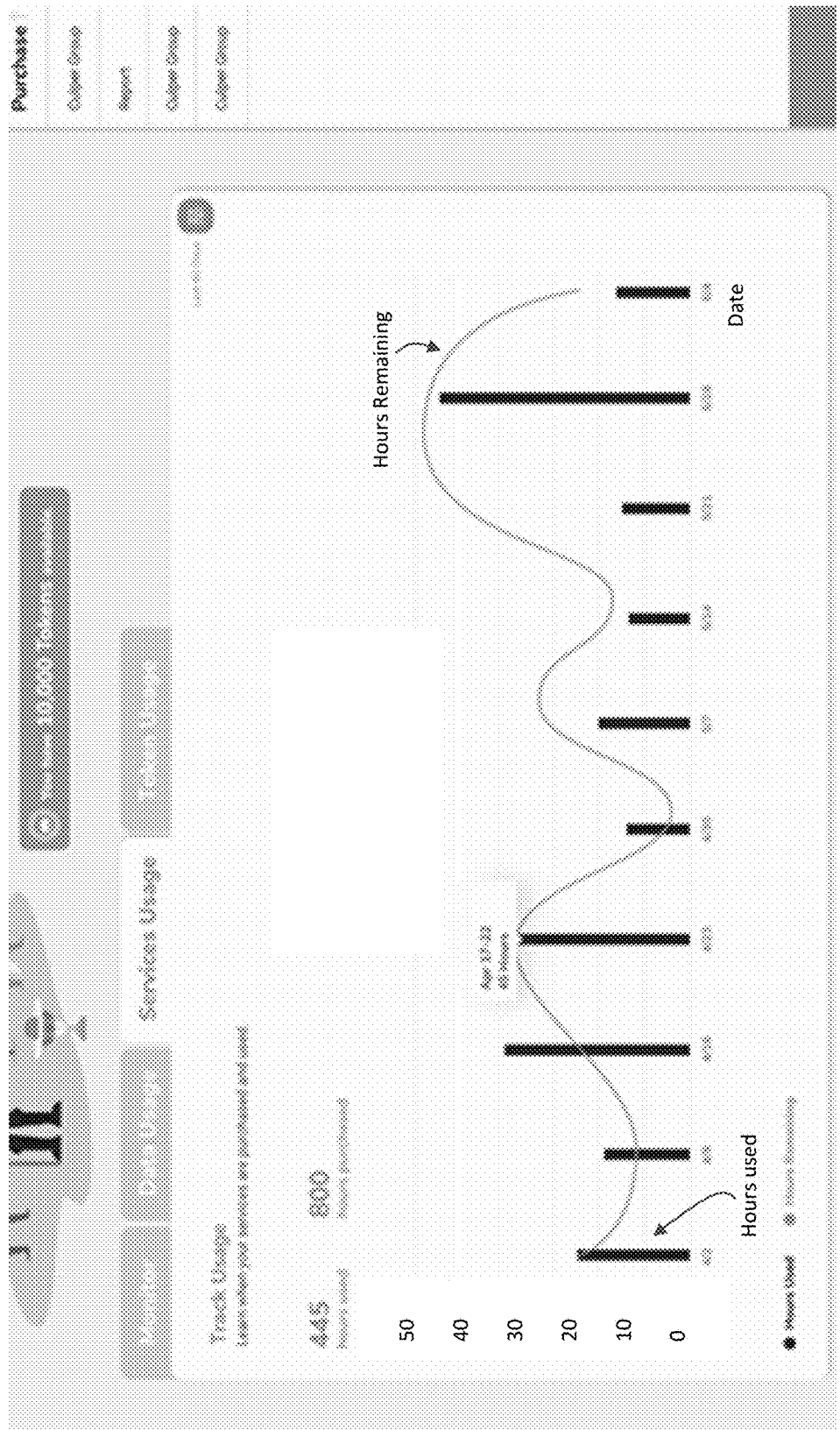

In an embodiment, if the cybersecurity analysis platform 110/210 provides access to a cybersecurity service provided by a cybersecurity analyst or other services provider, the platform 110/210 may be configured to track service usage associated with a user or group of users. The platform 110/210 may allow a user or group of users to access the cybersecurity service in a fractionalized manner, and the service usage may refer to how much the user or group of users has used or otherwise accessed the cybersecurity service. For example, if the cybersecurity service involves a consultation service with a cybersecurity analyst, the service usage may track, e.g., an amount of time spent by the cybersecurity analyst in researching and/or answering questions from the user or group of users (as illustrated in FIG. 16E), an amount of time spent by the cybersecurity analyst providing consultation services to the user or group of users, a number of questions from the user or group of users that have been answered by the analyst, and/or a number of consultation sessions that have occurred between the analyst and the user or group of users. The service usage that is tracked may be cumulative (e.g., since a predefined point in time), and/or may be for various time periods (e.g., weekly usage). If an amount of access allocated to the user or group of users for the cybersecurity service has not been completely depleted, the platform 110/210 may continue to connect the user or group of users with the cybersecurity service. This may involve, e.g., routing a request for service that is received from the user or group of users to a communication device associated with the cybersecurity service, such as a laptop or desktop computer operated by the cybersecurity analyst. If the amount of access allocated to the users or group of users has been completely depleted, the platform 110/210 may stop connecting the user or group of users with the cybersecurity service.

As stated above, the cybersecurity analysis platform 110/210 may in an embodiment be configured to store retrieved cybersecurity intelligence content in a virtual workspace, or more specially in a portion of a storage system associated with the virtual workspace. For instance, the cybersecurity analysis platform may reserve a portion of a file system or a database as being associated with a virtual workspace, which may be used to organize or otherwise collect information relating to a cybersecurity investigation project.

In such an embodiment, the cybersecurity analysis platform may be configured to facilitate sharing of a virtual workspace between two or more users, or more specifically to facilitate sharing of content which is stored in the portion of the storage system associated with the virtual workspace. More specifically, the cybersecurity analysis platform may facilitate sharing of cybersecurity intelligence content that was retrieved in response to a content request from a first user and stored in a virtual workspace that was created by or otherwise controlled by the first user. For instance, the cybersecurity analysis platform 110/210 may receive, from the first user, a request to send to a second user an invitation to view or otherwise access the virtual workspace of the first user. The invitation may provide permission for the second user to view the content on the second user's device, to modify the content or the virtual workspace, and/or to copy the content to another virtual workspace created by or otherwise controlled by the second user. In some cases, a first user who creates a virtual workspace may make its content public, so that the content is shared with all users who are in a same group as the first user, or with all users of the cybersecurity analysis platform.

In an embodiment, the cybersecurity analysis platform 110/210 may be configured to limit what content in a virtual workspace is shared, such that the platform shares only some content in the virtual workspace, and impose limitations on whether the remaining content can be viewed, copied, or modified. In some cases, the limitation on sharing of cybersecurity intelligence content in virtual workspace may be based on the access permission information of FIG. 10C. The access permission information may be provided by, e.g., a user who created a virtual workspace (e.g., an administrative user), and/or may be from a cybersecurity intelligence content source from which a piece of content was retrieved. For example, the cybersecurity analysis platform 110/210 may receive an indication, from a user or from a cybersecurity intelligence content source, that a particular piece of content or all content retrieved from the cybersecurity intelligence content source cannot be shared. As a result, the cybersecurity analysis platform 110/210 may prevent sharing, in the virtual workspace, of cybersecurity intelligence content that was retrieved from the cybersecurity intelligence content source. For example, if the platform 110/210 retrieved the cybersecurity intelligence content for a first user or group of users and has associated the content with a virtual workspace, the platform may prevent a second user or group of users from viewing the content retrieved from the cybersecurity intelligence content source, even if the users or the groups of users are sharing the virtual workspace. In other words, the retrieved content is non-shared content. In some cases, if the platform 110/210 is configured to generate an image which represents the content in a virtual workspace (e.g., as a graph or some other format), the platform may allow the first user or group of users to view the retrieved cybersecurity intelligence content, but may be configured to mask out the non-shared content. For example, when the platform 110/210 is presenting the virtual workspace to the second user or group of users, the platform may cause the non-shared content to be omitted from the virtual workspace or occluded in the virtual workspace, so that the non-shared content is not visible to the second user or group of users.

In an embodiment, the cybersecurity analysis platform 110/210 may be configured to share cybersecurity intelligence content to a component of an organization's security stack. As an example, the cybersecurity intelligence content may include IP addresses retrieved from one or more cybersecurity intelligence content sources, and may relate to a particular piece of malware. The retrieved content may be stored on the cybersecurity intelligence analysis platform in a manner that is associated with a virtual workspace. In this example, the IP addresses may be shared by being exported to the component of the organization's security stack. This component may be, e.g., a Firewall which is configured to block or otherwise limit traffic from the IP addresses. In some cases, the sharing of the IP addresses or other cybersecurity intelligence content with the Firewall may be done automatically, either periodically (e.g., once per day) or in response to a triggering event.

In an embodiment, the cybersecurity analysis platform 110/210 may be configured to generate a cybersecurity intelligence report based on cybersecurity intelligence information in a virtual workspace. For instance, the platform 110/210 may be configured to populate certain portions of the cybersecurity intelligence report with the cybersecurity intelligence content in the virtual workspace and/or with text entered by a user.

In an embodiment, the platform 110/210 (or, more specifically, a computing system providing the platform 110/210) may perform a method that involves providing service access options to a user or group of users. The method may involve steps that are similar to steps 402-416, but involve service access options instead of or in addition to content access options. The service access options may be associated with different amounts of access for a cybersecurity service, such as the analyst service, network penetration testing service, or other services discussed above. The platform in this embodiment may output a plurality of service access options to a user or group of users for accessing a particular cybersecurity service, and may receive from the user or group of users a selection of one of the service access options. The platform may update a profile associated with the user or group of users, wherein the profile indicates an amount of service allocated to the user or group of users. The platform may subsequently receive a request for accessing the cybersecurity service. In response, the platform may determine whether the amount of service access allocated to the user or group of users has been completely depleted. If the amount of service access allocated to the user or group of users for accessing the cybersecurity service has not been completely depleted, the platform may facilitate the fulfillment of the request by communicating the request to a device associated with the cybersecurity service. The device may be, e.g., a device operated by a cybersecurity analyst providing the cybersecurity service, a device used for performing the network penetration testing service, or some other device.

Additional Discussion of Various Embodiments

Embodiment 1 relates to a computing system for providing a cybersecurity analysis platform, or to a method performed by the platform/computing system. The computing system comprises at least one processing circuit and a non-transitory computer-readable medium. The non-transitory computer-readable medium has instructions thereon that, when executed by the at least one processing circuit, causes the at least one processing circuit to perform the method. The method may involve outputting a plurality of content access options for selection by a user or group of users of the cybersecurity analysis platform, wherein the plurality of content access options are associated with different amounts of content access to a cybersecurity intelligence content source; receiving, from at least one of one or more devices operated by the user or the group of users, a selection of one of the plurality of content access options; updating, based on the selection, a profile associated with the user or group of users to indicate an amount of content access allocated to the user or group of users for accessing the cybersecurity intelligence content source; receiving, subsequent to the selection of one of the plurality of content access options, a content request for cybersecurity intelligence content in the cybersecurity intelligence content source, wherein the content request is received from at least one of the one or more devices operated by the user or group of users; determining, in response to the content request, whether the amount of content access allocated to the user or group of users for the cybersecurity intelligence content source has been completely depleted; in response to a determination that the amount of content access allocated to the user or group of users for the cybersecurity intelligence content has not been completed depleted: retrieving, from the cybersecurity intelligence content source, the cybersecurity intelligence content associated with the content request; and outputting, to at least one of the one or more devices operated by the user or the group of users, the retrieved cybersecurity intelligence content.

Embodiment 2 includes the computing system of embodiment 1, wherein the plurality of content access options respectively identifies different quantities of content requests that would be allocated to the user or group of users for accessing cybersecurity intelligence content in the cybersecurity intelligence content source.

Embodiment 3 includes the computing system of embodiment 1 or 2, wherein the plurality of content access options respectively identifies different time durations that would be allocated to the user or group of users for accessing cybersecurity intelligence content in the cybersecurity intelligence content source.

Embodiment 4 includes the computing system of any one of embodiments 1-3, wherein the plurality of content access options further respectively identifies at least one of: different tiers of cybersecurity intelligence content in the cybersecurity intelligence content source that would be accessible by the user or group of users, different time periods in which cybersecurity intelligence content in the cybersecurity intelligence content source would be accessible to the user or group of users, or different types of cybersecurity intelligence content in the cybersecurity intelligence content source that would be accessible by the user or group of users.

Embodiment 5 includes the computing system of any one of embodiments 1-4, wherein the cybersecurity intelligence content source is one of multiple cybersecurity intelligence content sources accessible by the computing system, and wherein the plurality of content access options respectively identifies different types of cybersecurity intelligence content that would be accessible by the user or group of users in all of the multiple cybersecurity intelligence content sources.

Embodiment 6 includes the computing system of any one of embodiments 1-5, wherein the cybersecurity intelligence content source is a first cybersecurity intelligence content source, and the selection is a first selection associated with the first cybersecurity intelligence content source, wherein the instructions, when executed by the at least one processing circuit, further causes the at least one processing circuit to perform the following: receiving, from at least one of the one or more devices operated by the user or group of users, a second selection of content access options for accessing a second cybersecurity intelligence content source, and updating, based on the second selection, the profile associated with the user or group of users to indicate an amount of content access allocated to the user or group of users for accessing the second cybersecurity intelligence content source.

Embodiment 7 includes the computing system of any one of embodiments 1-6, wherein the instructions, when executed by the at least one processing circuit, further causes the at least one processing circuit to perform the following: receiving, from at least one of the one or more devices operated by the group of users, access permission information that describes or indicates a set of one or more user identifiers which identify a set of one or more users in the group to which the content access for the cybersecurity intelligence content source is allocated; determining, when the content request is received, a user identifier associated with the content request; and determining whether the user identifier belongs to the set of one or more user identifiers described or indicated in the access permission information. In this embodiment, the cybersecurity intelligence content associated with the content request is retrieved only if the user identifier associated with content request belongs to the set of one or more user identifiers described or indicated in the access permission information.

Embodiment 8 includes the computing system of any one of embodiments 1-7, wherein the instructions, when executed by the at least one processing circuit, further cause the at least one processing circuit to track the content source usage associated with the user or group of users by updating, after receiving the content request, content source usage information which indicates how much the cybersecurity intelligence content source is being used by the user or group of users for providing cybersecurity intelligence content.

Embodiment 9 includes the computing system of embodiment 8, wherein the cybersecurity intelligence content source is one of multiple cybersecurity intelligence content sources accessed by the user or group of users. In this embodiment, the content source usage information associated with user or group of users indicates, for each cybersecurity intelligence content source of the multiple cybersecurity intelligence content sources, how many times or how often the user or group of users have accessed the cybersecurity intelligence content source.

Embodiment 10 includes the computing system of embodiment 8 or 9, wherein updating the content source usage information associated with the user or group of users comprises recording, after receiving the content request, at least one of: a time at which the content request is received, or a time at which the cybersecurity intelligence content associated with the content request is retrieved, such that the content source usage information describes whether or how usage of the cybersecurity intelligence content source by the user or group of users changes as a function of time.

Embodiment 11 includes the computing system of any one of embodiments 8-10, wherein updating the content source usage information comprises recording, after receiving the content request, a project identifier which identifies a cybersecurity investigation project associated with the content request, such that the content source usage information describes how much the cybersecurity intelligence content source is being used by the user or group of users for the cybersecurity investigation project.

Embodiment 12 includes the computing system of any one of embodiments 1-11, wherein the instructions, when executed by the at least one processing circuit, further causes the at least one processing circuit, after the cybersecurity intelligence content associated with the content request is retrieved, to store the retrieved cybersecurity intelligence content on the computing system in a manner that associates the stored cybersecurity intelligence content with a virtual workspace for a cybersecurity investigation project.

Embodiment 13 includes the computing system of embodiment 12, wherein the stored cybersecurity intelligence content associated with the virtual workspace is retrieved from one or more cybersecurity intelligence content sources via one or more content requests by the user or group of users, and wherein the instructions, when executed by the at least one processing circuit, further causes the at least one processing circuit to perform the following: receiving a workspace share request for sharing, with one or more other users, cybersecurity intelligence content associated with the virtual workspace; determining which portion of the cybersecurity intelligence content associated with the virtual workspace has permission to be shared with the one or more other users; and outputting, to a device operated by the one or more other users, the portion of the cybersecurity intelligence content which is associated with the virtual workspace and which has permission to be shared.

Embodiment 14 includes the computing system of embodiment 12 or 13, wherein the instructions further cause the at least one processing circuit to generate a cybersecurity risk report based on the stored cybersecurity intelligence content associated with the virtual workspace.

Embodiment 15 includes the computing system of any one of embodiments 12-14, wherein the instructions further cause the at least one processing circuit to output at least a portion of the cybersecurity intelligence content associated with the virtual workspace to another computing system which is providing a network security platform that regulates, based on the portion of the cybersecurity intelligence content, access to a network associated with the user or group of users.

Embodiment 16 includes the computing system of embodiment 15, wherein the portion of the cybersecurity intelligence content that is outputted includes one or more IP addresses, and wherein the network security platform implements a firewall that is configured to regulate access to the network based on the one or more IP addresses.

Embodiment 17 relates to a computing system for providing a cybersecurity analysis platform, or to a method performed by the platform/computing system. The computing system comprises at least one processing circuit and a non-transitory computer-readable medium. The non-transitory computer-readable medium has instructions thereon that, when executed by the at least one processing circuit, causes the at least one processing circuit to perform the method. The method may involve outputting a plurality of content access options for selection by a user or group of users of the cybersecurity analysis platform, wherein the plurality of content access options are associated with at least one of: (i) different amounts of content access to a cybersecurity intelligence content source, (ii) different tiers of content access to the cybersecurity intelligence content source, or (iii) different types of cybersecurity intelligence content that the user or group of users is able to access from the cybersecurity intelligence content source, or (iv) different time periods in which the user or group of users is able to access the cybersecurity intelligence content source; receiving, from at least one of one or more devices operated by the user or the group of users, a selection of one of the content access options; updating, based on the selection, a content access policy in a profile associated with the user or group of users, wherein the content access policy is associated with the user or group of users and indicates at least one of: (i) an amount of content access allocated to the user or group of users for accessing the cybersecurity intelligence content source, (ii) a tier of content access allocated to the user or group of users for accessing the cybersecurity intelligence content source, (iii) a type of cybersecurity intelligence content that the user or group of users is able to access from the cybersecurity intelligence content source, or (iv) a time period in which the user or group of users is able to access the cybersecurity intelligence content; receiving, subsequent to the selection of one of the content access options, a content request for cybersecurity intelligence content in the cybersecurity intelligence content source, wherein the request is received from at least one of the one or more devices operated by the user or group of users; determining, in response to the content request, whether accessing the cybersecurity intelligence content source would cause content source usage associated with the user or group of users to exceed the content access policy associated with the user or group of users; in response to a determination that accessing the cybersecurity intelligence content source does not cause the content source usage to exceed the content access policy, retrieve, from the cybersecurity intelligence content source, the cybersecurity intelligence content associated with the content request; and outputting, to at least one of the one or more devices operated by the user or the group of users, the retrieved cybersecurity intelligence content.

Embodiment 18 relates to a computing system for providing a cybersecurity analysis platform, or to a method performed by the platform/computing system. The computing system comprises at least one processing circuit and a non-transitory computer-readable medium. The non-transitory computer-readable medium has instructions thereon that, when executed by the at least one processing circuit, causes the at least one processing circuit to perform the method. The method may involve: outputting, to at least one of one or more devices operated by a user or the group of users of the platform, a plurality of service access options for accessing a cybersecurity service; receiving, from at least one of the one or more devices, a selection of one of the service access options from among the plurality of service access options; updating a profile associated with the user or group of users to indicate an amount of service access allocated to the user or group of users for accessing the cybersecurity service; receiving, subsequent to the selection of one of the service access options, a request for accessing the cybersecurity service, wherein the request is received from at least one of one or more devices operated by the user or group of users; determining, in response to the request, whether the amount of service access allocated to the user or group of users for accessing the cybersecurity service has been completely depleted; in response to a determination that the amount of service access allocated to the user or group of users have not been completely depleted, communicating the request to a communication device associated with the cybersecurity service.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations. The embodiments described herein can include various combinations and/or sub-combinations of the functions, components, and/or statistical models of the different embodiments described.

What is claimed is:

1. A computing system for providing a cybersecurity analysis platform, the computing system comprising:
   at least one processing circuit;
   a non-transitory computer-readable medium having instructions thereon that, when executed by the at least one processing circuit, causes the at least one processing circuit to:
      output a plurality of content access options for selection by a user or group of users of the cybersecurity analysis platform, wherein the plurality of content access options are associated with different amounts of content access to a cybersecurity intelligence content source;
      receive, from one or more devices operated by the user or the group of users, a selection of one of the plurality of content access options;
      update, based on the selection, a profile associated with the user or group of users to indicate an amount of content access allocated to the user or group of users for accessing the cybersecurity intelligence content source;
      receive, subsequent to the selection of one of the plurality of content access options, a content request for cybersecurity intelligence content in the cybersecurity intelligence content source, wherein the content request is received from the one or more devices operated by the user or group of users;
      determine, in response to the content request, whether the amount of content access allocated to the user or group of users for the cybersecurity intelligence content source has been completely depleted;
      in response to a determination that the amount of content access allocated to the user or group of users for the cybersecurity intelligence content has not been completed depleted:
         retrieve, from the cybersecurity intelligence content source, the cybersecurity intelligence content associated with the content request; and
         output the retrieved cybersecurity intelligence content to the one or more devices operated by the user or the group of users.

2. The computing system of claim 1, wherein the plurality of content access options respectively identifies different quantities of content requests allocated to the user or group of users for accessing cybersecurity intelligence content in the cybersecurity intelligence content source.

3. The computing system of claim 1, wherein the plurality of content access options respectively identifies different time durations allocated to the user or group of users for accessing cybersecurity intelligence content in the cybersecurity intelligence content source.

4. The computing system of claim 1, wherein the plurality of content access options further respectively identifies at least one of: different tiers of cybersecurity intelligence content in the cybersecurity intelligence content source that would be accessible by the user or group of users, different time periods in which cybersecurity intelligence content in the cybersecurity intelligence content source would be accessible to the user or group of users, or different types of cybersecurity intelligence content in the cybersecurity intelligence content source that would be accessible by the user or group of users.

5. The computing system of claim 1, wherein the cybersecurity intelligence content source is one of multiple cybersecurity intelligence content sources accessible by the computing system, and wherein the plurality of content access options respectively identifies different types of cybersecurity intelligence content that would be accessible by the user or group of users in all of the multiple cybersecurity intelligence content sources.

6. The computing system of claim 1, wherein the cybersecurity intelligence content source is a first cybersecurity intelligence content source, and the selection is a first selection associated with the first cybersecurity intelligence content source, wherein the instructions, when executed by the at least one processing circuit, further causes the at least one processing circuit to perform the following:
   receiving, from at least one of the one or more devices operated by the user or group of users, a second selection of content access options for accessing a second cybersecurity intelligence content source, and
   updating, based on the second selection, the profile associated with the user or group of users to indicate an amount of content access allocated to the user or group of users for accessing the second cybersecurity intelligence content source.

7. The computing system of claim 1, wherein the instructions, when executed by the at least one processing circuit, further causes the at least one processing circuit to perform the following:
   receiving, from at least one of the one or more devices operated by the group of users, access permission information that describes or indicates a set of one or more user identifiers which identify a set of one or more users in the group to which the content access for the cybersecurity intelligence content source is allocated;
   determining, when the content request is received, a user identifier associated with the content request; and
   determining whether the user identifier belongs to the set of one or more user identifiers described or indicated in the access permission information, wherein the cybersecurity intelligence content associated with the content request is retrieved only if the user identifier associated with content request belongs to the set of one or more user identifiers described or indicated in the access permission information.

8. The computing system of claim 1, wherein the instructions, when executed by the at least one processing circuit, further cause the at least one processing circuit to track content source usage associated with the user or group of users by updating, after receiving the content request, content source usage information which indicates how much the cybersecurity intelligence content source is being used by the user or group of users for providing cybersecurity intelligence content.

9. The computing system of claim 8, wherein the cybersecurity intelligence content source is one of multiple cybersecurity intelligence content sources accessed by the user or group of users, and
wherein the content source usage information associated with user or group of users indicates, for each cybersecurity intelligence content source of the multiple cybersecurity intelligence content sources, how many times or how often the user or group of users have accessed the cybersecurity intelligence content source.

10. The computing system of claim 8, wherein updating the content source usage information associated with the user or group of users comprises recording, after receiving the content request, at least one of: a time at which the content request is received, or a time at which the cybersecurity intelligence content associated with the content request is retrieved, such that the content source usage information describes whether or how usage of the cybersecurity intelligence content source by the user or group of users changes as a function of time.

11. The computing system of claim 8, wherein updating the content source usage information comprises recording, after receiving the content request, a project identifier which identifies a cybersecurity investigation project associated with the content request, such that the content source usage information describes how much the cybersecurity intelligence content source is being used by the user or group of users for the cybersecurity investigation project.

12. The computing system of claim 1, wherein the instructions, when executed by the at least one processing circuit, further causes the at least one processing circuit, after the cybersecurity intelligence content associated with the content request is retrieved, to store the retrieved cybersecurity intelligence content on the computing system in a manner that associates the stored cybersecurity intelligence content with a virtual workspace for a cybersecurity investigation project.

13. The computing system of claim 12, wherein the stored cybersecurity intelligence content associated with the virtual workspace is retrieved from one or more cybersecurity intelligence content sources via one or more content requests by the user or group of users, and wherein the instructions, when executed by the at least one processing circuit, further causes the at least one processing circuit to perform the following:
receiving a workspace share request for sharing, with one or more other users, cybersecurity intelligence content associated with the virtual workspace;
determining which portion of the cybersecurity intelligence content associated with the virtual workspace has permission to be shared with the one or more other users; and
outputting, to a device operated by the one or more other users, the portion of the cybersecurity intelligence content which is associated with the virtual workspace and which has permission to be shared.

14. The computing system of claim 12, wherein the instructions further cause the at least one processing circuit to generate a cybersecurity risk report based on the stored cybersecurity intelligence content associated with the virtual workspace.

15. The computing system of claim 12, wherein the instructions further cause the at least one processing circuit to output at least a portion of the cybersecurity intelligence content associated with the virtual workspace to another computing system which is providing a network security platform that regulates, based on the portion of the cybersecurity intelligence content, access to a network associated with the user or group of users.

16. The computing system of claim 15, wherein the portion of the cybersecurity intelligence content that is outputted includes one or more Internet Protocol (IP) addresses, and wherein the network security platform implements a firewall that is configured to regulate access to the network based on the one or more IP addresses.

17. A method performed by a computing system, the method comprising:
outputting, by the computing system, a plurality of content access options for selection by a user or group of users of a cybersecurity analysis platform, wherein the plurality of content access options are associated with different amounts of content access to a cybersecurity intelligence content source;
receiving, from one or more devices operated by the user or the group of users, a selection of one of the plurality of content access options;
updating, based on the selection, a profile associated with the user or group of users to indicate an amount of content access allocated to the user or group of users for accessing the cybersecurity intelligence content source;
receiving, subsequent to the selection of one of the plurality of content access options, a content request for cybersecurity intelligence content in the cybersecurity intelligence content source, wherein the content request is received from the one or more devices operated by the user or group of users;
determining, in response to the content request, whether the amount of content access allocated to the user or group of users for the cybersecurity intelligence content source has been completely depleted;
in response to a determination that the amount of content access allocated to the user or group of users for the cybersecurity intelligence content has not been completely depleted: retrieving, from the cybersecurity intelligence content source, the cybersecurity intelligence content associated with the content request; and
outputting the retrieved cybersecurity intelligence content to the one or more devices operated by the user or the group of users.

18. A computing system for providing a cybersecurity analysis platform, the computing system comprising:
at least one processing circuit;
a non-transitory computer-readable medium having instructions thereon that, when executed by the at least one processing circuit, causes the at least one processing circuit to:
output a plurality of content access options for selection by a user or group of users of the cybersecurity analysis platform, wherein the plurality of content access options are associated with at least one of: (i) different amounts of content access to a cybersecurity intelligence content source, (ii) different tiers of content access to the cybersecurity intelligence content source, or (iii) different types of cybersecurity intelligence content that the user or group of users is able to access from the cybersecurity intelligence content source, or (iv) different time periods in which the user or group of users is able to access the cybersecurity intelligence content source;

receive, from one or more devices operated by the user or the group of users, a selection of one of the content access options;

update, based on the selection, a content access policy in a profile associated with the user or group of users, wherein the content access policy is associated with the user or group of users and indicates at least one of: (i) an amount of content access allocated to the user or group of users for accessing the cybersecurity intelligence content source, (ii) a tier of content access allocated to the user or group of users for accessing the cybersecurity intelligence content source, (iii) a type of cybersecurity intelligence content that the user or group of users is able to access from the cybersecurity intelligence content source, or (iv) a time period in which the user or group of users is able to access the cybersecurity intelligence content;

receive, subsequent to the selection of one of the content access options, a content request for cybersecurity intelligence content in the cybersecurity intelligence content source, wherein the request is received from the one or more devices operated by the user or group of users;

determine, in response to the content request, whether accessing the cybersecurity intelligence content source would cause content source usage associated with the user or group of users to exceed the content access policy associated with the user or group of users;

in response to a determination that accessing the cybersecurity intelligence content source does not cause the content source usage to exceed the content access policy: retrieve, from the cybersecurity intelligence content source, the cybersecurity intelligence content associated with the content request; and output the retrieved cybersecurity intelligence content to the one or more devices operated by the user or the group of users.

19. The computing system of claim 18, wherein the plurality of content access options respectively identifies at least one of: different quantities of content requests that would be allocated to the user or group of users for accessing cybersecurity intelligence content in the cybersecurity intelligence content source, or different time durations that would be allocated to the user or group of users for accessing cybersecurity intelligence content in the cybersecurity intelligence content source.

20. The computing system of claim 18, wherein the plurality of content access options respectively identifies at least one of: different tiers of cybersecurity intelligence content in the cybersecurity intelligence content source that would be accessible by the user or group of users, or respectively identifies different types of cybersecurity intelligence content in the cybersecurity intelligence content source that would be accessible by the user or group of users.

* * * * *